United States Patent [19]

Wilhite et al.

[11] 4,371,927
[45] Feb. 1, 1983

[54] DATA PROCESSING SYSTEM PROGRAMMABLE PRE-READ CAPABILITY

[75] Inventors: John E. Wilhite, Glendale; William A. Shelly; Charles P. Ryan, both of Phoenix, all of Ariz.

[73] Assignee: Honeywell Information Systems Inc., Waltham, Mass.

[21] Appl. No.: 131,739

[22] Filed: Mar. 20, 1980

Related U.S. Application Data

[63] Continuation of Ser. No. 853,944, Nov. 22, 1977, abandoned.

[51] Int. Cl.³ .............................................. G06F 9/28
[52] U.S. Cl. .............................................. 364/200
[58] Field of Search ... 364/200 MS File, 900 MS File

[56] References Cited

U.S. PATENT DOCUMENTS

| | | | |
|---|---|---|---|
| 3,168,724 | 2/1965 | Anderson | 364/200 |
| 3,401,376 | 9/1968 | Barnes | 364/200 |
| 3,701,977 | 10/1972 | Mendelson et al. | 364/200 |
| 3,886,523 | 5/1975 | Ferguson et al. | 364/200 |
| 3,990,051 | 11/1976 | Shelly | 364/200 |
| 4,050,058 | 9/1977 | Garlic | 364/200 |
| 4,095,269 | 6/1978 | Kawabe et al. | 364/200 |

*Primary Examiner*—Gareth D. Shaw
*Assistant Examiner*—C. T. Bartz
*Attorney, Agent, or Firm*—Faith F. Driscoll; Nicholas Prasinos

[57] ABSTRACT

A data processing system includes a cache store to provide an interface with a main storage unit for a central processing unit. The central processing unit includes a microprogram control unit in addition to control circuits for establishing the sequencing of the processing unit during the execution of program instructions. Both the microprogram control unit and control circuits include means for generating pre-read commands to the cache store in conjunction with normal processing operations during the processing of certain types of instructions. In response to pre-read commands, the cache store, during predetermined points of the processing of each such instruction, fetches information which is required by such instruction at a later point in the processing thereof.

36 Claims, 39 Drawing Figures

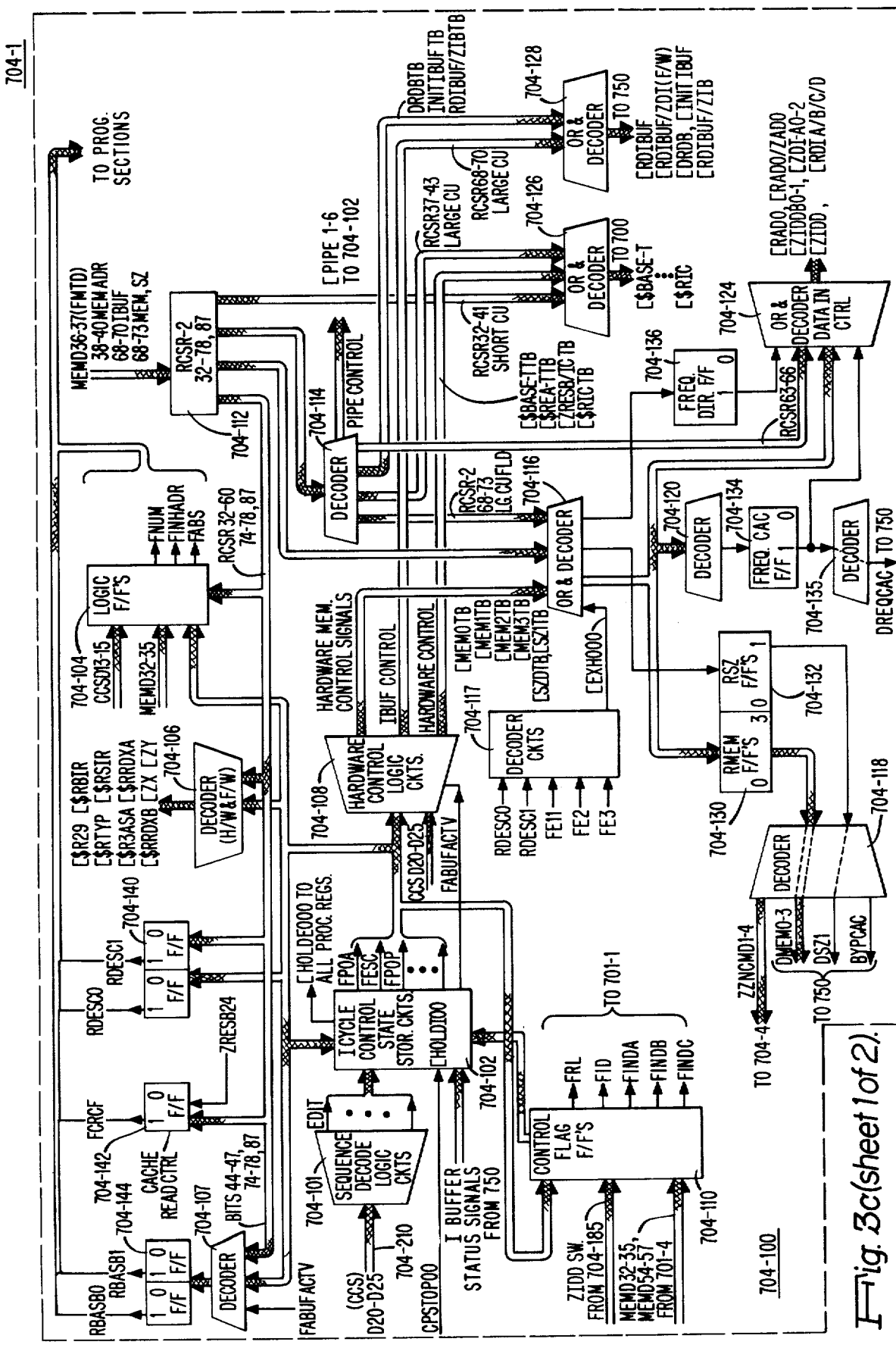
Fig. 3c (sheet 1 of 2).

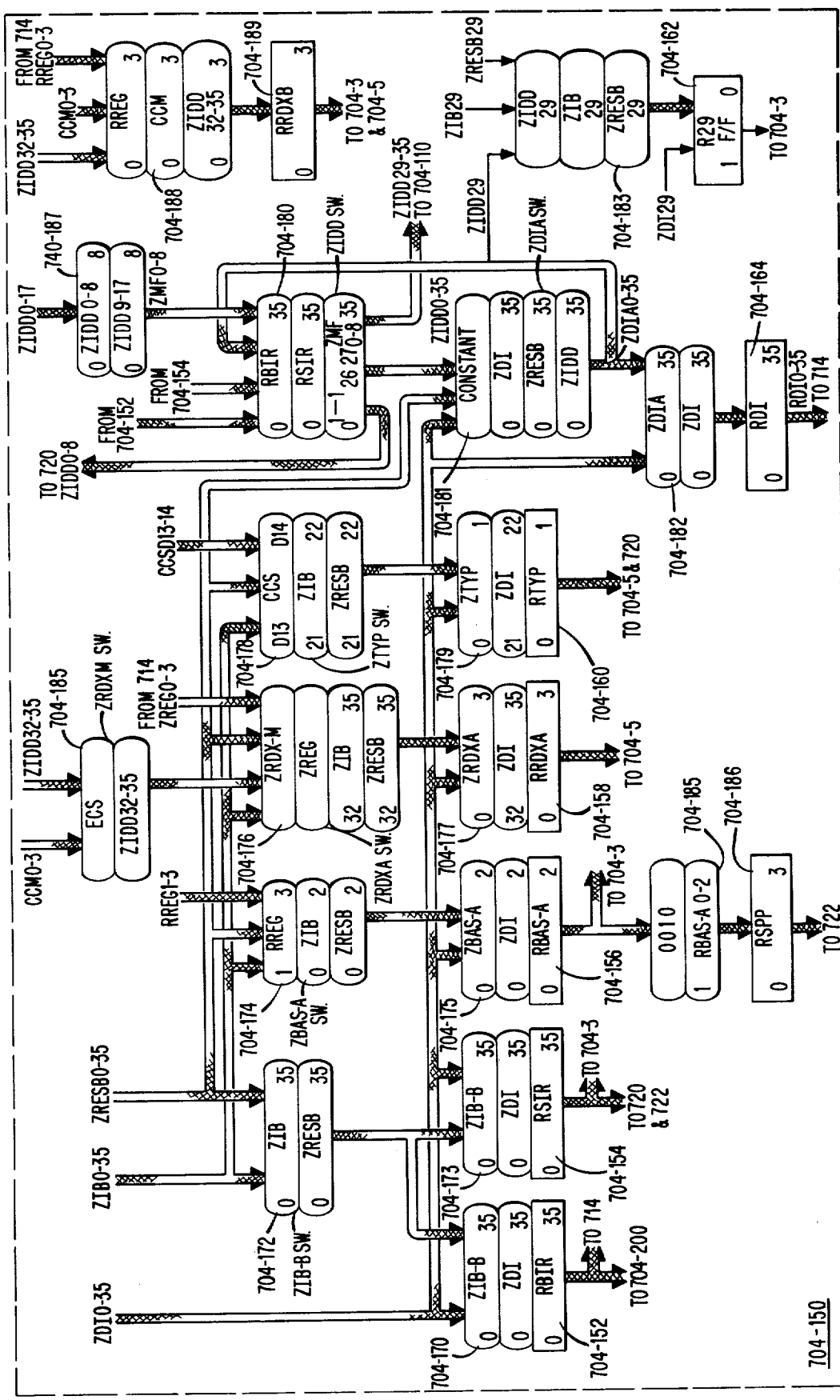
Fig. 3c (sheet 2 of 2).

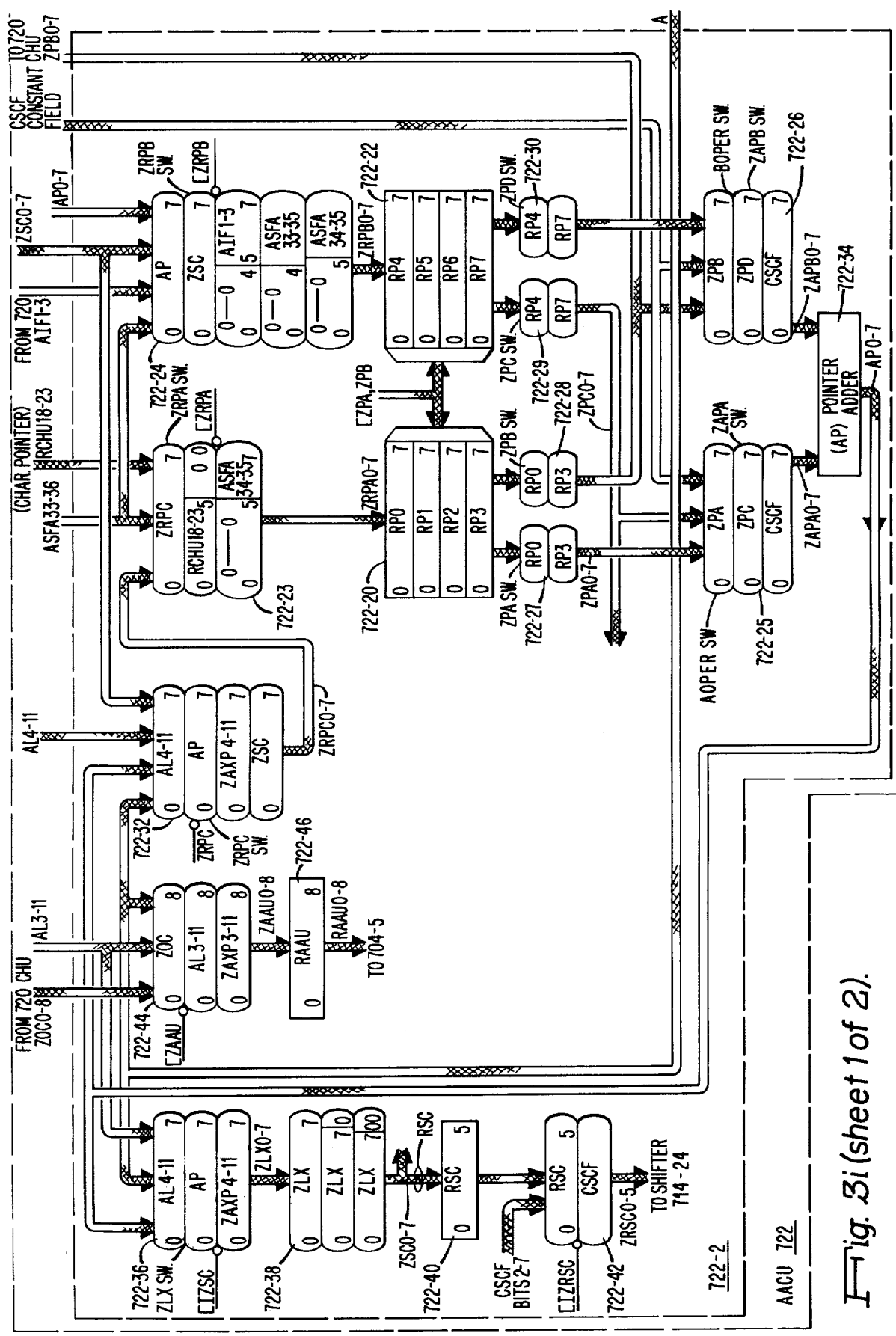
Fig. 3i (sheet 1 of 2).

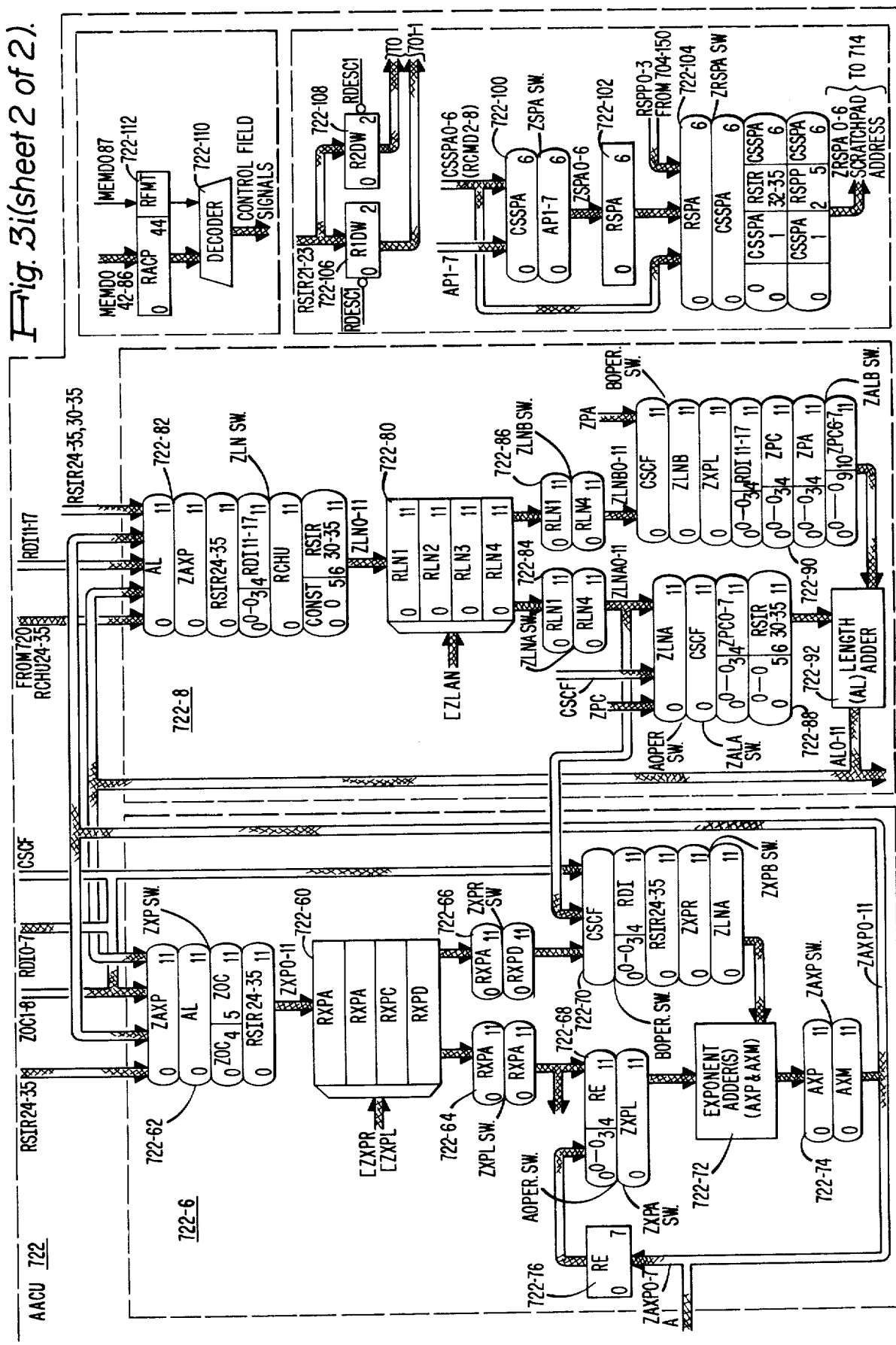

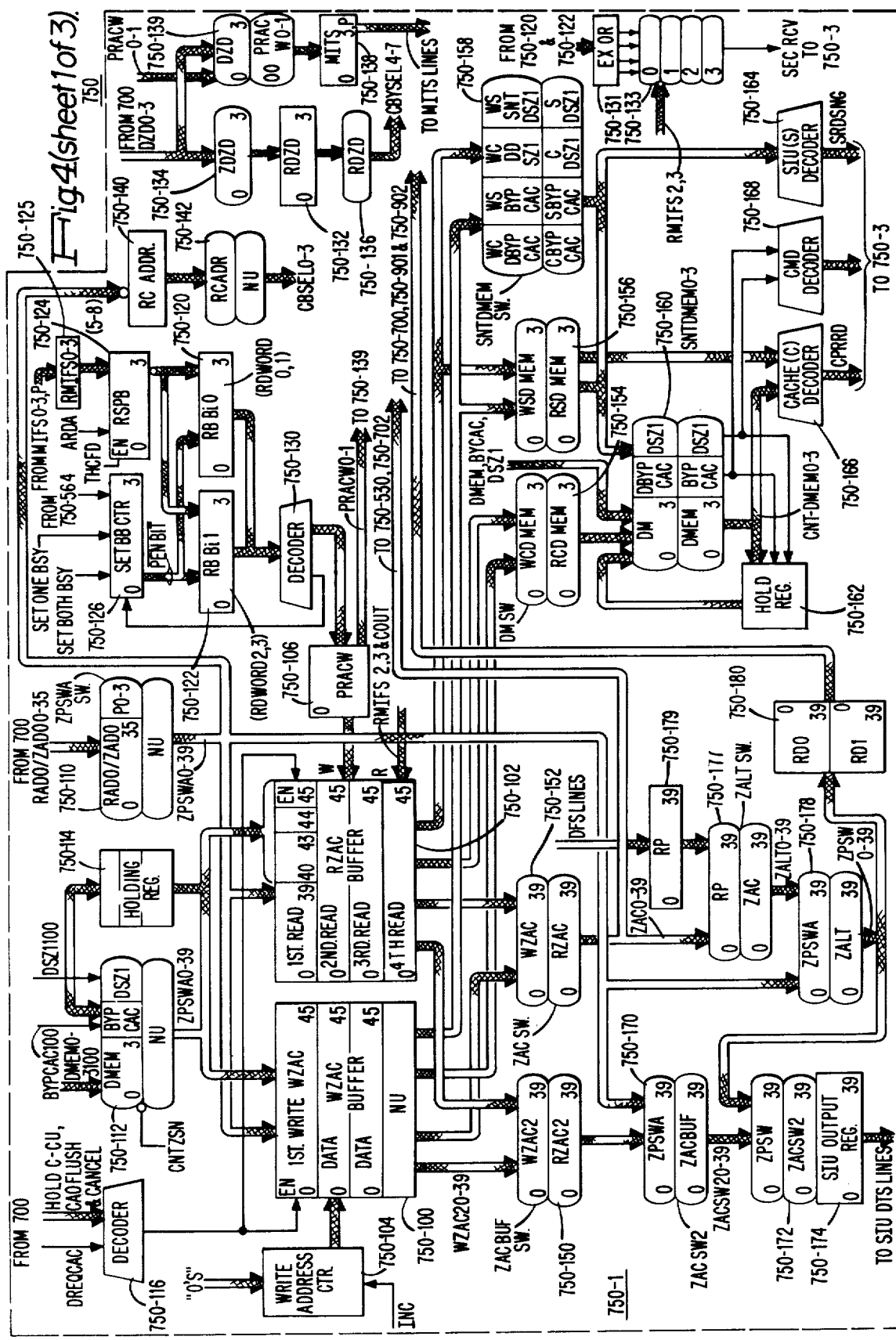

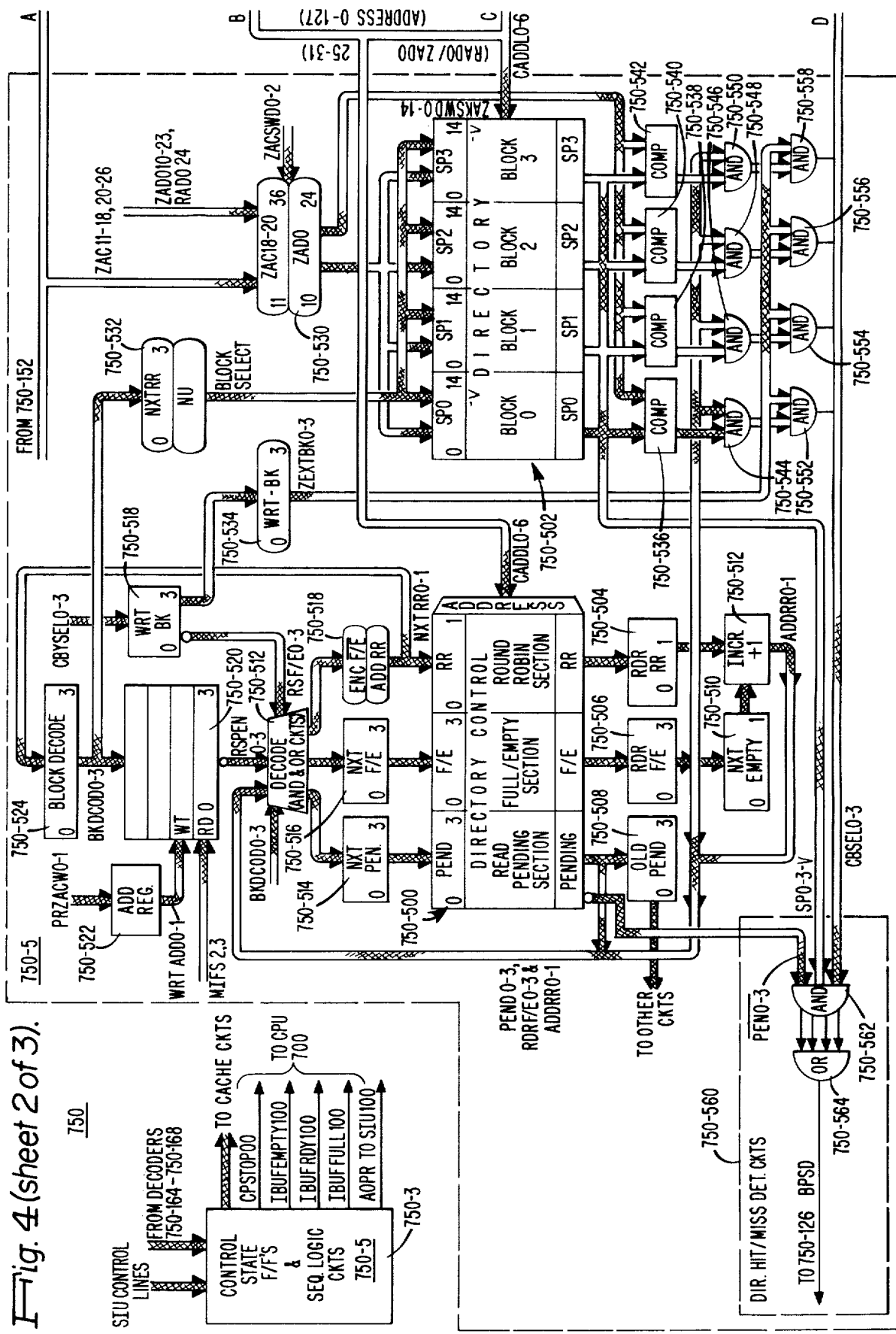
Fig. 4 (sheet 2 of 3).

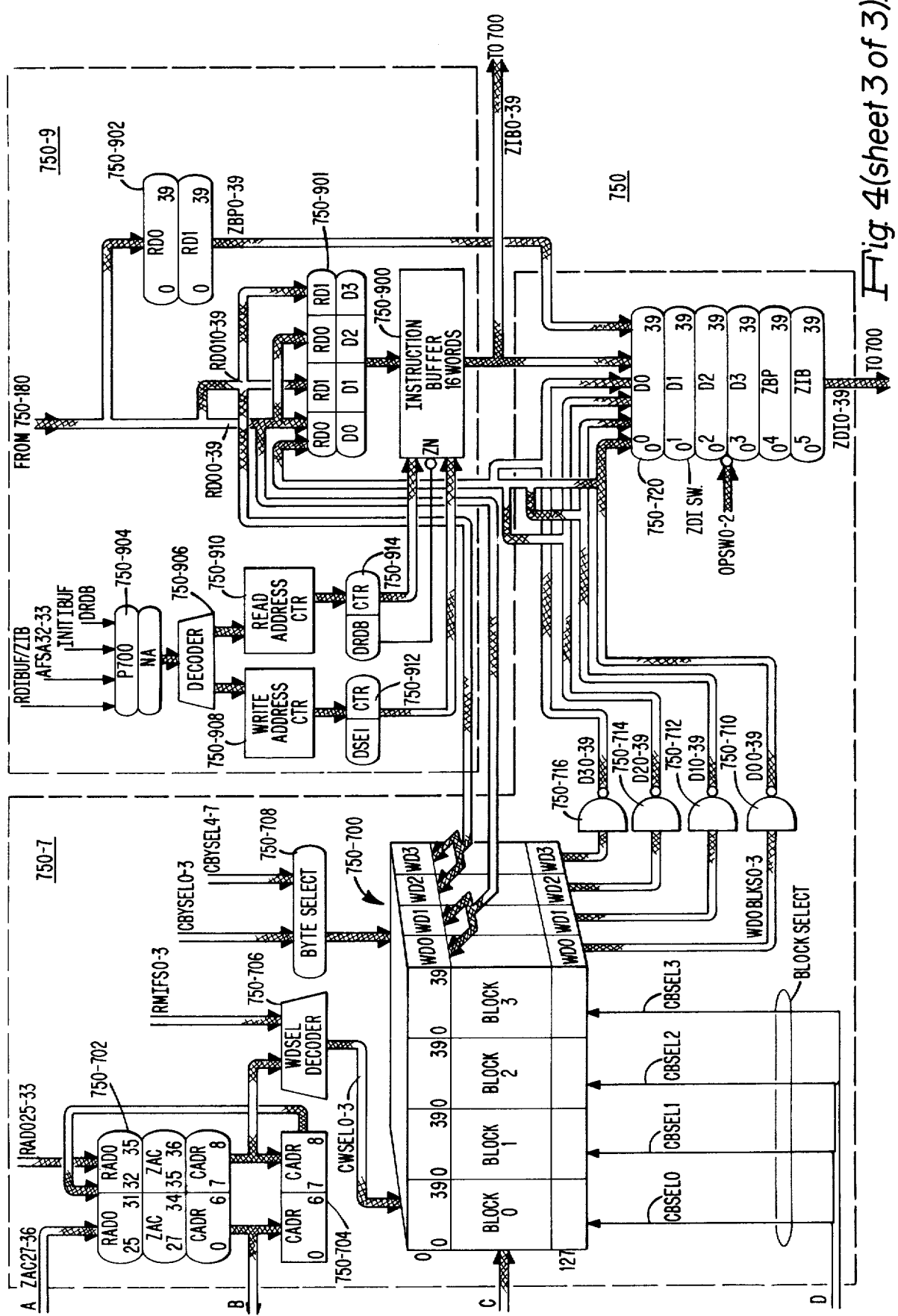
Fig. 4 (sheet 3 of 3).

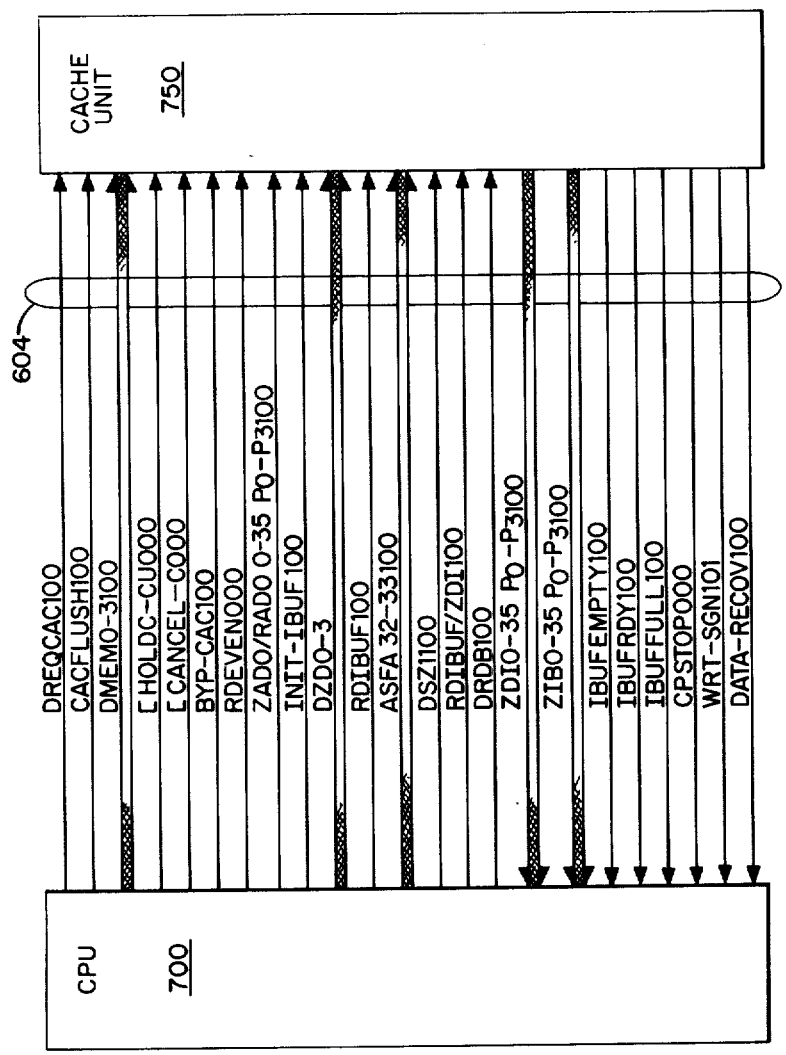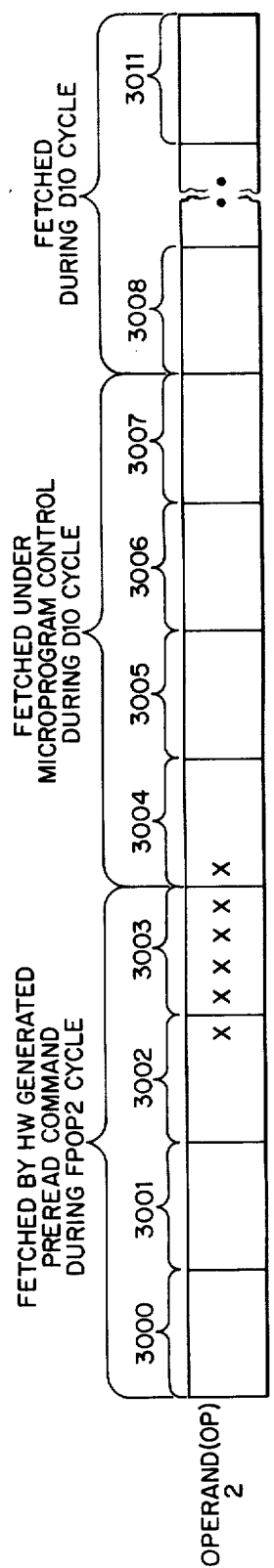

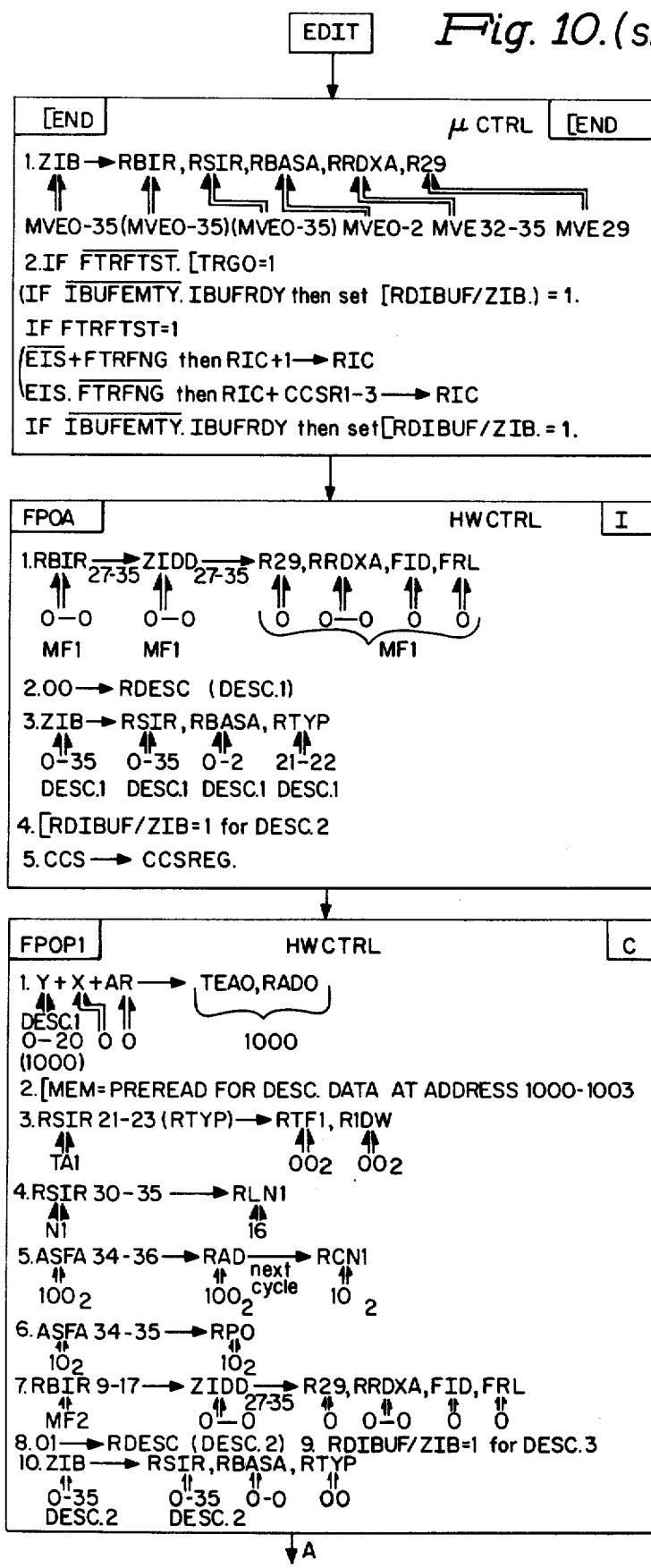
Fig. 10. (sheet 1 of 13)

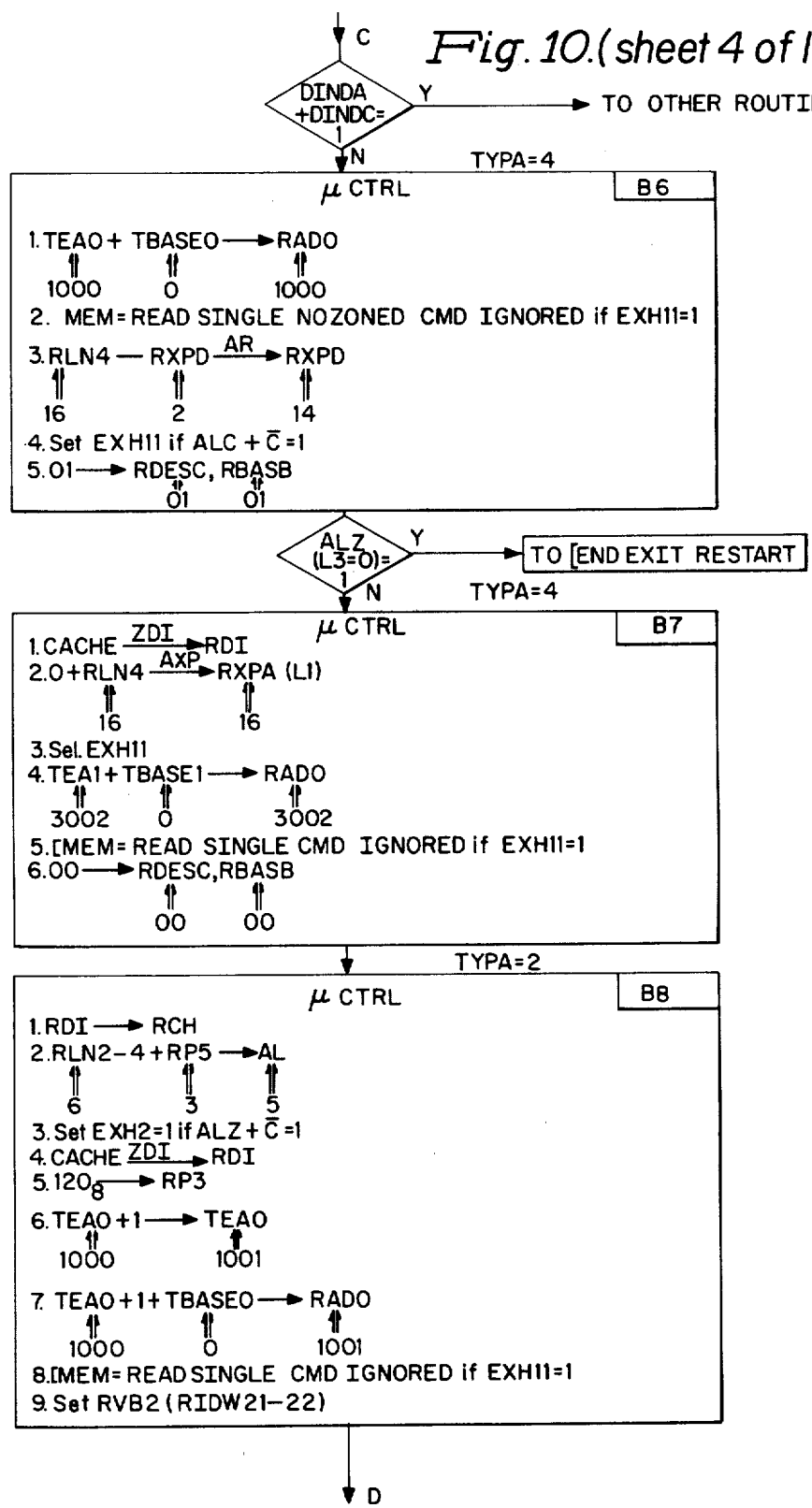
Fig. 10.(sheet 4 of 13)

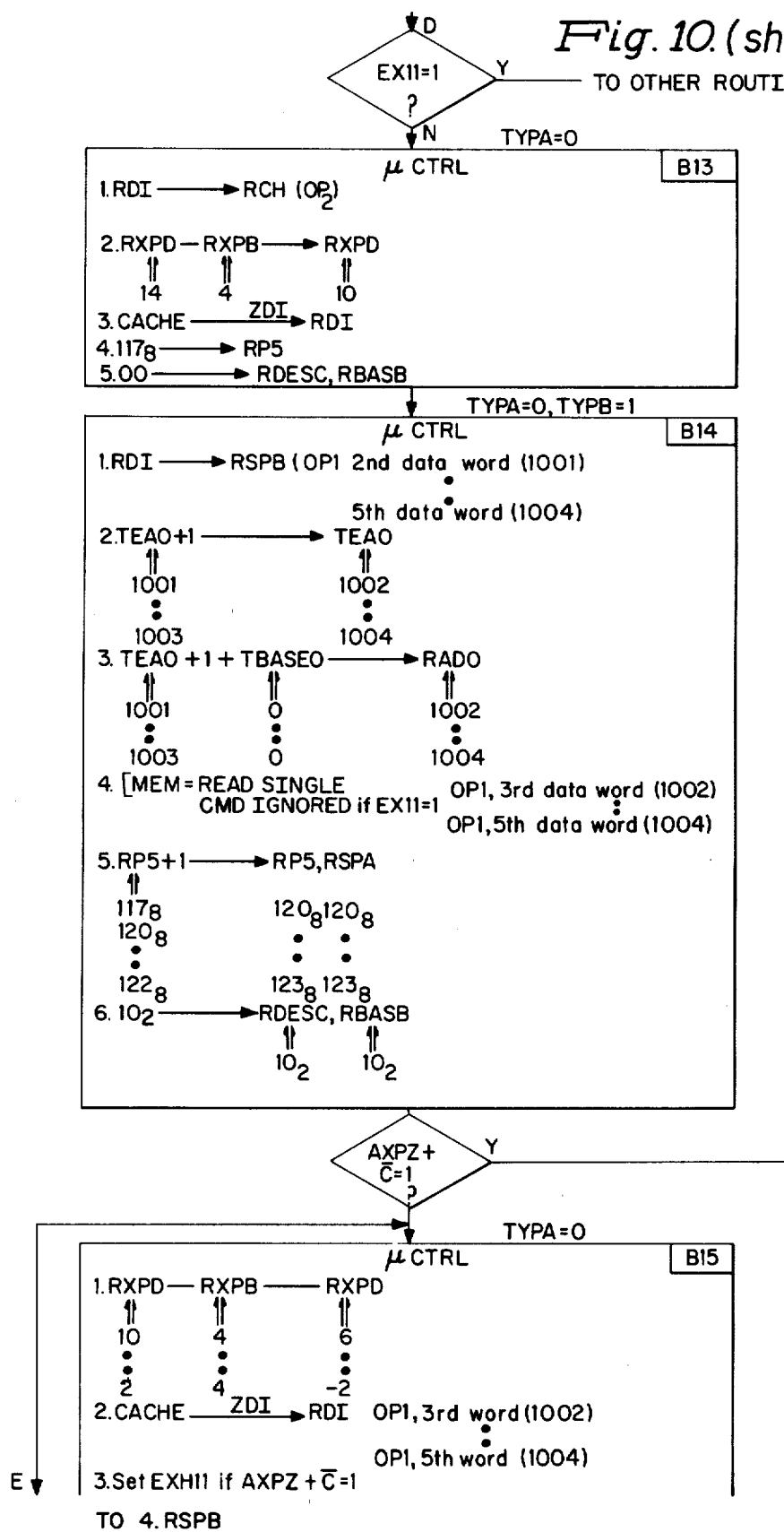
Fig. 10. (sheet 5 of 13)

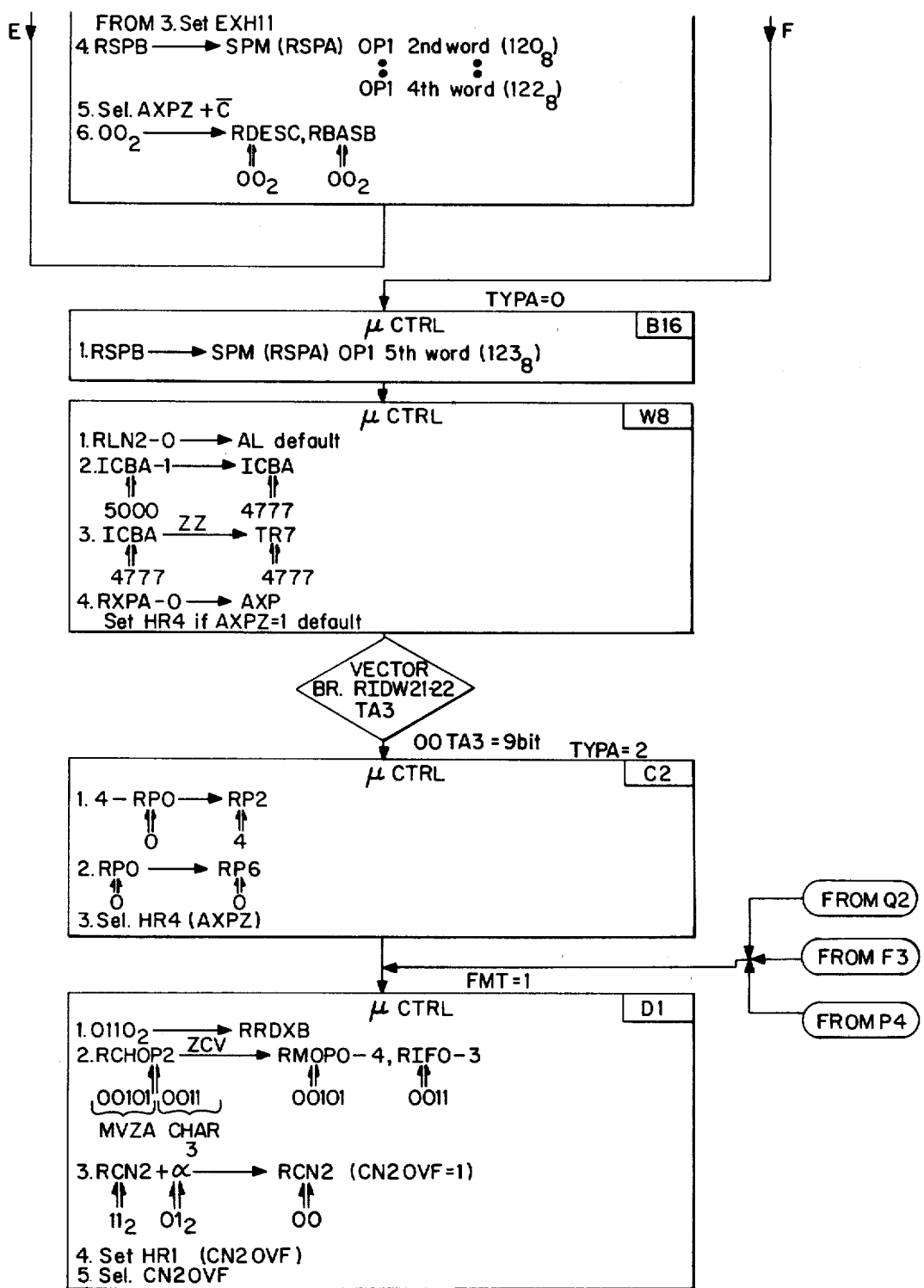
Fig. 10. (sheet 6 of 13)

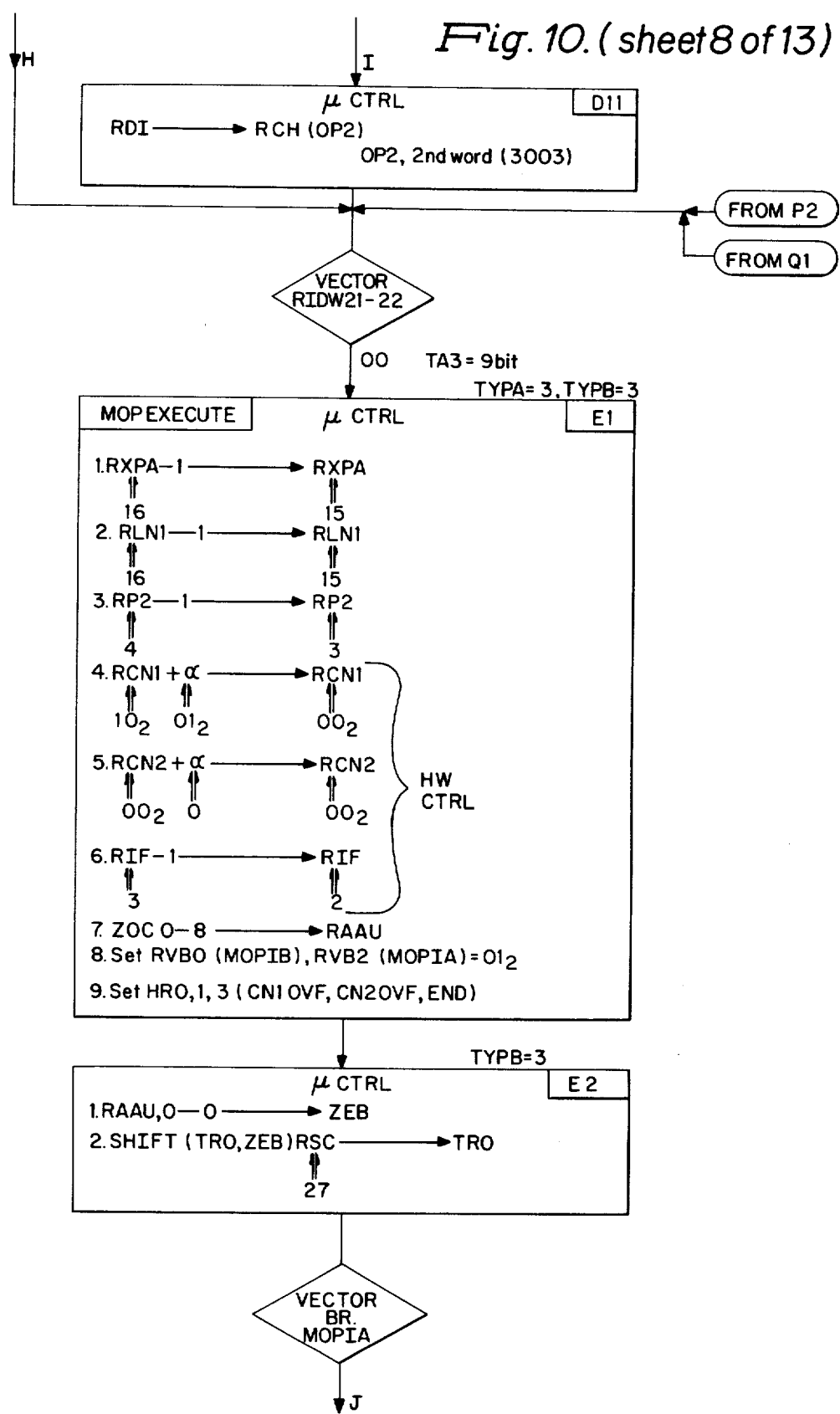
Fig. 10. (sheet 8 of 13)

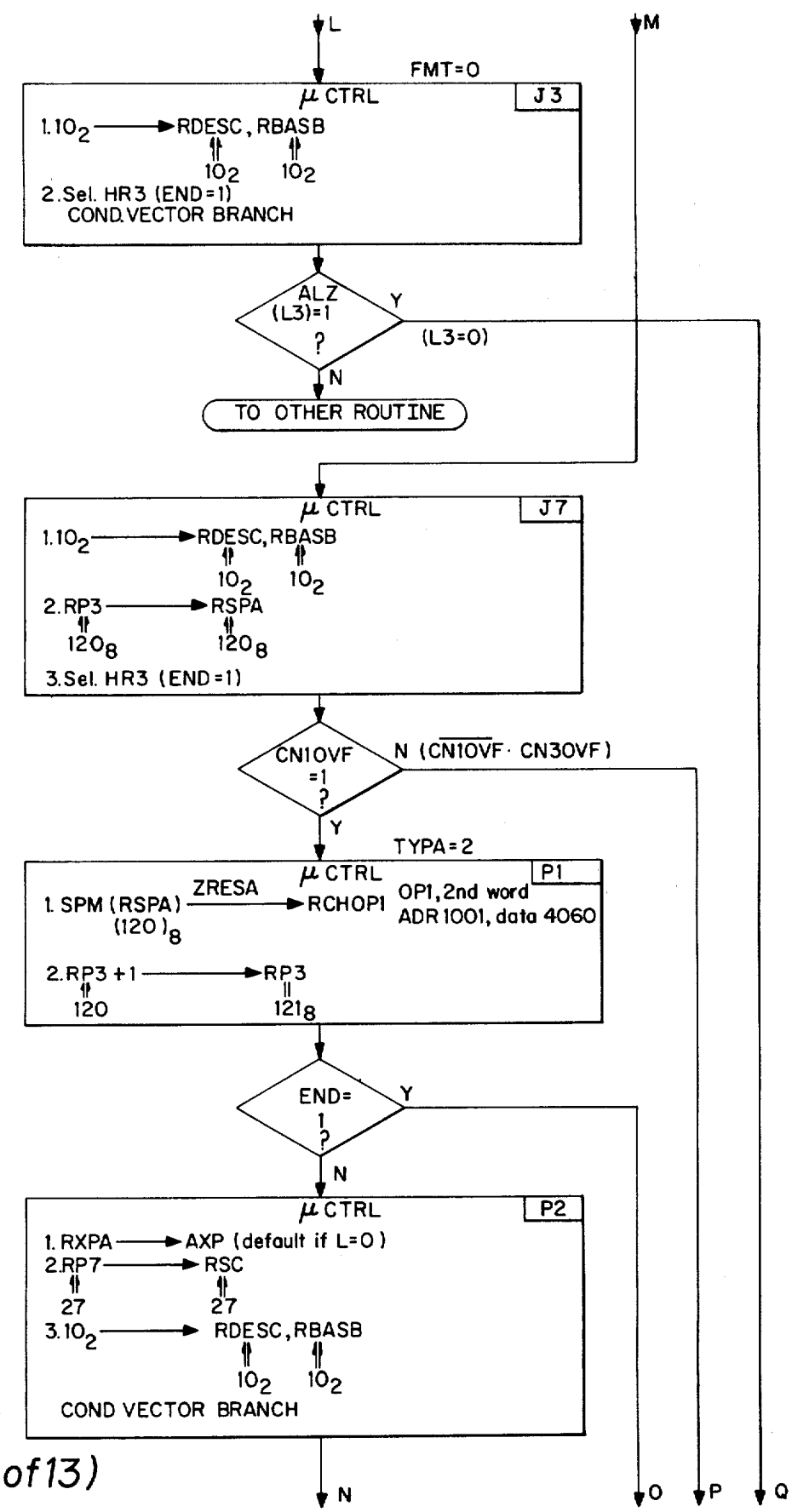
Fig. 10. (sheet 11 of 13)

DATA PROCESSING SYSTEM PROGRAMMABLE PRE-READ CAPABILITY

This is a continuation, of application Ser. No. 853,944, filed Nov. 22, 1977, now abandoned.

BACKGROUND OF THE INVENTION

The present invention relates to data processing systems and more particularly to systems which include a type of prefetch capability.

In large scale and multiprocessor systems, processor performance has been improved by providing a cache store or high-speed buffer storage unit between the system's large main storage unit or backing store and the central processing unit. To further increase the system performance, prior art data processing systems have also included a prefetched capability in which a next sequential line of data is fetched by the cache store automatically after supplying the line of data requested by the central processing unit.

A disadvantage of the above systems was that such systems did not take into account conditions which alter the basic philosophy that the next sequential line should be prefetched immediately from main store. To overcome the disadvantage mentioned, one system has included algorithms for prefetching a next sequential line from main storage to the high-speed buffer and algorithms for replacement of existing lines in the high-speed buffer which may be dynamically modified relative to the type of program being executed by the use of a system console unit. More particularly, the system includes an operating state register which corresponds to the variables of the prefetch control algorithm. Such variables are based upon references to preceding lines being requested.

While the above arrangement provides for variation as to accessing a next sequential line of data before a request is made, it has the disadvantages of basing the prefetch request upon an arbitrary circumstance relating to the particular byte or portion of a line being referenced by a previous request. While this is advantageous in certain types of operations, it could result in decreased performance in other cases. More specifically, automatic accesses can increase memory congestion.

Accordingly, it is a primary object of the present invention to provide an improved data processing system with a type of prefetch capability.

It is another object of the present invention to provide an improved data processing system with a prefetch capability suitable for use in either a high speed processing system or a multiprocessing environment.

SUMMARY OF THE INVENTION

The above objects and advantages of the present invention are accomplished in a preferred embodiment of the present invention which includes a data processing system including a high-speed buffer or cache unit which couples to at least one central processing unit and to a main store. In the preferred embodiment, the processing unit operates under microprogram control. The processing unit includes control logic circuits for establishing the different cycles of operation for the processing unit. Additionally, certain microinstruction words accessed during the execution of certain types of instructions are coded to specify a pre-read operation. Similarly, the control logic circuits also include means for generating a pre-read command to the cache unit for such instruction types.

The cache unit in response to each pre-read command is operative to fetch from main store a block of data specified by the instruction being executed when the data being requested has not been previously stored in the cache unit. In operation, during the execution of the certain types of program instructions, either the microprogram control or the control logic circuits, generates pre-read commands to the cache unit at predetermined points during the execution of such instructions. In this manner, the data normally required at a later point in the execution of an instruction can be fetched in advance from main store and stored in cache while other operations pertaining to that instruction are being carried out.

In the preferred embodiment of the present invention, the certain types of instructions include multiword instructions having a number of descriptor addresses which require considerable address preparation.

The novel features which are believed to be characteristic of the invention, both as to its organization and method of operation, together with further objects and advantages will be better understood from the following description when considered in connection with the accompanying drawings. It is to be expressly understood, however, that each of the drawings is given for the purpose of illustration and description only and is not intended as a definition of the limits of the present invention.

BRIEF DESCRIPTION OF THE DRAWINGS

FIGS. 3a through 3i show in greater detail the different blocks of FIG. 2.

FIG. 4 shows in greater detail the cache unit 750 of FIG. 2.

FIGS. 5a through 5e show the lines which comprise different ones of the interfaces of FIG. 1.

FIG. 6a illustrates the format of the control store control unit of FIG. 2.

FIG. 7 illustrates the data field of a second operand of an edit instruction used in explaining the operation of the present invention.

DESCRIPTION OF THE PREFERRED EMBODIMENT

General Description

Figure 1:
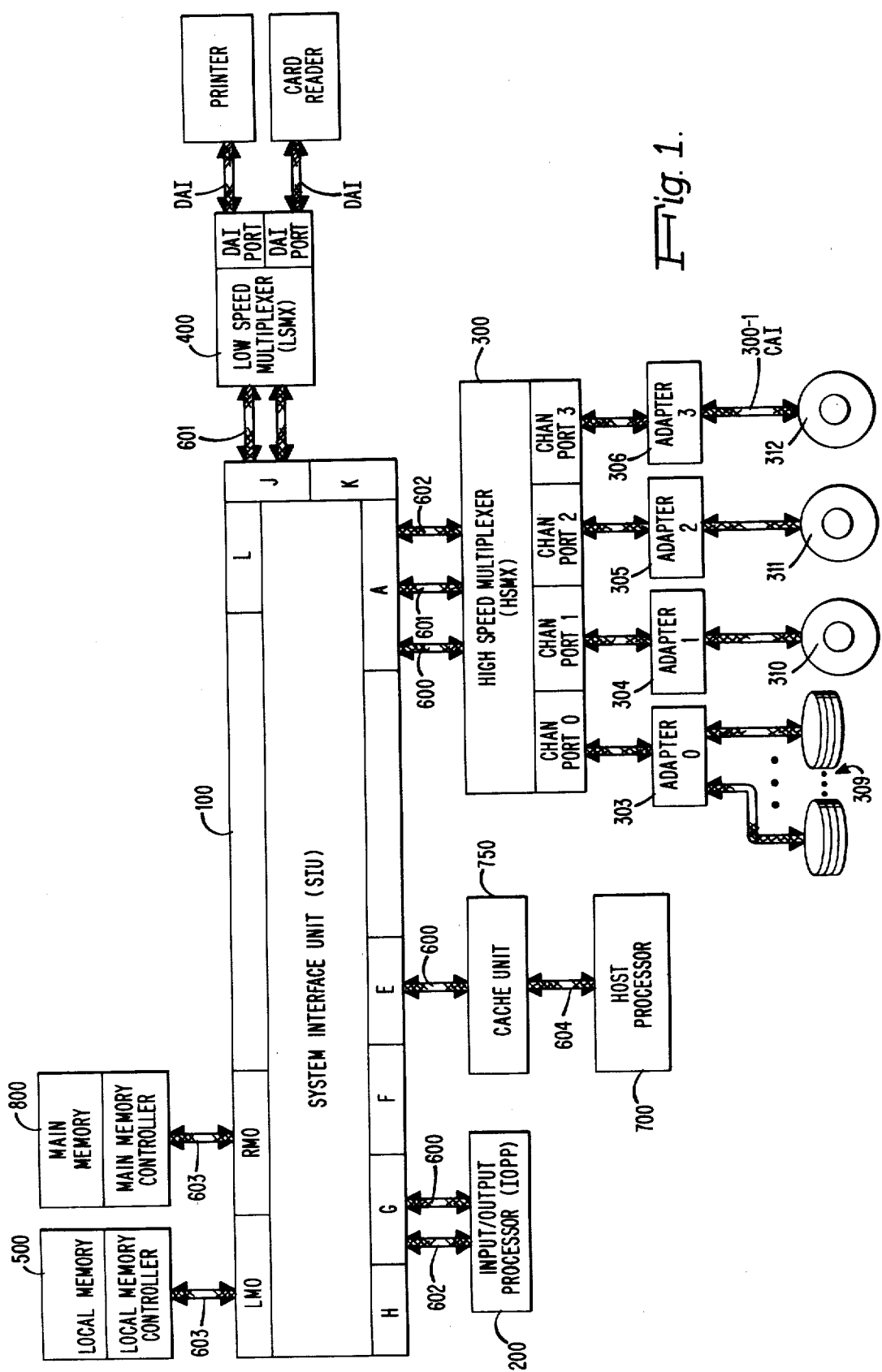
FIG. 1 illustrates in block form a system employing the principles of the present invention.

As seen from FIG. 1, the system which incorporates the principles of the present invention includes at least one input/output processor (IOPP) 200, a system interface unit (SIU) 100, a high-speed multiplexer (HSMX) 300, a low-speed multiplexer (LSMX) 400, a host processor 700, a cache memory 750, at least one memory module corresponding to a local memory module 500, and at least one memory module corresponding to a remote memory module 800. Different ones of these modules connect to one of a number of ports of the system interface unit 100 through a plurality of lines of different types of interfaces 600 through 603. More specifically, the input/output processor 200, the cache memory 750, and the high-speed multiplexer 300 connect to ports G, E and A, respectively, while the low-speed multiplexer 400, local memory module 500, and main memory module 800 connect to ports J, LMO and RMO, respectively. The host processor 700 connects to the cache memory 750.

The input/output system of FIG. 1 can be viewed as including a number of "active modules", "passive modules" and "memory modules". The IOP processor 200, host processor 700 and high-speed multiplexer 300 serve as active modules in that each has the ability to issue commands. The active modules normally connect to ports A through H while the host processor 700 connects to port E through the cache unit 750 via interface 604 and 600. A plurality of passive modules are connected to three ports J, K and L. These modules correspond to the low-speed multiplexer 400 and the system interface unit 100 and are units capable of intercepting and executing commands applied to the lines of interface 601 as described herein. The last group of modules constitutes local memory modules, and main memory modules capable of executing two different types of commands applied to the lines of interface 603.

The input/output system of FIG. 1 normally functions as an input/output subsystem responsive to input-/output instructions issued by the host processor 700. Ports E and F include interfaces for enabling connection of either multiplexer or processor modules of FIG. 1. These interfaces are described in greater detail herein.

For the purpose of the present invention, host processor 700 is conventional in design and may take the form of those units described in U.S. Pat. No. 3,413,613. In the preferred embodiment, the input/output processor 200 initiates and terminates channel programs required for the execution of input/output instructions, processes interrupt requests received from the system interface unit 100, and directly controls unit record peripheral devices coupled to low-speed multiplexer 400. The processor 200 connects to port G via the data interface 600 and interrupt interface 602.

The low-speed multiplexer 400, for the purposes of the present invention can be considered conventional in design, provides for attachment of low-speed peripheral devices via peripheral adapters, each of which couples to the lines of a device adapter interface (DAI). The interface and adapter may take the form of those units described in U.S. Pat. No. 3,742,457, which is assigned to the assignee of the present invention. The low-speed devices include card readers, card punches and printers. As seen from FIG. 1, the multiplexer 400 connects to port J via the programmable interface 601.

The high-speed multiplexer 300 directly controls transfers between the groups of disk devices and tapes devices 309 through 312, which connect to different ones of the channel adapters 303 to 306. Each of the channel controller adapters 303 through 306 which can connect up to a maximum of 16 devices to a different one of the channel ports 0 through 3 via the interface lines of a channel adapter interface (CAI) 300-1. The high-speed multiplexer 300 connects to port A corresponding to a data interface 600, a programmable interface 601 and an interrupt interface 602.

For the purposes of the present invention, each of channel controller adapters 302 through 305 may considered in design and take the form of control adapters described in the aforementioned U.S. Pat. 3,742,457.

System Interfaces

Before describing in detail the processor 700 cache unit 750, constructed in accordance with principles of the present invention, each of the interfaces through 604 discussed previously will now be described with reference to FIGS. 5a through 5e.

Figure 5A:
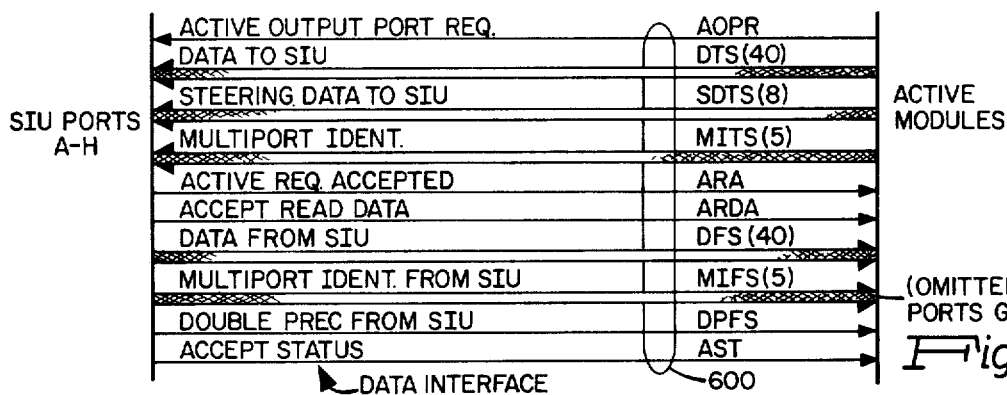

Referring first to FIG. 5a, it is seen that this figure discloses the lines which constitute the data interface 600 is one of the interfaces which provides for exchange of information between an active module and the system interface unit 100. Exchange is accomplished controlling the logical states of various signal lines accordance with pre-established rules implemented through a sequence of signals termed a "dialog".

As seen from FIG. 5a, the interface includes an active output port request line (AOPR), a plurality of data SIU lines (DTS 00-DTS 35, P0-P3), a plurality of steering data to SIU lines (SDTS 0-6, P), an active request accepted line (ARA), an accept read data line (ARD), a plurality of data from SIU bus lines (DFS 00-35, P3), a plurality of multiport identifier from SIU (MIFS 0-3, P), a double precision from SIU (DPFS), and an accept status line (AST). The description of the interface lines are given in greater detail in the section to follow.

| Designation | DATA INTERFACE LINES Description |
|---|---|
| AOPR | The active output port request line is an unidirectional line which extends from each of the active modules to the SIU 100 When set, this line signals the SIU that the module requests a transfer path over which commands or data are to be transmitted. |
| DTS 00-35, P0-P3 | The data path lines are a four byte wide unidirectional path (four to 10 bit bytes) that extends between each of the active modules and the SIU and are used for transferring commands or data from each active module to the SIU 100. |
| SDTS 0-6, P | The steering data to SIU lines extend from each active module to the SIU 100. These lines are used to apply steering control information to the SIU 100 when the line AOPR is set. Steering control information consists of seven bits and a parity bit which are coded as follows:<br>(a) The state of bit 0 indicates the type of command applied to the DTS lines (whether the command is a programmable interface command or a memory command).<br>(b) Bits 1–4 are coded to indicate which one of the modules is to receive and interpret the memory command (commands are interpreted only by memory modules and programmable interface commands shall be interpreted by all modules except input/output processor 200).<br>(c) The state of bit 5 indicates whether one or two words of the command information is to be transferred between the requesting active module |

| | DATA INTERFACE LINES -continued |
|---|---|
| Designation | Description |
| | and the designated receiving module (one word specifies a single precision transfer and two words specifies a double precision transfer). |
| | (d) The state of bit 6 indicates the direction of transfer between the requesting module and the designated receiver module. |
| | (e) Bit P is a parity bit generated by the requesting active module which is checked by apparatus included within the SIU 100. |
| MITS 0-3, P | The four multiport identifier to SIU lines extend from active module to the SIU 100. These lines are coded to indicate which subchannel or port within an active module caused the setting of line AOPR. |
| ARA | The active request accepted line extends from the SIU 100 to each of the active modules. This line is set to indicate that the designated receiving module has accepted the active module's request which allows the active module to remove the requested information from the data interface lines. |
| ARDA | The accept read data line extends from the SIU to each of the active modules. This line is set by the SIU 100 to indicate to the active module that it is to accept the previously requested data from a designated module. |
| DFS 00-35, P0-P3 | The data from SIU lines are another set of data path lines which are a four byte wide unidirectional path (four 10 bit bytes) which extends from the SIU to each active module. These sets of lines are used by the SIU 100 to convey read type data to a designated one of the active modules. |
| MIFS 0-3, P | The four multiport identifier lines plus odd parity line extend from the SIU 100 to each of the active modules. These lines are coded to indicate which port or subchannel on the active module is to accept the data of a previous read operation from the SIU 100. |
| DPFS | The double precision from SIU line extends from the SIU to each of the active modules. The state of this line indicates whether one or two words of read data are to be accepted by the active module to complete a transfer (read command). |
| AST | The accept status line extends from the SIU 100 to each active module. The state of this line which is mutually exclusive of line ARDA, signals the active module that it should accept status information applied to the DFS lines. |

Figure 5B:
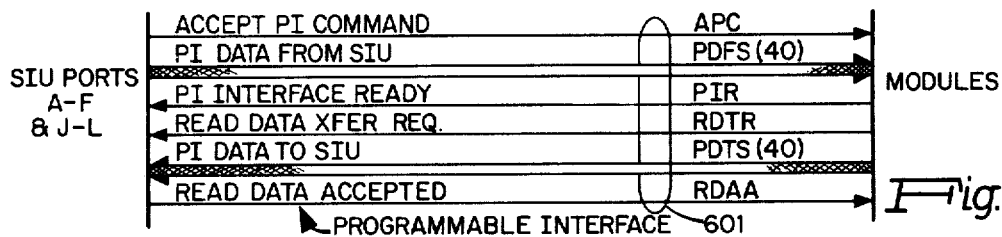

The lines of the programmable interface 601 shown in FIG. 5b provide for transfer of command information from an active module and a designated module. The transfer is accomplished by controlling the logic of states of the various signal lines in accordance with pre-established rules implemented through a sequence of signals termed dialog. The programmable interface includes an accept programmable interface command line (APC), a plurality of programmable interface data from SIU lines (PDFS 00-35, P0-P3), a programmable interface ready line (PIR), a read data transfer request line (RDTR), a plurality of programmable interface data to SIU lines (PDTS 00-35, P0-P3) and a read data accepted line (RDAA). The description of the interface lines are given in greater detail herein.

| PROGRAMMABLE INTERFACE LINES | |
|---|---|
| Designation | Description |
| APC | The accept programmable interface command line extends from the SIU 100 to each receiving module. When set, this line signals the module that command information has been applied to the PDFS lines of the interface by the SIU and is to be accepted by the module. |
| PDFS 00-35, P0-P3 | The programmable interface data from SIU lines are a four byte wide unidirectional path (four 10 bit bytes) that extend from the SIU 100 to each module. These lines apply programmable interface information from the system interface unit to a designated receiving module. |
| PIR | The programmable interface ready line extends from each module to the SIU. When set, this line indicates that the module is ready to accept a command to be applied to line PDFS. |
| PDTS 00-35, P0-P3 | The programmable interface data to the SIU lines are a four byte wide unidirectional path (four 10 bit bytes) that extends from each module to the SIU 100. These lines are used to transfer programmable interface information to the SIU. |
| RDTR | The read data transfer request line extends from each module connected to the programmable interface to the SIU 100. When set, this line indicates that the previously requested read data is available for transfer to a module and has been applied to the lines PDTS by the module. |
| RDAA | The read data accepted line extends from the SIU 100 to each module. When set, the line indicates to the module that the data applied to the lines PDTS has been accepted and that the module may remove the information from these lines. |

Figure 5C:
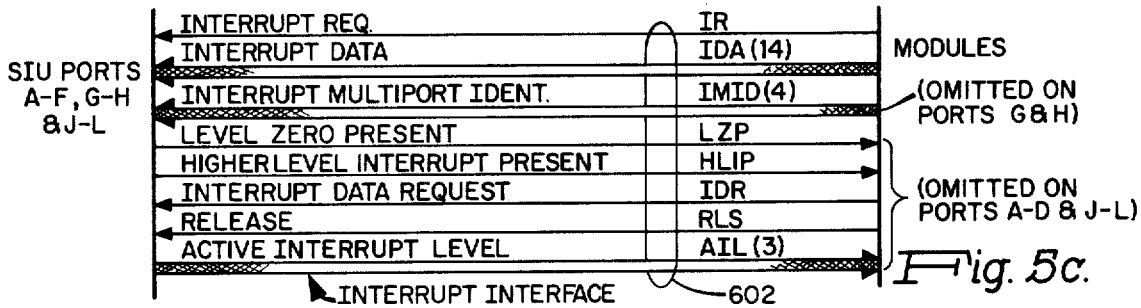

A further interface is the interrupt interface 602 of FIG. 5c which provides for interrupt processing by the input/output processor 200. That is, the interface enables the transfer of interrupt information by an active module to the SIU 100 as well as the transfer of interrupt information by the SIU 100 to the input/output processor 200 for processing. Similar to the other interfaces, the transfer of interrupt requests is accomplished by controlling the logical states of the various signal lines in accordance with pre-established rules implemented through a sequence of signals termed "dialog".

The interface includes an interrupt request line (IR), a plurality of interrupt data lines (IDA 00-11, P0-P1) and a plurality of interrupt multiport identifier lines (IMID 00-03) for modules connected to ports A through L. For modules connected to ports G and H, and interrupt interface further includes a level zero present line (LZP), a higher level interrupt present line (HLIP), an interrupt data request line (IDR), a release line (RLS) and a plurality of active interrupt level lines (AIL 0-2). As seen from FIG. 5c, the interrupt interface ports G and H do not include an interrupt multiport identifier line. The description of the interrupt interface lines are given in greater detail herein.

| INTERRUPT INTERFACE LINES | |
|---|---|
| Designation | Description |
| IR | The interrupt request line extends from each module to the SIU 100. When set, this line indicates to the SIU that it |

INTERRUPT INTERFACE LINES -continued

| Designation | Description |
|---|---|
| | requires service. |
| IDA 0-3, P0<br>IDA 4-11, P1 | The interrupt data lines extend from an active module to the SIU 100. These lines are coded to contain control information required to be transferred to the input/output processor when an interrupt request has been accepted by the processor. These bits are coded as follows:<br>(a) The state of bit 0 specifies to the SIU 100 which of the two processors (i.e., processor number) is to process the interrupt request.<br>(b) Bits 1-3 are coded to indicate the priority or level number of the interrupt request to the SIU 100.<br>(c) Bit P0 is a parity bit for bits 0-3.<br>(d) Bits 4-8 are coded to provide a portion of an address required to be generated by the input/output processor 200 for referencing the correct procedure for processing the interrupt (i.e., and interrupt control block number ICBN).<br>(e) Bit P1 is a parity bit for bits 4-11. |
| IMID 00-03 | The interrupt multiport identifier lines extend from each active module to the SIU 100. These lines are coded to identify which specific subchannel of the active module has requested interrupt service. |
| LZP | The level zero present line extends from the SIU 100 to the input/output processor 200. When set, this line indicates that there is a highest priority (level 0 interrupt) request being directed to the processor 200 by the SIU 100. |
| HLIP | The higher level interrupt present line extends from the SIU to the input/output processor. When set, this line indicates that there is an interrupt request having a higher level or priority than the procedure or process being executed by the processor 200. |
| IDR | The interrupt data request line extends from the input/output processor 200 to the SIU 100. When set, this line indicates that interrupt data is to be sent to the processor on lines DFS by the SIU 100. |
| RLS | The release line extends from the input/output processor 200 to the SIU 100. This line when set indicates that the processor 200 has completed execution of the current procedure. |
| AIL 0-2 | The active interrupt level lines extend from the SIU to the input/output processor 200. These lines are coded to designate the interrupt level number of the procedure being executed by the processor 200. |

Figure 5D:
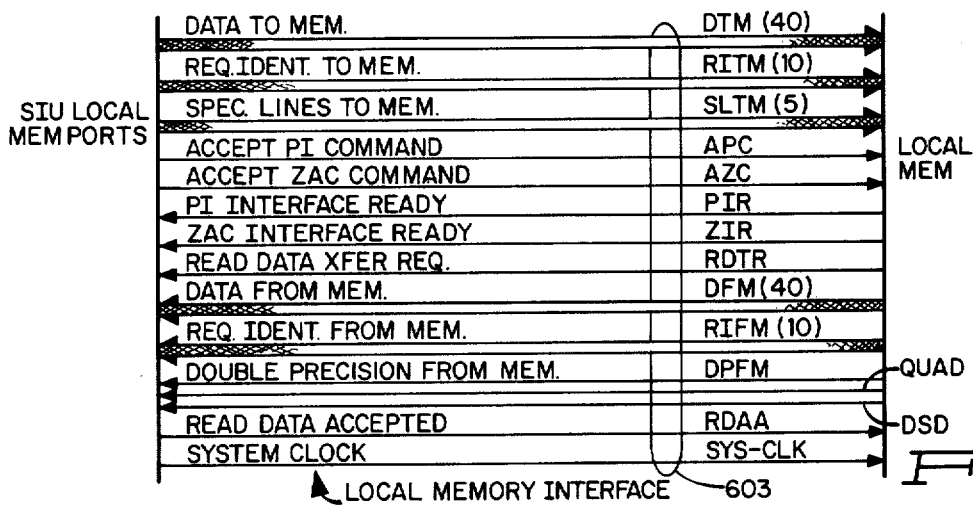

A next set of interface lines utilized by certain ones of the modules of FIG. 1 corresponds to the local memory interface lines of FIG. 5d. The local memory interface 603 provides for exchanging information between local memory 500 and the modules of the system. The exchange is accomplished by controlling logical states of the various signal interface lines in accordance with pre-established rules implemented through a sequence of signals termed a "dialog". The local memory interface includes a plurality of data to memory lines (DTM 00-35, P0-P3), a plurality of request identifier to memory lines (RITM 0-7, P0-P1), a plurality of specification lines to memory lines (SLTM 0-3, P), an accept P1 command line (APC), an accept ZAC command line (AZC), a P1 interface ready line (PIR), a ZAC interface ready line (ZIR), a read data transfer request line (RDTR), a plurality of data from memory lines (DFM 00-35, P0-P3), a plurality of request identifier from memory lines (RIFM 0-7, P0-P1), a double precision from memory lines (DPFM), a QUAD line, a read data accepted line (RDAA) and a system clock line (SYSCLK).

Memory and programmable interface commands are transferred out of the same physical data lines of the interface. The interface does not include a set of lines for processing interrupt requests and therefore the modules connected to the local memory by the SIU 100 cannot directly cause a memory interrupt. The description of the local memory interface lines are given in greater detail herein.

LOCAL MEMORY INTERFACE LINES

| Designation | Description |
|---|---|
| DTM 00-35,<br>P0-P3 | The data path lines constitute a four byte wide unidirectional path (36 information lines and four odd parity lines) that extends from the SIU 100 to the local memory 500. These lines are used to transfer memory or programmable interface commands to the local memory 500. |
| RITM 0-3, P0<br>RITM 4-7, P1 | The requestor identifier to memory lines constitute two groups of four lines which extend from the SIU 100 to the local memory 500. These lines are coded to convey information to the local memory identifying the module which initiated the command and are used to return the data requested to the proper module. |
| SLTM 0-3, P | The specification lines to memory extend from the SIU 100 to the local memory 500 and include two port number selection lines, a read/write to memory line, a double precision to memory line and a parity line. The information signals applied to these lines are coded as follows.<br>(a) Bits 0-1 are port number selection bits coded to specify which port or subchannel within the attached module is to receive or interpret the memory command sent to the module.<br>(b) Bit 2 is a read/write to memory bit which is included in the steering control information received from the active module which is forwarded by the SIU to the local memory 500 when a new command is sent to the memory by the SIU 100. The state of this bit indicates the direction of data transfer.<br>(c) Bit 3 is a double precision to memory bit coded to specify the amount of data to be transferred. It is also included in the steering control information provided by the active module which is forwarded to the local memory module 500 by the SIU 100 when a new command is sent to the memory module. |
| AZC | The accept ZAC command line extends from the SIU 100 to the local memory module 500. When set, this line signals the local memory module 500 to accept the ZAC command and control information applied to the other lines by the SIU 100. The setting of this interface line is mutually exclusive with the accept P1 command interface line. |
| APC | The accept programmable interface command line, as described in connection with the programmable interface, extends from the SIU 100 to the local memory module 500. When set, this line indicates that the |

LOCAL MEMORY INTERFACE LINES (continued)

| Designation | Description |
|---|---|
| | command information applied to the lines DTM is to be accepted by the local memory module 500. |
| PIR/ZIR | The programmable interface ready line/ZAC interface ready line extends from the local memory module 500 to the SIU 100. When set, each line signals the SIU 100 that the local memory module 500 is capable of accepting a programmable interface (PI)/memory (ZAC) command. |
| RDTR | The read data transfer request line extends from the local memory module 500 to the SIU 100. This line when set indicates that the read type data previously requested by a ZAC or PI command is available along with the necessary control information to be sent to the module requesting the data. |
| DFM 00-35, P0-P3 | The data from memory lines are a four byte wide unidirectional bus which extends from the local memory module 500 to the SIU 100. These lines are used to return read requested type data to an active module via the SIU 100. |
| RIFM 0-3, P0, RIFM 4-7, P1 | The two groups of requestor identifier from memory lines extend from the local memory module 500 to the SIU 100. These lines are coded for directing the read data back from module 500 to the requesting module. |
| DPFM and QUAD | The double precision from memory line and QUAD line extend from the local memory module 500 to the SIU 100. These lines are coded to indicate the number of words to be transferred via the SIU 100 to the requesting module during read data transfer request time interval. These lines are coded as follows:<br>QUAD DPFM<br>0    0    one word, single precision<br>0    1    two words, double precision<br>1    X<br>(don't care)   four words |
| DSD | The read data/status identifier line extends from the local memory module 500 to the SIU. The state of this line signals the SIU 100 whether the information applied to the lines DFM is read data or status information when line RDTR is set. When set, the line indicates status information of one or two words (QUAD=0) is being transferred. When reset to a binary ZERO, the line signals that up to four words of data are being transferred, the number specified by the coding of lines QUAD and DPFM. |
| RDAA | The read data accepted line as mentioned in connection with the programmable terminal extends from the SIU 100 to the local memory module. When set, this line signals the memory module that the data applied on the interface lines by the local memory module has been accepted and that the local memory module may remove data from these lines. |
| SYS-CLK | The system clock line is a line which extends from the SIU 100 to each module of the system. This line is connected to a clock source included within the input/output processor 200 to synchronize the operations of each memory module from a common system clock source. |

A last set of interface lines utilized as an internal interface between the cache unit 750 and central processor 700 corresponds to the cache/CPU interface lines of FIG. 5e. The interface 604 provides for exchanging information and control signals between the processor 700 and the cache unit 750. The exchange is accomplished by controlling the logical states of the various signal interface lines. The cache/CPU interface includes a plurality of data to processor lines (ZDI 0-35, P0-P3), a plurality ZAC and write data lines (ZADO 0-23, RADO 24-35, P0-P3), a processor request signal line (DREQ-CAC), a plurality of cache command lines (DMEM 0-3), a hold cache line (HOLD-C-CU), a cancel line (CANCEL-C), a flush line (CAC-FLUSH), a read request line (RD-EVEN), a read instruction buffer line (RD-IBUF), a read data buffer line (DNOS), an initialization pointer line (INIT-IBUF), a plurality of instruction lines (ZIBO-35, P0-P3), a plurality of address pointer lines (ASFA-32-33), a control line (DSZ), a read I-buffer data line (RD-IBUF/ZDI), a plurality of zone bit lines (DZD 0-3), a bypass cache line (BYP-CAC), a write signal line (WRT-SGN), an instruction buffer empty line (IBUF-EMPTY), an instruction buffer ready line (IBUF-RDY), an instruction buffer full line (IBUF-FULL), a CP stop line (CP-STOP), and a CP control line (DATA-RECOV).

Instructions, cache commands and data are forwarded to the cache unit 750 via different ones of these lines. Additionally, the operation of the processor 700 is enabled or disabled by certain ones of these lines as explained herein. The description of the CPU/cache interface lines are given in greater detail herein.

CPU/CACHE INTERFACE LINES

| Designation | Description |
|---|---|
| DREQ-CAC | This line extends from the processor 700 to cache unit 750. When the DREQ-CAC is set to a binary ONE, a ZAC command is transferred to the cache 750. In the case of a write ZAC command, write data words are transferred in the one or two cycles following the ZAC command and data words are sent from the processor 700 through the cache 750 without modification, to the SIU 100. |
| DMEM 0,1,2,3 | These lines extend from the processor 700 to cache 750. These lines are coded to designate the command that the cache 750 is to execute. The coding is as follows:<br>DMEM=0010 0-3 - Address Wraparound Command<br>(ADD-WRAP) The address wraparound command is executed in 2 cycles. At the start of the first cycle, data and command information is transferred to the cache 750. The processor 700 is then turned off before the next clock interval. During the second cycle, the processor is turned on and at the end of the cycle the data given to it is made available to the processor 700.<br>DMEM=0100 0-3 - Load Instruction Buffer Instruction Fetch 1 (LD-IBUF-IF1) The load instruction buffer command is executed in one cycle. At the start of the cycle, address and command information is transferred to the cache 750. At the end of the cycle, the block specified by the address is written into the instruction buffer at a previously designated instruction buffer address, and the addressed word is transferred to the processor 700 via the ZDI lines 0-35.<br>DMEM=0101 0-3 - Load Instruction Buffer Instruction Fetch 2 (LD-IBUF-IF2) The load instruction buffer command is executed in one cycle. At the start of the cycle, address and command information is transferred to the cache 750. At the end of the cycle, the block specified by the address is written into the instruc- |

CPU/CACHE INTERFACE LINES

| Designation | Description |
|---|---|
| | tion buffer at the previously designated instruction buffer address. |
| | DMEM=0110 - Load Quad |
| | The load quad is executed in one cycle. Same as IF2 but data goes to another portion of the I Buffer. |
| | DMEM=0111 0-3 - Preread (PR-RD) The preread command is executed in a variable number of cycles with a minimum of one. At the start of the first cycle, address and command information are transferred to cache 750. During the first cycle, when the address specified is that of a block which is in the cache 750, the preread operation terminates and no other action is taken. If the addressed block is not in the cache 750, then at the end of the first cycle, the request is transferred to the main memory. When the requested block has been read from main memory, the data is stored in the cache 750. |
| | DMEM=1000 0-3 - Read Single (RD-SNG) The read single command is executed in one cycle. At the start of the cycle, address and command information are given to the cache 750 and at the end of the cycle the data made available to processor 700. |
| | DMEM=1001 0-3 - Read Clear (RD-CLR) The read clear command is executed in a variable number of cycles with a minimum of 9. At the start of the first cycle, address and command information are transferred to the main memory, and the processor is turned off. During the second cycle, when the addressed word is contained in a cache the block containing the word is fetched from the cache 750. When the requested word has been read from main memory and transferred to the cache 750, then the processor is turned on. |
| | DMEM=1010 0-3 - Read Double Odd (RD-DBL-φ) (line DSZ is a binary ZERO) The read double odd command is executed in two cycles. At the start of the first cycle, address and command information are transferred to the cache 750. At the end of the first cycle, the word at the odd address is made available to the processor 700. At the end of the second cycle, the word at the even address is made available to the processor. |
| | DMEM=1010 0-3 - Read Double Even (RD-DBL-E) (line DSZ is a binary ONE) The read double even command is executed in two cycles. At the start of the first cycle, address and command information are transferred to cache 750. At the end of the first cycle the word at the even address is made available to the processor 700. At the end of the second cycle, the word at the odd address is made available to the processor 700. |
| | DMEM=1011 0-3 - Read Remote (RD-RMT) The read remote command is executed in a variable number of cycles, with a minimum of 10. At the start of the first cycle, address and command information are transferred to cache 750. At the end of the first cycle, the request is transferred to the main memory and the processor 700 is turned off. When the requested word pair has been fetched from memory, processor 700 is turned on and the data is made available to it. |
| | DMEM=1100 0-3 - Write Single (WRT-SNG) |

CPU/CACHE INTERFACE LINES

| Designation | Description |
|---|---|
| | The write single command is executed in two cycles. At the start of the first cycle, address and command information is transferred to the cache 750. At the start of the second cycle, the data is transferred to the cache 750. During the second cycle, the data is written into the cache 750, if the block which contains the addressed word is stored in the cache 750. During the end of the second cycle, the write request and the data is transferred to the main memory. |
| | DMEM=1110 0-3 - Write Double (WRT-DBL) The write double command is executed in three cycles. At the start of the first cycle, address and command information are transferred to the cache 750. At the start of the second (third) cycle the even (odd) data word is transferred to the cache 750. During the third cycle, the data is written into the cache, if the block which contains the addressed word pair is stored in the cache 750. At the end of the third cycle, the write request and both data words will have been passed on to the main memory. |
| | DMEM=1111 0-3 - Write Remote (WRT-RMT) The write remote command is executed in three cycles. At the start of the first cycle, address and command information are transferred to the cache 750. At the end of the first cycle, the request is transferred to the main memory. During the next two cycles, the 2 data words are transferred to the cache 750 which transfers same to main memory. |
| HOLD-C-CU | This line extends from processor 700 to cache 750. When set to a binary ONE, this control signal specifies that the cache 750 is to assume a HOLD state for requests or data transfers. |
| CANCEL-C | This line extends from processor 700 to cache 750. When set to a binary ONE, this control signal aborts any request made to cache 750. |
| CAC-FLUSH | This line extends from processor 700 to cache 750. When set to a binary ONE, it starts a flush of the cache 750. |
| RD-EVEN | This line extends from processor 700 to cache 750. When the cache makes a double word request to the SIU, the even word is saved in a special register. When RD-EVEN line is set to a binary ONE, the contents of this register are gated onto the ZDI lines. |
| ZAD0 0-23, RAD0 24-35 P0-P3 | These 40 unidirectional lines extend from processor 700 to cache 750. The lines are used to transfer ZAC command and write data words to the cache 750. |
| RD-IBUF | This line extends from the processor 700 to cache 750. When set to a binary ONE, the line causes an instruction buffer out pointer to increment for processing a next instruction in accordance with the state of a line DRDB as follows. |
| DZD 0-3 | These four lines extend from processor 700 to cache 750. These lines transfer odd word zone bit signals for write double commands. |
| BYP-CAC | This line extends from processor 700 to cache 750. When set to a binary ONE, this line causes the cache 750 to request data words from main memory for read type instructions. |
| WRT-SGN | This line extends from the cache 750 to processor 700. It is used to signal the processor 700 during write commands that the cache 750 has completed the transfer |

CPU/CACHE INTERFACE LINES -continued

| Designation | Description |
|---|---|
| | of ZAC commands and data words to the SIU 100. |
| ASFA 32-33 | These two lines extend from processor 700 to cache 750. These lines are coded to specify the next word of a block stored in the I buffer to be read out to the processor 700 when the I buffer is initialized under hardware control via the INIT IBUF line. |
| INIT-IBUF | The initialize instruction buffer command is executed in one cycle. At the end of the cycle, a buffer in pointer is reset to ZEROS and the buffer out pointer is loaded with an initial value. |
| DSZ1 | This line extends from the processor 750 to cache 750. The state of this line specifies to cache 750 the order in which words are to be sent to the processor 700 when a read double command is performed. |
| DRDB100 | This line extends from the processor 700 to cache 750. It is used as the most significant bit of the I Buffer read address. |
| RD-IBUF/ZDI | This line extends from processor 700 to cache 750. It causes the cache 750 to apply the data on the ZIB lines to the ZDI lines. |
| ZDI 0-35 $P_0, P_1, P_2, P_3$ | These 40 unidirectional lines extend from cache 750 to processor 700. They apply data from the cache 750 to the processor 700. |
| ZIB 0-35 $P_0, P_1, P_2, P_3$ | These 40 unidirectional lines extend from cache 750 to processor 700. They apply instructions from the cache Instruction Buffer to the processor 700. |
| I BUF-EMPTY | This line extends from cache 750 to processor 700. When set to a binary ONE, this line indicates that the Instruction Buffer contains no instructions at this time. |
| I BUF-RDY | This line extends from cache 750 to processor 700. When set to a binary ONE, the line indicates that the Instruction Buffer contains at least one instruction. |
| I BUF-FULL | This line extends from cache 750 to processor 700. This line indicates that the Instruction Buffer contains more than four instructions or it has at least one instruction and an outstanding instruction fetch request line. |
| CP STOP | This line extends from cache 750 to processor 700. When forced to a binary ONE state, the line signals that as a result of special conditions detected within the cache unit 750, the processor 700 is required to wait or halt its operation while the cache unit 750 resolves the special conditions. |
| DATA-RECOV | This line extends from the cache 750 to processor 750. It is used to re-strobe processor registers following the stopping of the processor 700 in response to the detection of a cache miss condition. |

While FIGS. 5a through 5e show lines which connect the different modules of the system of FIG. 1 to SIU 100 in addition to the connection to processor 700 and cache unit 750, it will be appreciated that other lines are also included for signalling other conditions, as for example, certain error conditions and operational conditions. For further descriptions of the various modules of FIG. 1, reference may be made to U.S. Pat. No. 4,000,487. Now, the processor module 700 and cache unit 750 will be described in greater detail.

Figure 2:
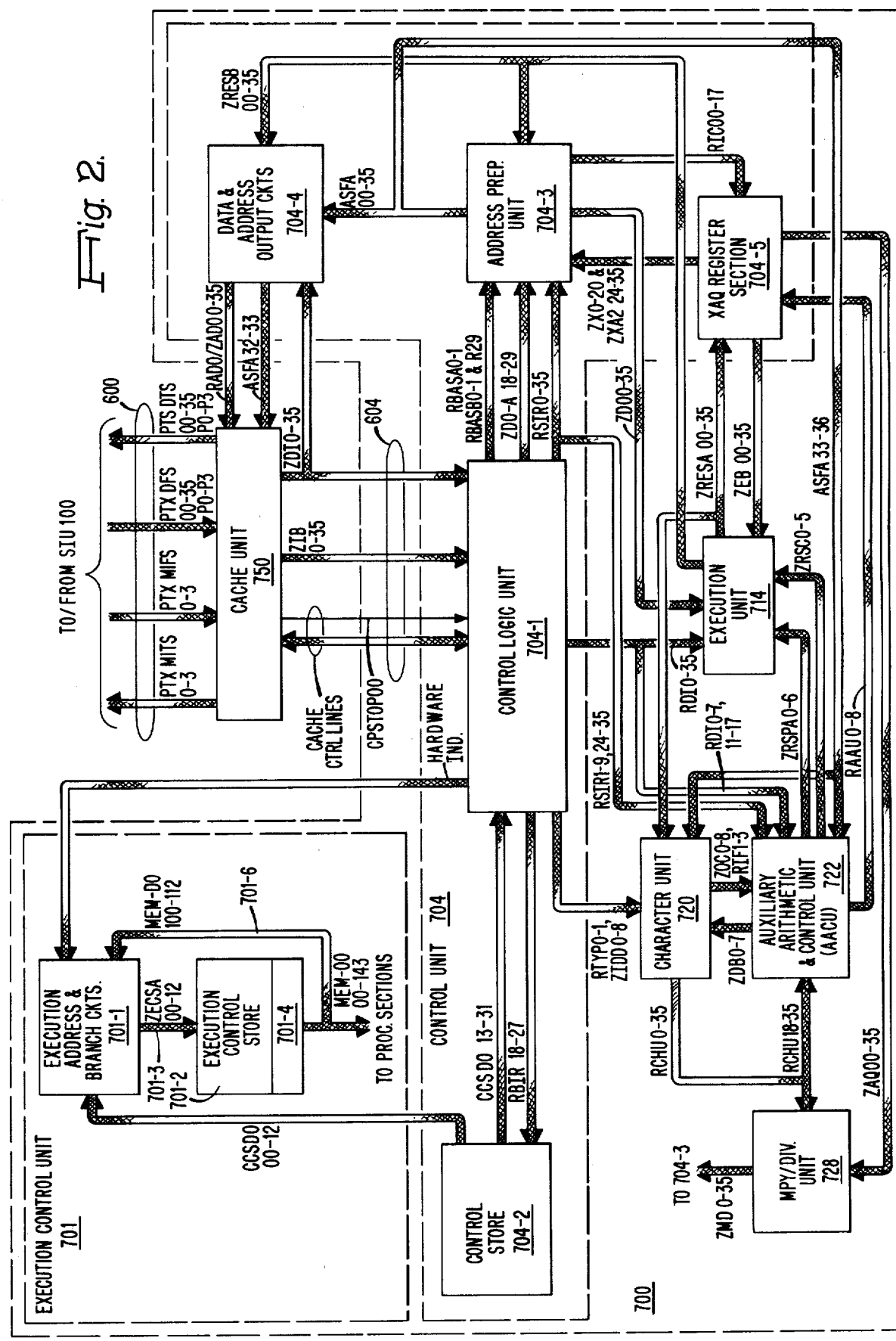
FIG. 2 shows in block diagram form the host processor 700 and the cache memory 750 of FIG. 1.

General Description of Processor 700-FIG. 2

Referring to FIG. 2, it is seen that the host processor 700 includes an execution control unit 701, a control unit 704, an execution unit 714, a character unit 720, an auxiliary arithmetic and control unit (AACU) 722, and a multiply-divide unit 728, which are interconnected as shown. Additionally, the control unit 704 has a number of interconnections to the cache unit 750 as shown.

The execution control unit 701 includes an execution control store address preparation and branch unit 701-1, and an execution control store 701-2. The store 701-2 and unit 701-1 are interconnected via buses 701-3 and 701-6 as shown.

The control unit 704 includes a control logic unit 704-1, a control store 704-2, an address preparation unit 704-3, data and address output circuits 704-4, and an XAQ register section 704-5 which interconnect as shown.

As seen from FIG. 2, the SIU interface 600 provides a number of input lines to the cache unit 750. The lines of this interface have been described in detail previously. However, in connection with the operation of cache unit 750, certain ones of these lines are specially coded as follows.

1. MITS 0-3 for Reads are coded as follows:
   bits 0-1=00;
   bits 2-3=Read ZAC buffer address;
   For Write Operation bit 0-3=Odd word zone
2. MIFS lines are coded as follows:
   bit 0=0;
   bit 1=0 even word pairs (words 0,1);
   bit 1=1 odd word pairs (words 2,3);
   bits 2-3=ZAC buffer address to memory.

As concerns the interface lines DFS 00-35, P0-P3, these lines convey read data to cache unit 750. The lines DTS 00-35, P0-P3, are used to transfer data from cache 750 to the SIU 100.

The control unit 704 provides the necessary control for performing address preparation operations, instruction fetching/execution operations and the sequential control for various cycles of operation and/or machine states. The control is generated by logic circuits of block 704-1 and by the execution control unit 701 for the various portions of the control unit 704.

The XAQ register section 740-5 includes a number of program visible registers such as index registers, an accumulator register, and quotient register. This section will be discussed in greater detail with reference to FIG. 3. Other program visible registers such as the instruction counter and address registers are included within the address preparation unit 704-3.

As seen from FIG. 2, the section 704-5 receives signals from unit 704-3 representative of the contents of the instruction counter via lines RIC 00-17. Also, lines ZRESA 00-35 apply output signals from the execution unit 714 corresponding to the results of operations performed upon various operands. The section 704-5 also receives an output signal from the auxiliary arithmetic and control unit via lines RAAU0-8.

The section 704-5 provides signals representative of the contents of one of the registers included within the section as an input to the address preparation unit 704-3. The address preparation unit 704-3 forwards the information through a switch to the execution unit 714 via the lines ZDO 0-35. Similarly, the contents of certain ones of the registers contained within section 704-5 can be transferred to the execution unit 714 via the lines ZEB 00-35. Lastly, the contents of selected ones of these registers can be transferred from section 704-5 to the multiply/divide unit 728 via the lines ZAQ 00-35.

The address preparation unit 704-3 generates addresses from the contents of various registers contained therein and applies the resultant logical, effective and/or absolute addresses for distribution to other units along the lines ASFA 00-35. The address preparation unit 704-3 receives the results of operations performed on a pair of operands by the execution unit 714 via the lines ZRESB 00-35. The unit 704-3 receives signals representative of the contents of a pair of base pointer registers from the control logic unit 701 via the lines RBASA and RBASB0-1. Outputs from the multiply/divide unit 728 are applied to the address preparation unit 704-3. Lastly, the contents of a secondary instruction register (RSIR) are applied as input to the unit 704-13 via the lines RSIR 00-35.

The data and address output circuits 704-4 generate the cache memory address signals which it applies to the cache unit 750 via the lines RAD0/ZAD0 00-35. These address signals correspond to the signals applied to one of the sets of input lines ZDI 00-35, ASFA 00-35 and ZRESB 00-35 selected by switches included within the circuits of block 704-4. Also, word address signals are applied via the lines ASFA 32-33. These circuits will be further discussed herein in greater detail.

The control logic unit 704-1 provides data paths which have an interface with various units included within the cache unit 750. As described in greater detail herein, the lines ZIB 00-35 provide an interface with an instruction buffer included within the cache 750. The lines ZDI 00-35 are used to transfer data signals from the cache 750 to the control logic unit 704-1. Other signals are applied via the other data and control lines of the cache-CPU interface 604. These lines include the CP stop line shown separately in FIG. 2.

As seen from FIG. 2, the control logic unit 704-1 provides a number of groups of output signals. These output signals include the contents of certain registers, as for example, a basic instruction register (RBIR) whose contents are applied as an input to control store 704-2 via the lines RBIR 18-27. The control logic unit 704-1 receives certain control signals read out from control store 704-2 via the lines CCSD0 13-31.

The control logic unit 704-1 also includes a secondary instruction register (RSIR) which is loaded in parallel with the basic instruction register at the start of processing an instruction. The contents of the secondary instruction register RSIR 00-35, as previously mentioned, are applied as inputs to the address preparation unit 704-3. Additionally, a portion of the contents of the secondary instruction register is applied as input to the auxiliary arithmetic control unit 722 via the lines RSIR 1-9 and 24-35.

The control store 704-2 as explained herein provides for an initial decoding of program instruction op-codes and therefore is arranged to include a number of storage locations (1024), one for each possible instruction op-code.

As mentioned, signals applied to lines RBIR 18-27 are applied as inputs to control store 704-2. These signals select one of the possible 1024 storage locations. The contents of the selected storage location are applied to the lines CCSD0 13-31 and to CCSD0 00-12 as shown in FIG. 2. The signals supplied to lines CCSD0 00-12 correspond to address signals which are used to address the execution control unit 701 as explained herein.

The remaining sections of processor 700 will now be briefly described. The execution unit 714 provides for instruction execution wherein unit 714 performs arithmetic and/or shift operations upon operands selected from the various inputs. The results of such operations are applied to selected outputs. The execution unit 714 receives data from a data input bus which corresponds to lines RDI 00-35 which have as their source the control logic unit 704-1. The contents of the accumulator and quotient registers included within section 704-5 are applied to the execution unit 714 via the lines ZEB 00-35 as mentioned previously. The signals applied to the input bus lines ZDO 00-35 from the address preparation unit 704-3 are applied via switches included within the execution unit 714 as output signals to the lines ZRESA 00-35 and ZRESB 00-35, as shown in FIG. 2. Additionally, execution unit 714 receives a set of scratch pad address signals from the auxiliary arithmetic and control unit 722 applied via the lines ZRSPA 00-06. Additionally, the unit 722 also provides shift information to the unit 714 via the lines ZRSC 00-05.

The character unit 720 is used to execute character type instructions which require such operations as translation and editing of data fields. As explained herein, these types of instructions are referred to as extended instruction set (EIS) instructions. Such instructions which the character unit 720 executes include the move, scan, and compare type instructions. Signals representative of operands are applied via lines ZRESA 00-35. Information as to the type of character position within a word and the number of bits is applied to the character unit 720 via the input lines ZDB 00-07.

Information representative of the results of certain data operations is applied to the unit 722 via the lines ZOC 00-08. Such information includes exponent data and data in hexadecimal form. The character unit 720 applies output operand data and control information to the unit 722 and the unit 728 via the lines RCHU 00-35.

The auxiliary arithmetic and control unit 722 performs arithmetic operations upon control information such as exponents used in floating point operations, calculates operand lengths and pointers and generates count information. The results of these operations are applied to execution unit 714 via the lines ZRSPA 00-06 and lines ZRSC 00-06 as mentioned previously. Information signals corresponding to characters such as 9-bit characters, 6-bit characters, decimal data converted from input hexadecimal data, quotient information and sign information are applied to section 704-5 via the lines RAAU 00-08.

As seen from FIG. 2, the unit 722 receives a number of inputs. Character pointer information is applied via the lines ASFA 33-36. EIS numeric scale factor information and alphanumeric field length information are applied to the unit 722 via the lines RSIR 24-35. Other signals relating to fetching of specific instructions are applied via the lines RSIR 01-09. Exponent signals for floating point data are applied to the unit 722 via the lines ZOC 00-08 while floating point exponent data signals from unit 704-1 are applied via the lines RDI 00-08. Shift count information signals for certain instructions (e.g. binary shift instructions) are applied to the unit via the lines RDI 11-17. As concerns the input signals applied to the lines RCHU 00-35, lines 24-35 apply signals corresponding to the length of EIS instruction fields while 18-23 apply address modification signals to the unit 722.

The last unit is the multiply/divide unit 728 which provides for high-speed execution of multiply and divide instructions. This unit may be considered conventional in design and may take the form of the multiply unit described in U.S. Pat. No. 4,041,292 which is assigned to the same assignee as named herein. The unit 728 as seen from FIG. 2 receives multiplier dividend and divisor input signals via the lines RCHU 00-35. The multiplicand input signals from register section 704-5 are applied via the lines ZAQ 00-35. The results of the calculations performed by the unit 728 are applied as output signals to the lines ZMD 00-35.

As mentioned previously, the cache unit 750 transfers and receives data and control signals to and from the SIU 100 via the data interface line 600. The cache unit 750 transfers and receives data and control signals to and from the processor 700 via the lines of interface 604. Lastly, the cache unit 750 receives address and data signals from the circuits 704-4 via the lines RAD0-/ZAD0 00-35 and the lines ASFA 32-33.

Detailed Description of the Processor 700

The various sections which comprise the processor 700 illustrated in FIG. 2 will now be discussed in greater detail with respect to FIGS. 3a through 3i.

Figure 3A:
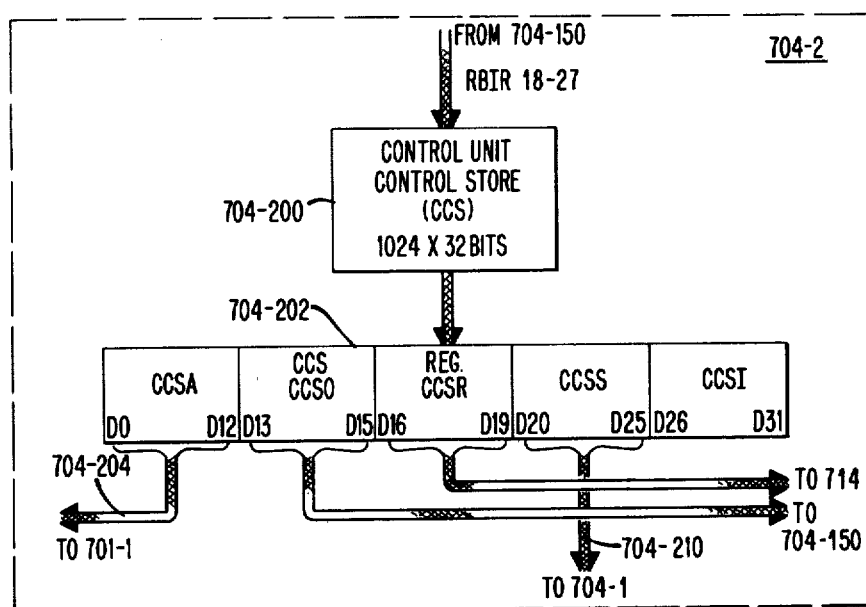
Figure 3E:
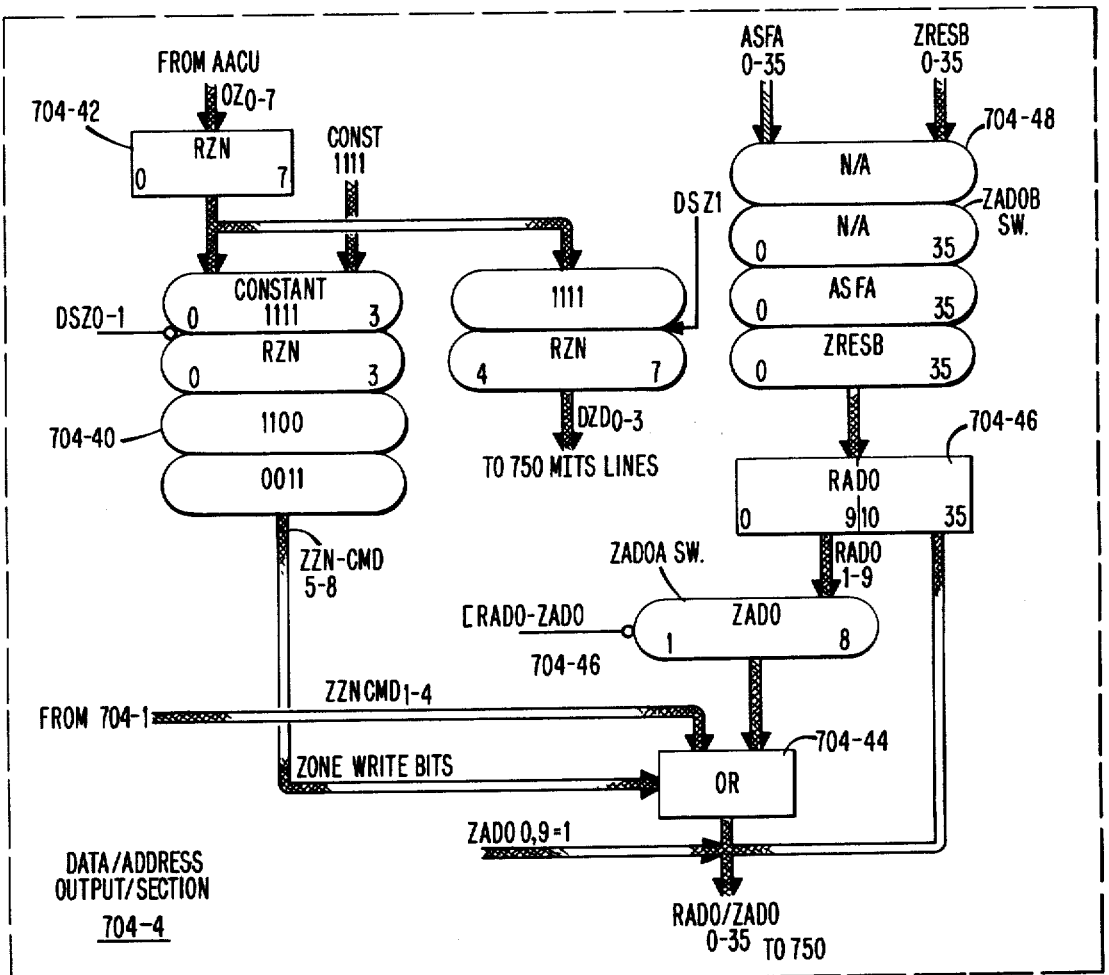
Figure 3B:
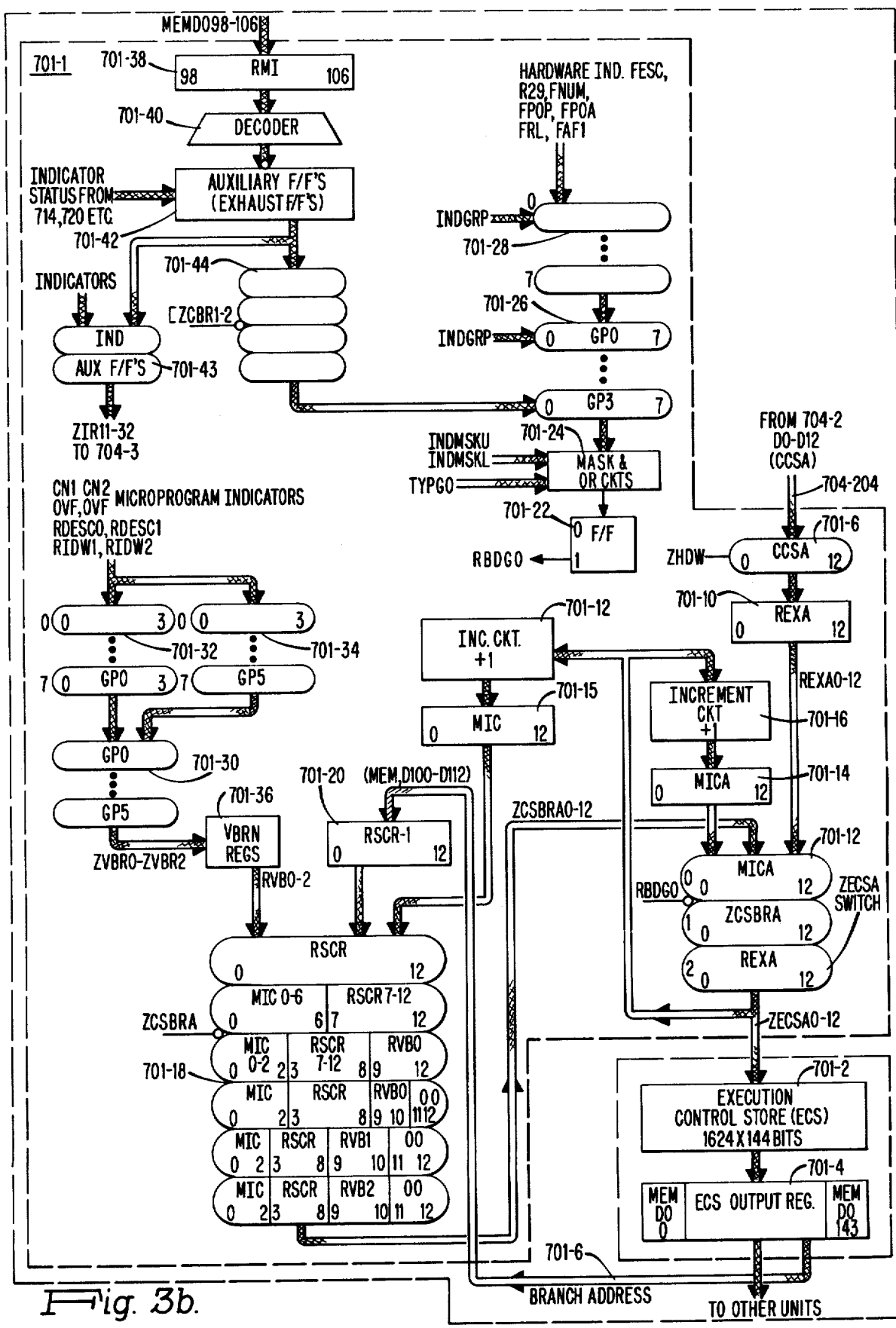

Referring to FIGS. 3a and 3b, it is seen that the processor includes two control stores: (1) the control unit control store (CCS) 704-200 which forms part of the control unit 704; and (2) the execution control store (ECS) 701-3 which is included within the execution control unit 701. To understand the operation of the control store arrangement, it is helpful to briefly discuss the three-stage pipeline arrangement of processor 700. This means that the processor requires at least three processor cycles to complete the processing of a given program instruction and can issue a new instruction at the beginning of each cycle.

Thus, a number of instructions may be in some stage of processing at any given point in time. The three pipeline stages include an instruction cycle (I) wherein instruction interpretation, op-code decoding and address preparation take place; a cache cycle (C) wherein access to the cache unit 750 is made; and an execution cycle (E) wherein instruction execution takes place. As concerns control, during the I cycle, the op-code of the instruction applied via lines RBIR 18-27 is used to access a location within control store 704-2. During a C cycle, the accessed contents from control store 704-2 are applied to lines CCS D0 00-12 and in turn used to access one of the storage locations of the execution control store 701-2. During the C cycle, the microinstructions of the microprogram used to execute the instruction are read out from the execution control store 701-2 into a 144-bit output register 701-4. The signals designated MEMD0 00-143 are distributed to the various functional units of processor 700. During an E cycle, the processor executes the operation specified by the microinstructions.

Referring specifically to FIG. 2, it is seen that the control store 704-2 includes a control unit control store (CCS) 704-200 which is addressed by the op-code signals applied to the lines RBIR 18-27. The CCS 704-200, as mentioned previously, includes 1024 storage locations, the contents of which are read out into an output register 704-202 during an I cycle of operation. FIG. 6a shows schematically the format of the words stored within the control store 704-200.

Referring to FIG. 6a, it is seen that each control unit control store word includes five fields. The first field is a 13-bit field which contains an ECS starting address location for the instruction having an op-code applied to lines RBIR 18-27. The next field is a three bit field (CCS$\phi$) which provides for the control of certain operations. The bit interpretations of this field depend upon its destination and whether it is decoded by specific logic circuits or decoded under microprogram control. The next field is a 4-bit field which provides for certain register control operations.

The next field is a 6-bit sequence control field which is coded to specify a sequence of operations to be performed under hardwired logic circuit control as well as the type of cache operation. In the present example, this field is coded as $75_8$. The last field is a 6-bit indicator field which is not pertinent to an understanding of the present invention.

As seen from FIG. 3a, signals corresponding to the CCSA field of a control unit control store word are applied via a path 704-204 as an input to the execution generation circuits 701-7. Signals corresponding to the CCSR field are applied as an input to the execution unit 714 via path 704-206. Additionally, the same signals are applied as an input to the address preparation unit 704-3 via another path 704-208.

Signals representative of the sequence control field apply as an input to the sequence control logic circuits 704-100 via path 704-210. As explained herein, these circuits decode the sequence control field and generate signals for conditioning the cache unit 750 to perform the operation designated.

As mentioned previously, the execution address generation circuit 701-1 receives an input address which corresponds to field CCSA from the control store 704-2. As seen from FIG. 3b, these circuits include an input address register 701-10 whose output is connected to one position of a four position switch 701-12 designated ZECSA. The output of the switch serves as an address source for the control store 701-2. The first position of the switch 701-12 is connected to receive an address from the MICA register 701-14. The contents of register 701-14 are updated at the end of each cycle to point to the location within the ECS control store following the location whose contents were read out during that cycle.

The second position selects the address produced from the ICSBRA branch address selector switch 701-18. The third position selects the address of the first microinstruction in each microprogram provided by the CCS control store which is loaded into the REXA register 701-10. When the CCS output is not available at the termination of a microprogram, a predetermined address (octal address 14) is automatically selected.

The first position of branch switch 701-18 receives signals corresponding to a branch address read out from store 701-2 into register 701-4 which is in turn forwarded to a return control register 701-20. The second, third and fourth positions of switch 701-18 receive signals from RSCR register 701-20, an MIC register 701-15 and the contents of a number of vector branch registers 701-36. The MIC register 701-15 stores an address which points to the microinstruction word following the microinstruction word being executed. This address corresponds to the address from switch 701-12 incremented by one by an increment circuit 701-12.

The vector branch registers include a 4-bit vector branch register 0 (RVB0), a 2-bit vector branch register 1 (RVB1) and a 2-bit vector branch register 2 (RVB2). These registers are loaded during a cycle of operation with address values derived from signals stored in a number of different indicator flip-flops and registers applied as inputs to the number of groups of input multiplexer selector circuits 701-32 and 701-34. The outputs of the circuits 701-32 and 701-34 are applied as inputs to two position selector circuits 701-30. These circuits in turn generate the output signals ZVBR0, ZVBR1 and ZVBR2 which are stored in the registers 701-36.

The switch 701-36 provides an address based upon the testing of various hardware indicator signals, state flip-flop signals selected via an INDGRP field. The branch decision is determined by masking (ANDING) the selected indicator set with the INDMSKU and INDMSKL fields of a microinstruction word. If a vector branch is selected, INDMSKU is treated as 4 ZERO bits. The "OR" of the 8 bits is compared to the state defined by the TYPG and GO microinstruction fields. The hardware signals are applied via a number of data selector circuits 701-28 only one of which is shown whose outputs are in turn applied as inputs to a further five position multiplexer selector circuit 701-26. The output of the multiplexer circuit 701-26 feeds a comparison circuit which "ands" the indicator signals with the mask signals to produce the resulting signals MSKCBR0-7.

The signals MSKCBR0-7 are applied to another comparison circuit which "ands" the signals with the condition branch test signals TYPGGO to set or reset a branch decision flip-flop 701-22 which produces a signal RBDGO whose state indicates whether branching is to take place. The output signal RBDGO is applied as a control input to the first two positions of switch 701-12. When the branch test condition is not met (i.e., signal RBDGO=0), then the incremented address from the MICA register 701-14 is selected.

In some instances, as seen herein, it is not possible to test the state of an indicator on the cycle following its formation. For this reason, history registers HR0-HR7, not shown, are provided for register storage of the Group 2 indicators. The states of such stored indicators are selected and tested in a manner similar to that of the other indicators (i.e., mask fields).

Additionally, the unit 701-1 includes a number of indicator circuits, certain ones of these are used to control the operation of certain portions of the processor 700 when the strings being processed by certain types of instructions have been exhausted. These indicator circuits are included in block 701-42 and are set and reset under the control of a field within the microinstruction word of FIG. 6a (i.e., IND6 field). The bits of this field read out from the ECS output register 701-4 are applied to an RMI register 701-38 for decoding by a decoder 701-40. Based upon the state of status indicator signals received from the various processor units (e.g. 714, 720, 722, etc.), the appropriate ones of the auxiliary flip-flops are switched to binary ONE states. The outputs of these flip-flops are applied via the different positions of a 4 position switch 701-44 to the GP3 position of switch 701-26 for testing. The same outputs are applied to a second position of a ZIR switch 701-43 for storage via the ZDO switch 704-340.

The indicator status signals for example include the outputs of the different adder circuits (AL, AXP) of the unit 720. These signals will set different ones of a number of exhaust flag flip-flops designated FE11, FE12, FE13, FE1E, FE2E, FE2 and FE3. The FE1E and FE2E flip-flops are set during any FPOA cycle of any instruction. These flip-flops in turn cause the FE11, FE12, and FE13 flip-flops to be set when the outputs from the AL or AXP adder circuits of unit 720 are generated. The setting and resetting of these indicators will be described herein in further detail in connection with the description of operation. However, the exhaust flag flip-flops pertinent to the example given herein are set and reset in accordance with the following Boolean expressions.

SET: FE1E=FPOA+IND6FLD field.
RESET: FE1E=IND6FLD field.
SET: FE2E=FPOA+IND6FLD field.
RESET: FE2E=IND6FLD field.
SET: FE11=IND6FLD field·FE1E (ALES+AXPES+DESC1·AP0−4=0)+IND6FLD field·FE1E·DESC1·(AP0−5=0+APZN+ALZN)+IND6FLD field.
RESET: FE11=FPOA+IND6FLD field.
SET: FE12=IND6FLD field·FE1E·(ALES+AXPES+FE13).
RESET: FE12=FPOA+IND6FLD field.
SET: FE13=IND6FLD field·FE1E·ALES+IND6FLD field.
RESET: FE13=FPOA+IND6FLD field.
SET: FE2=IND6FLD field·FE2E·ALES+IND6FLD field·FE2E·DESC2·(AP0−4=0+AP0−5=0+APZN+ALZN)+(IND6FLD field) FE2E·DESC2+IND6FLD.
RESET: FE2=FPOA+IND6FLD field.
SET: FE3=IND6FLD field·DESC3·(AP0−4=0+AP0−5=0+APZN+ALZN)+IND6FLD field·DESC3+IND6FLD.
RESET: FE3=FP0A+IND6FLD field.

Wherein IND6FLD indicates a particular code;
ALES=AL=0 or $\overline{AL\text{-}C}$;
AXPES=AXP=0 or $\overline{AXP\text{-}C}$;
APZN=AP0−7≦0; and,
ALZN=AL0−11≦0.

The ZCSBRA switch 701-18 is normally enabled when the branch decision flip-flop RBD was set to a binary ONE in the previous cycle. The first position selects a 13-bit branch address from the current microinstruction applied via the RSCR register 701-20. The branch address enables any one of the locations of the ECS control store to be addressed directly. The second position selects the concatenation of the 6 low order address bits from the current microinstruction applied via MIC register 701-15 and the 7 upper bits of the branch address from the current microinstruction applied via the RSCR register 701-20. This permits branches within a 64-word page defined by the contents of the MIC register 701-15 (current location+1).

The third position selects the concatenation of 4 low order bits from the RVBO vector branch register, 6 bits from the branch field of the current microinstruction stored in RCSR register and the 3 upper bits of the address stored in the MIC register. This permits 16-way branches. The fourth position selects the concatenation of the 2 low order ZEROS with 4 bits from the vector branch register RVBO with the 4 most significant bits of the branch address field of the current microinstruction and the 3 upper bits of the current address stored in the MIC register. This permits 16-way branches with 3 control store locations between each adjacent pair of destination addresses.

The fifth position selects the concatenation of 2 low order ZEROS with 2 bits from vector branch register RVB1, with the 6 bits of the branch address of the current microinstruction and the upper 3 bits from the MIC register. This permits branches with 4 possible destinations with 3 control store locations between each adjacent pair of destination addresses.

The sixth position selects the concatenation of 2 low order ZEROS with 2 bits from vector branch register RVB2 with the 6 bits of the branch address of the current microinstruction and the upper 3 bits from the MIC register. This permits 4-way branches with 3 control store locations between each adjacent pair of destination addresses.

Figure 6B:
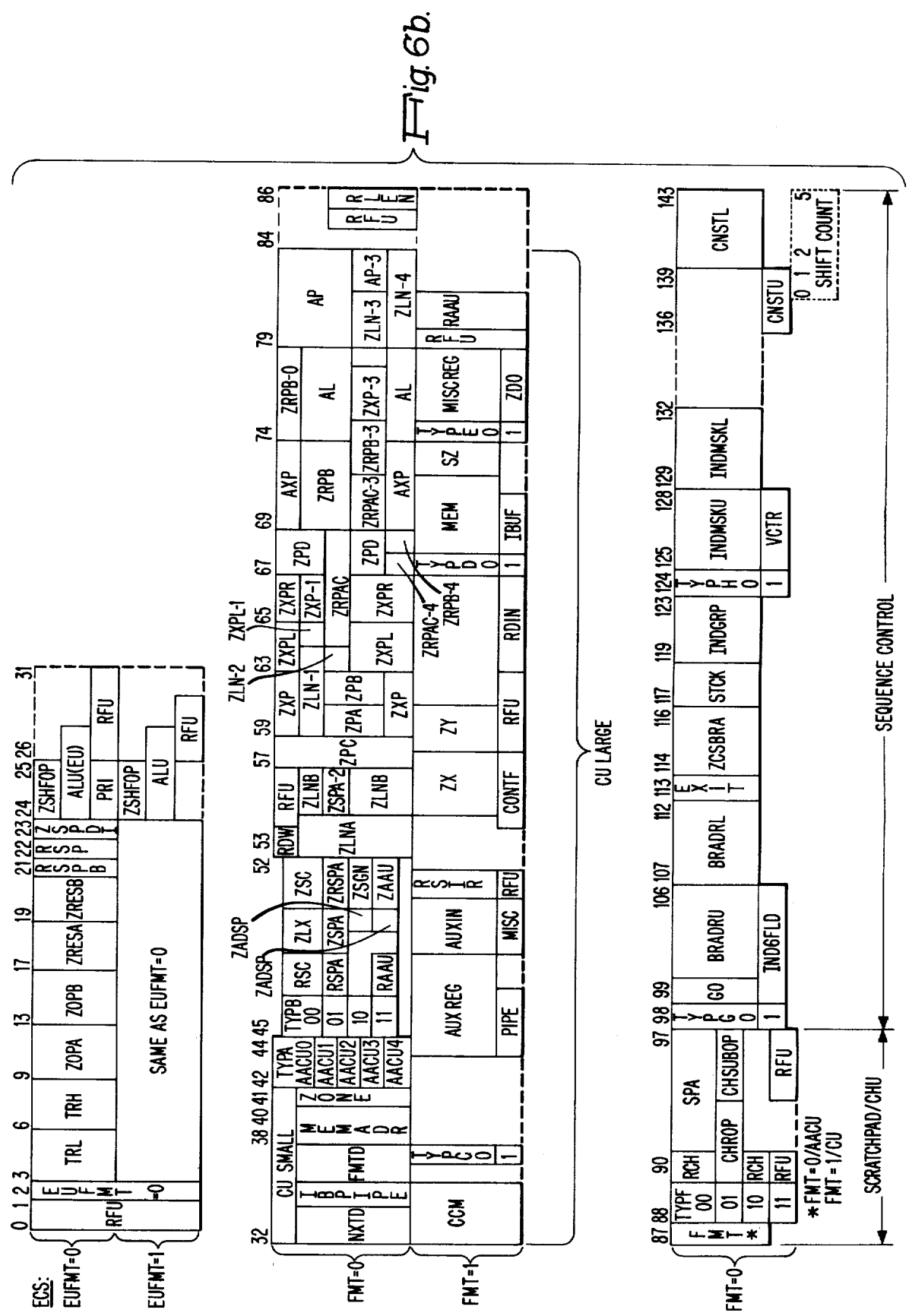
FIG. 6b illustrates the format of the microinstruction words of the execution control store of FIGS. 2 and 3.

The output of switch 701-12 addresses a specific location within control store 701-2 which causes the read out of a microinstruction word having a format illustrated in FIG. 6b. Referring to that Figure, it is seen that this microinstruction word is coded to include a number of different fields which are used to control the various functional units within processor 700. Only those fields which are related to the present example will be described herein.

| | | |
|---|---|---|
| Bits 0–1 | | Reserved for Future Use. |
| Bit 2 | EUFMT | Defines which format the EU is to operate with. EUFMT-0 specifies a first microinstruction format while EUFMT=1 specifies an alternate microinstruction format. |
| Bits 3–5 | TRL | TR Low Write Control. Write control of EU temporary registers TR0–TR3. |
| | 0XX | No change |
| | 100 | Write TR0 |
| | 101 | Write TR1 |
| | 110 | Write TR2 |
| | 111 | Wrtie TR3 |
| Bits 6–8 | TRH | TR High Write Control. Write control of EU temporary registers TR4–TR7. |
| | 0XX | No change |
| | 100 | Write TR4 |
| | 101 | Write TR5 |
| | 110 | Write TR6 |
| | 111 | Write TR7 |
| Bits 9–12 | ZOPA | ZOPA Switch Control. Selects the output of ZOPA switch. |
| (0) | 0000 | TR0 |
| (1) | 0001 | TR1 |
| (2) | 0010 | TR2 |
| (3) | 0011 | TR3 |
| (4) | 0100 | TR4 |
| (5) | 0101 | TR5 |
| (6) | 0110 | TR6 |
| (7) | 0111 | TR7 |
| (8–11) | 10XX | RDI |
| (12) | 1100 | ZEB |
| (13) | 1101 | ZEB |
| (14) | 1110 | ZEB |
| (15) | 1111 | 0 (disable) |
| Bits 13–16 | ZOPB | ZOPB Switch Control. Selects the output of ZOPB switch. |
| Bits 17–18 | ZRESA | ZRESA Switch Control. Selects the output of ZRESA switch. |
| | 00 | ALU |
| | 01 | Shifter |
| | 10 | Scratchpad/RDI switch |
| | 11 | ZDO |
| Bits 19–20 | ZRESB | ZRESB Switch Control. Selects the ouput of ZRESB switch. |
| | 00 | ALU |
| | 01 | Shifter |
| | 10 | Scratchpad/RDI switch |
| | 11 | ZDO |
| Bit 21 | RSPB | Scratchpad Buffer Strobe Control. Strobes RSPB with ZRESB data. |
| | 0 | No strobe |
| | 1 | Strobe RSPB |
| Bit 22 | RSP | Scratchpad Write Control. |
| | 0 | Read scratchpad |
| | 1 | Write scratchpad |
| Bit 23 | ZSPDI | Scratchpad/RDI Switch Control. Selects the output of the Scratchpad/RDI switch. |
| | 0 | Scratchpad output |
| | 1 | RDI |
| Bits 24–25 | ZSHFOP | Shifter Operand Switch Control. Selects the left operand to the Shifter. |
| | 00 | ZOPA output |
| | 01 | EIS output |
| | 10 | 0 |
| | 11 | Select 0 or −1 depending on bit 0 of right operand to Shifter. |
| Bits 24–27 | ALU | ALU Function Control. Selects the operation applied to the two inputs (A and B) to the ALU. |
| Bits 24–29 | N/A | |
| Bits 26–31 | RFU | Reserved for Future Use. |
| Bits 30–31 | ZALU | ALU Switch Control. Selects the output of ZALU switch. |
| Bits 32–33 | NXTD | Next Descriptor Control. Strobes RBASB and RDESC registers. |
| | 00 | RBASB←00 RDESC←00 |
| | 01 | RBASB←01 RDESC←01 |
| | 10 | RBASB←Alt RDESC←10 |
| | 11 | No strobes (default) |
| Bits 32–35 | CCM | Control constant field referenced by the CONTF field. |
| Bits 34–35 | IBPIPE | IBUF/Pipeline Control. Selects the reading of IBUF or the pipeline operation. |
| | 00 | No operation |
| | 01 | Read IBUF/ZDI (Alt) |
| | 10 | Type 1 Restart Release or |
| | 11 | Type 4 Restart Wait |
| Bits 36–37 | FNTD | Selects the loading of various CU registers and indicates the interpretation to be given to the MEMADR field for small CU control. |
| | 00 | No operation |
| | 01 | RADO←ASFA |
| | 10 | RADO←ZRESB |
| | 11 | RADO←ASFA |
| Bits 38–40 | MEMADR | Cache Control. Selects cache operations. The complete interpretation for this control is a function of the FMTD control. |
| | 000 | No operation |
| | 001 | Read Sgl |
| | 010 | Load Quad |
| | 011 | Preread |
| | 100 | Write Sgl |
| | 101 | Write Dbl |
| | 110 | Read Sgl Trans (for FMTD = 11 only) |
| | 111 | Write Sgl Word (for FMTD = 11 only) |
| Bit 41 | ZONE | Zone Control. Indicates zone or no zone for small CU control. |
| | 0 | No zone |
| | 1 | Zone |
| Bits 42–44 | TYPA | Type A Flag. Indicates the type A overlayed fields being used. |
| | 000 | Type A = 0 fields |
| | . | |
| | . | |
| | . | |
| | 100 | Type A = 4 fields |
| Bits 44–46 | PIPE | Pipeline Control. Selects the type of restart to be initiated. |
| | 000 | No operation |
| | 001 | Type 1 Restart and Release |
| | 010 | Type 2 Restart |

-continued

| | | |
|---|---|---|
| | 011 | Type 3 Restart |
| | 100 | Type 4 Restart |
| | 101 | Type 5 Release |
| | 110 | Type 6 Restart |
| Bits 44–47 | AUXREG | Auxiliary Register Write Control |
| | | Selects an auxiliary register or combinations to be strobed with data selected by the AUXIN control field. |
| | (0) 0000 | No strobe |
| | (1) 0001 | RRDXA |
| | (2) 0010 | R29 |
| | (3) 0011 | R29, RRDXA, FRL, RID |
| | (4) 0100 | RRDXB |
| | (5) 0101 | RTYP |
| | (6) 0110 | RBASA |
| | (7) 0111 | RBASA, RTYP |
| | (8) 1000 | RBASB |
| | (9) 1001 | RDESC |
| | (10) RBASA, R29, RRDXA | |
| Bits 45–46 | TYPB | Type B Flag. |
| | | Indicates the Type B overlayed fields being used. |
| | 00 | Type B = 0 fields |
| | . | |
| | . | |
| | . | |
| | 11 | Type B = 3 fields |
| Bit 47 | RSC | RSC Strobe Control. |
| | | Strobes the RSC register. (Shift Count) |
| Bit 47 | RSPA | RSPA Strobe Control. |
| | | Strobes the RSPA register. |
| Bits 47–48 | N/A | |
| Bit 47 | RAAU | RAAU Strobe Control. |
| | | Strobes RAAU register. |
| Bits 48–49 | ZLX | ZLX Switch Control. |
| | | Selects the output of the ZLX switch. |
| Bits 48–49 | ZSPA | ZSPA Switch Control. |
| | | Selects the output of the ZSPA switch. |
| Bits 48–50 | AUXIN | Auxiliary Register Input Control. |
| | | Selects data to be strobed into auxiliary register(s). |
| Bit 49 | ZADSP | ZADSP Switch Control. |
| | | Selects the output of ZADSP switch. |
| Bits 50–52 | ZSC | ZSC Switch Control. |
| | | Selects the output of ZSC switch. |
| Bits 50–52 | ZRSPA | ZRSPA Switch Control. |
| | | Selects the output of ZRSPA switch. |
| Bits 50–52 | ZAAU | ZAAU Switch Control. |
| Bit 51 | RSIR | RSIR Register Strobe. |
| | | Strobes the RSIR register as a function of the AUXIN field. |
| Bit 53 | RDW | R1DW, R2DW Register Strobe. |
| | | Strobes the R1DW or R2DW register as a function of the RDESC register. |
| Bits 53–54 | ZLNA | ZLNA Switch Control. |
| | | Selects output of ZLNA switch. |
| Bits 54–57 | CONTF | Miscellaneous Flip-Flop Control. |
| | | Selects one of four groups of control flip-flops to be set or reset by the control constant field (CCM). The flip-flops include those of blocks 704-104 and 704-110. |
| Bits 55–56 | ZLNB | ZLNB Switch Control. |
| | | Selects the output of ZLNB switch. |
| Bits 55–56 | ZSPA(2) Type A=2) ZSPA Switch, RSPA Register Control. | |
| | | Selects ZSPA switch output and strobes RSPA register. |
| Bits 57–58 | ZPC | ZPC Switch Control. |
| | | Selects the output of ZPC switch. |
| Bits 59–62 | ZXP | ZXP Switch, RXP Register Bank Control. |
| | | Selects ZXP switch output and the RXP register into which it will be written. |
| Bits 59–63 | ZLN(1) | ZLN Switch, RLN Register Bank |
| | (Type A=1) | Control. |
| | | Selects ZLN switch output and the RLN register into which it will be written. |
| Bits 59–60 | ZPA | ZPA Switch Control. |
| | | Selects the output of ZPA switch. |
| | 00 = RP0 | |
| | . | |
| | . | |
| | . | |
| | 11 = RP3 | |
| Bits 61–62 | ZPB | ZPB Switch Control. |
| | | Selects the output of ZPB switch. |
| | 00 = RP0 | |
| | . | |
| | . | |
| | . | |
| | 11 = RP3 | |
| Bits 63–64 | ZXPL | ZXPL Switch Control. |
| | (Type A=0) | |
| | | Selects the output of ZXPL switch. |
| | 00 = RXPA | |
| | . | |
| | . | |
| | . | |
| | 11 = RXPD | |
| Bit 63 | ZLN(2) | ZLN Switch, RLN Register Bank |
| | (Type A=2) | Control. |
| | | Selects ZLN switch output and the RLN register into which it will be written. |
| Bits 63–66 | RDIN | RDI In Control. |
| | | Selects the data to be strobed into the RDI register and selects one of the modification control fields (MF$_1$–MF$_3$, TAG) of an instruction word. RDI strobe may also be controlled by the MISCREG field. |
| Bit 64 | ZXPL(1) | ZXPL Switch Control. |
| | (Type A=1) | |
| | | Selects the output of ZXPL switch. |
| Bits 64–68 | ZRPAC | ZRPA Switch, ZRPC Switch, RP0-3 |
| | (Type A=2) | Register Bank Control. |
| | | Selects ZRPC and ZRPA switch outputs and the RP0-3 register into which the ZRPA output will be written. |
| Bits 65–66 | ZXPR | ZXPR Switch Control. |
| | (Type A=0) | |
| | | Selects the output of ZXPR switch. |
| Bits 65–66 | ZXP(1) | ZXP Switch, RXP Register Bank |
| | (Type A=1) | Control. |
| | | Selects ZXP switch output and the RXP register into which it will be written. |
| Bits 67–68 | ZPD | ZPD Switch Control. |
| | (Type A=0) | |
| | | Selects the output of ZPD switch. |
| Bit 67 | ZRPAC(4) | ZRPA Switch, ZRPC Switch, RP0-3 |
| | (Type A=4) | Register Bank Control. |
| | | Selects CP4 from ZRPA switch and strobes the RP1 register. |
| Bit 67 | TYPD | Type D Flag. |
| | | Type D Flag which indicates type D overlayed fields. |
| Bit 68 | ZRPB(4) | ZRPB Switch, RP4-7 Register |
| | (Type A=4) | Bank Control. |
| | | Selects 0 from ZRPB switch and strobes the RP4 register. |
| Bits 68–71 | MEM | Cache Memory Control. |
| | | Selects the cache operation in conjunction with the SZ control. |
| | (0) 0000 | No operation |
| | . | |
| | . | |
| | (15) 1111 | Write Remote |
| Bits 68–70 | IBUF | IBUF Read Control. |
| | | Selects the destination of IBUF data when reading IBUF. |
| Bits 69–73 | AXP | ZXPA Switch, ZXPB Switch, AXP |
| | (Type A=0) | Adder, ZAXP Switch, RE Register Control. |
| | | Selects ZXPA and ZXPB switch outputs, the AXP adder function applied to them, and the ZAXP switch output. Also strobes the RE register. |
| Bits 69–73 | ZRPB | ZRPB Switch, RP4-7 Register |
| | (Type A=1) | Bank Control. |

-continued

| | | |
|---|---|---|
| Bits 69-71 | Selects ZRPB switch output and the RP4-7 register into which it will be written. ZRPAC-3 ZRPA Switch, ZRPC Switch, RP0-3 | |
| | (Type A=3) Register Bank Control. Selects ZRPC and ZRPA switch outputs and the RP0-3 register into which the ZRPA output will be written. | |
| Bits 72-74 | ZRPB(3) ZRPB Switch, RP4-7 Register (Type A=3) Bank Control. Selects ZRPB switch output and the RP4-7 register into which it will be written. | |
| Bits 72-73 | SZ Size/Zone Cache Control. Controls cache operations in conjunction with the MEM control field. | |
| Bits 74-78 | ZRPB(0) ZRPB Switch, RP4-7 Register (Type A=0) Bank Control. Selects ZRP switch output and the RP4-7 register into which it will be written. | |
| Bits 74-78 | AL ZALA Switch, ZALB Switch, AL (Type A=1) Adder Control. Selects ZALA and ZALB switch outputs and the AL adder function applied to them. | |
| Bit 74 | TYPE Type E Flag. Type E flag which indicates the type E overlayed fields. | |
| Bits 75-77 | ZXP(3) ZXP Switch, RXP Register Bank (Type A=3) Control. Selects ZXP switch output and the RXP register into which it will be written. | |
| Bits 75-78 | MISCREG Miscellaneous Register Control. Selects various operations on miscellaneous registers (e.g. RBIR, RDI, RLEN, RSPP). | |
| Bits 75-78 | ZDO ZDO Switch Control. Selects the output of the ZDO switch. | |
| Bit 78 | ZIZN ZIZN Switch Control. Selects the output of ZIZN switch. | |
| Bits 79-83 | AP ZAPA Switch, ZAPB Switch, AP Adder Control. Selects ZAPA and ZAPB switch output and the AP adder function applied to them. | |
| Bits 79-81 | ZLN(3) ZLN Switch, RLN Register (Type A=3) Bank Control. Selects ZLN switch output and the RLN register into which it will be written. | |
| Bits 79-83 | ZLN(4) ZLN Switch, RLN register Bank (Type A=4) Control. Selects ZLN output and the RLN register into which it will be written. | |
| Bits 80-81 | RAAU RAAU/RE Register Strobe. Selects the data to be strobed into the RAAU and RE registers by controlling several switches and adders in the unit 722. | |
| Bits 82-83 | AP(3) ZAPA Switch, ZAPB Switch, (Type A=3) AP Adder Control. Selects ZAPA and ZAPB switch outputs and the AP adder function applied to them. | |
| Bit 84 | ZRSC ZRSC Switch Control. (Type A=0) Selects the output of ZRSC Switch. | |
| Bits 85-86 | N/A | |
| Bit 86 | RLEN RLEN Strobe Control. (Type A=3) RLEN strobes are also controlled by hardware or by the MISCREG field. | |
| Bit 87 | FMT Format Flag. Indicates the type of format. | |
| Bits 88-89 | TYPF Indicates the type of overlayed fields. 00 = Scratchpad Address 01 = Character Unit Control 10 = Multiply/Divide Control 11 = N/A | |
| Bit 90 | RFU Reserved for Future Use. | |
| Bits 90-93 | CHROP Character Unit Op Code. Selects main operation to be performed by Character Unit and the interpretation to be given to the CHSUBOP field. (0) 0000 No operation (1) 0001 Load Data (2) 0010 MOP Execute (3) 0011 Compare Single | |

(4) 0100 Compare Double
(5) 0101 Load Register
(6) 0110 Update CN
(7) 0111 Undefined
(8) 1000 Set RCH Operation A
(9) 1001 Set RTF1
(10) 1010 Set RTF2
(11) 1011 Set RTF3
(12) 1100 Set RCN1
(13) 1101 Set RCN2
(14) 1110 Set Edit Flags
(15) 1111 CH Unit Clear Bit 90 RCH  RCH Register Strobe. Strobes the OP1 RCH register.
Bit 90 RFU  Reserved for Future Use.
Bits 91-97 SPA  Scratchpad Address. Contains the address that may be used to address the EU scratchpad.
Bits 91-93 N/A
Bits 94-97 CHSUBOP  Character Unit Sub-Op Code. Selects the detailed function of the Character Unit or it may contain a constant. The interpretation of this field is a function of the CHROP control as shown below.

CHROP = 0000 No Operation
CHSUBOP$_{0-3}$
XXXX  No interpretation

CHROP = 0001 Load Data Operation
CHSUBOP$_{0-1}$  (Suboperation)
00  OP1 Load by CN1 and TF1
01  OP1 Load in Reverse by CN1 and TF1
10  OP2 Load by CN2 and TF2 and Test Character
11  Load Sign
CHSUBOP$_{2-3}$  (Fill Control)
1X  Fill character loaded to ZCU
X1  Fill character loaded to ZCV CHROP = 0010 MOP Execute Operation
CHSUBOP$_{0-1}$  (Suboperation)
00  MOP set by CN2
01  MOP Execute
10  Undefined
11  Undefined
CHSUBOP$_{2-3}$
XX  No interpretation CHROP = 0101 Load Register Operation
CHSUBOP$_{0-1}$  (Selects output of RCH)
CHSUBOP$_{2-3}$  (Selects output of ZOC switch)

CHROP = 1011 Set RTF3 Operation
CHSUBOP$_{0-1}$  (Selects data to be inspected for 00, indicating a 9-bit character.
CHSUBOP$_{2-3}$  (Constant Field)

CHROP = 1110 Set Edit Flags Operation
CHSUBOP$_{0-3}$  (Constant selecting flags to be set)
1XXX  Set ES (End suppression)
X1XX  Set SN (sign)
XX1X  Set Z (zero)
XXX1  Set BZ (Blank When Zero).

Bits 94-97 EFU  Reserved for Future Use.
Bits 97-97 N/A
Bit 98 TYPG  TYPE G FLAG. Indicates the type of overlayed fields.
0 = BRADRU field
1 = IND6 field
Bit 99 GO  State of Conditional Branch Test.
Bits 99-106 BRADRU  Branch Address Upper.
Bits 99-106 IND6FLD  Indicator Control. Selects an indicator.
Bits 99-106 Bit 99 = 0 specifies a change indicators instruction.
Bit 99 = 1 specifies a set/reset indicators instruction (set or reset indicated by X bit 0 or 1 respectively).

Bits 100-104   105=1   106=1
0000

-continued

| | 1100X | Exhaust 1 | Exhaust 2 |
| --- | --- | --- | --- |
| | 1101X | Exhaust 3 | N/A |
| | 1110X | Exhaust 1 Eff. | Exhaust 2 Eff. |
| Bits 107–112 | BRADRL | \multicolumn{2}{l|}{BRANCH ADDRESS LOWER.} |
| | \multicolumn{3}{l|}{Contains lower portion of an ECS address used for branching.} |
| Bit 113 | EXIT | \multicolumn{2}{l|}{Selection of Exit Switch Control.} |
| | \multicolumn{3}{l|}{Selection of Exit indicates end of microprogram.} |
| Bits 114–116 | ZCSBRA | \multicolumn{2}{l|}{ZCSBRA Switch Control.} |
| | \multicolumn{3}{l|}{Defines the position to be selected in a Control Store Branch Address Switch.} |
| Bits 117–118 | N/A | | |
| Bits 119–123 | INDGRP | \multicolumn{2}{l|}{Conditional Branch Indicator Group Control.} |
| | \multicolumn{3}{l|}{The first two bits (119–120) select the "group" of microprogram indicators. The last three bits (121–123) select the "set" of indicators within each "group".} |
| Bit 124 | TYPH | \multicolumn{2}{l|}{Type H field.} |
| | \multicolumn{3}{l|}{Indicates the type H overlayed fields. 0 = INDMSKU 1 = VCTR field} |
| Bits 125–128 | INDMSKU | \multicolumn{2}{l|}{Conditional Branch Indicator Mask Upper.} |
| | \multicolumn{3}{l|}{Contains the upper 4 bits of the indicator mask in type H = 0 field.} |
| Bits 125–129 | VCTR | \multicolumn{2}{l|}{Vector Select.} |
| | \multicolumn{3}{l|}{Selects the branching vectors to be strobed into the RVB0, RVB1, and RVB2 registers. The most significant bit (125) determines which of two groups 0 or 1, 2 or 3 and 4 or 5 will be strobed into the RVB0, RVB1 and RVB2 registers respectively. The remaining 3 bits select the vector within each group.} |
| Bits 129–132 | INDMSKL | \multicolumn{2}{l|}{Conditional Branch Indicator Mask Lower.} |
| | \multicolumn{3}{l|}{Contains the lower 4 bits of the indicator mask.} |
| Bits 133–135 | N/A | | |
| Bits 136–139 | CNSTU | \multicolumn{2}{l|}{Constant Upper.} |
| | \multicolumn{3}{l|}{Contains the upper 4 bits of the constant field.} |
| Bits 140–143 | CNSTL | \multicolumn{2}{l|}{Constant Lower.} |
| | \multicolumn{3}{l|}{Contains the lower 4 bits of the constant field.} |

Control Logic Unit 704-1

This unit includes the sequence decode logic circuits 704-100 as mentioned whose outputs feed a plurality of I cycle control state flip-flops of block 704-102. These flip-flops in response to signals from the circuits 704-100 as well as microinstruction signals from register 701-4 (DEMR038-40 which correspond to the mem address field MEMADR of FIG. 6b) generate the various required I cycle control states required for the execution of program instructions. It is assumed that block 704-102 also includes gate circuits which generate register hold signals [HOLDE00 which are distributed throughout the processor 700.

As seen from FIG. 3c, the I cycle control state flip-flops receive control input signals via control lines including a line CPSTOP00 from cache unit 750. As explained herein, the state of the CPSTOP00 line determines whether processor operation continues in that when the line is forced to a binary ZERO, the hold or enabling signals for the I cycle control state flip-flops and other storage registers are also forced to ZEROS. The hold signals corresponding to signals [HOLDI00 and [HOLDE00 operate to hold or freeze the state of the processor 700. Since no incrementing of the control store address can take, the ECS control store reads out the same microinstruction word. The signals [HOLDI and [HOLDE are set in accordance with the following Boolean expressions: [HOLDI=CACHE HOLD-+HOLD REL wherein the state of signal CACHE HOLD corresponds to the state of signal CPSTOP and the signal HOLD REL is a binary ONE until switched to a binary ZERO by the generation of a microprogram release signal; and [HOLD E=[HOLD I.

The hardware sequence generated by the circuits 704-100 in response to the signals applied to lines CCSDO20-25 used in explaining the operation of the present invention is as follows.

| CCS-S CODE | SEQUENCE |
| --- | --- |
| 111101 | = EDIT |
| | The sequence is FPOA-FPOP1-FPOP2- followed by FPOP3. There is an escape to micro-program control which following the setting up of registers, tables, etc. required for processing edit operands signals the hardware control circuits to enter state FPOP3. |

The hardwired control states used in explaining the operation of the present invention and operations performed in connection with such control states are as follows.

| CONTROL STATE/CYCLE | DESCRIPTION |
| --- | --- |
| FPOA | The FPOA Prepare Operand Address state is the starting control state for all instructions. During FPOA, an address is calculated, and the Op-code is translated via the CCS control store to control further actions. |
| FPOP | The FPOP Prepare Operand Pointer is the control state used to process instruction descriptors. |
| FESC | The FESC Escape is the state for providing a variable delay to the I-Process pipeline. During the FESC state, the ECS control store shall have complete control over the processor 700, and shall determine when to restart the I-Process pipeline |

As seen from FIG. 3c, signals corresponding to the I cycle control states are applied as inputs to a plurality of control flip-flops of block 704-104, decoder circuits of block 704-106, a number of control logic circuits of block 704-108 and to a plurality of control flag indicator flip-flops of block 704-110. It is also seen that the various indicator flip-flops of block 704-110 also receive microinstruction input signals via lines MEMDO54-57 from execution control unit 701-4.

Figure 3D:
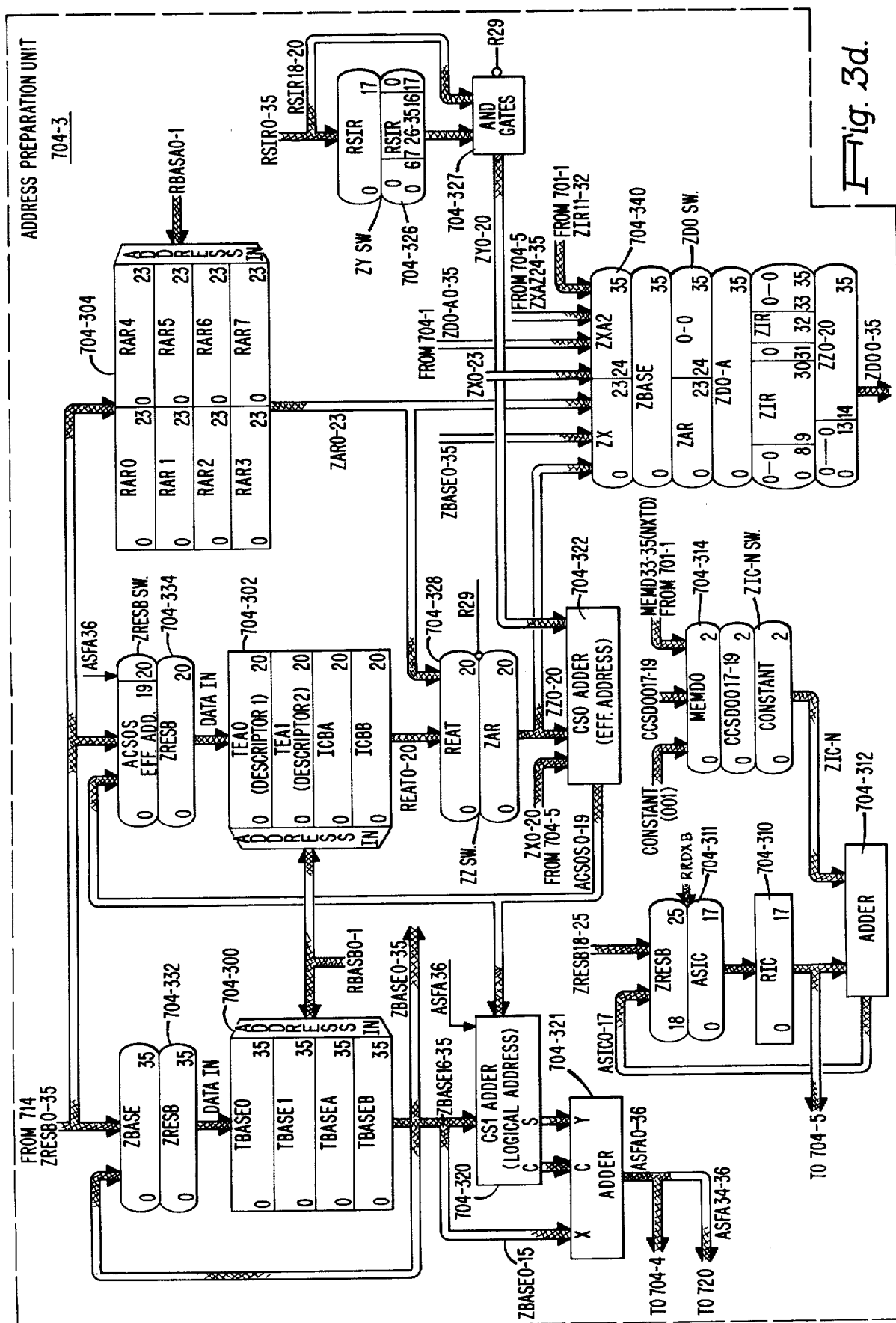
Figures 3F, 6A:
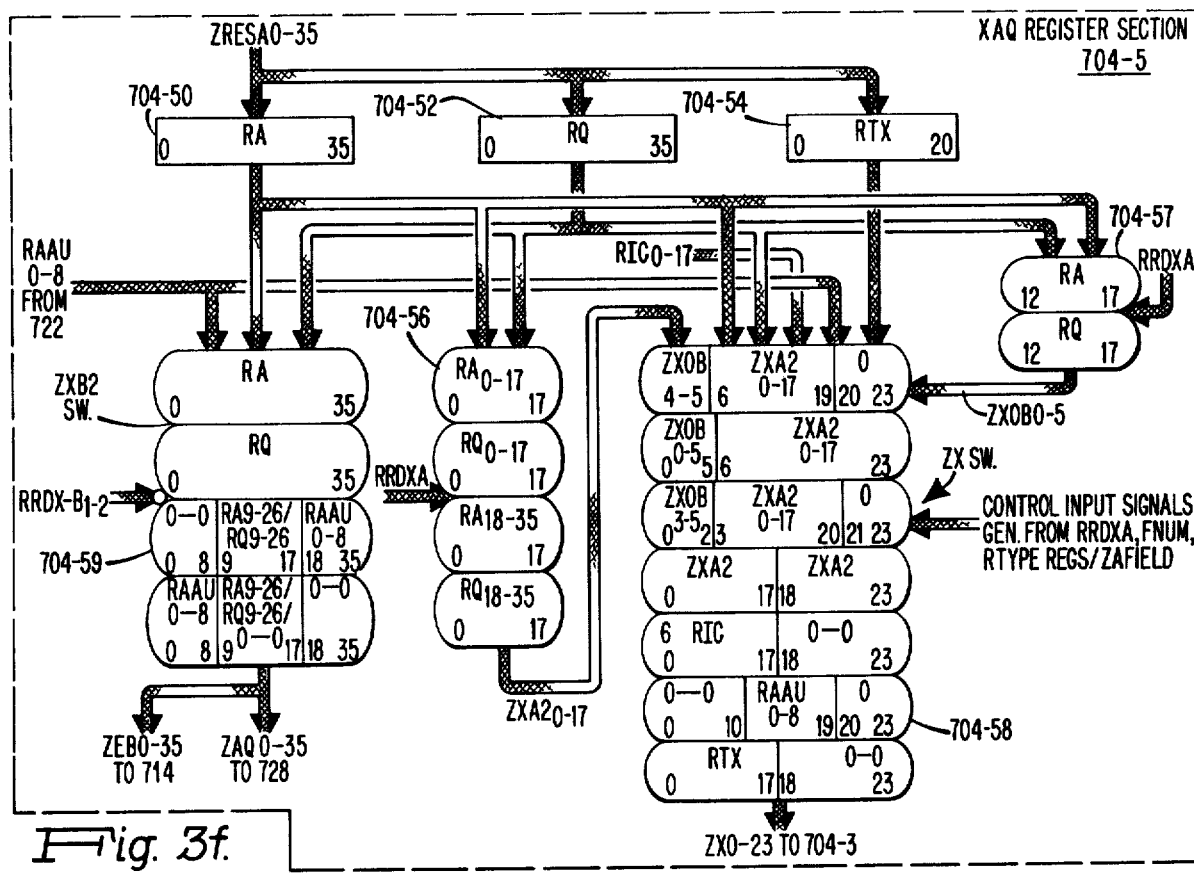

As seen from FIG. 3d, signals generated by the hardware control logic circuits 704-108 fall into one of three groups as a function of the units whose operations are being controlled. That is, the groups are instruction buffer control, hardware control and hardware memory control.

In each case, each group of signals is ored together with equivalent signals generated by other sources and then decoded. The other sources correspond to fields within the two different formats of the microinstruction word of FIG. 6a which are loaded into RCSR register 704-112 from the ECS output register 701-4.

One field corresponds to bits 32-83 of one format (large CU) and another field (short CU) corresponds to bits 32-41 of another format. These fields are decoded by a decoder 704-114 into the sets of bits indicated and combined within the decoders 704-116, 704-124, 704-126 and 704-128 as shown. Further decoding is done by the circuits of blocks 704-118, 704-135 and 704-120. The results of decoding such fields are either distributed throughout processor 700 or are stored in an RMEM register 704-130, an RSZ flip-flop 704-132, an FREQDIR flip-flop 704-136 and an FREQCAC flip-flop 704-134.

Additional decoding of the large and short CU fields and signals from the I cycle state circuits of block 704-112 is done via decoders 704-106 and 704-107. The decoder 704-106 generates control signals for loading different ones of the registers and for enabling various multiplexer/selector switches within the processor 700. The decoder 704-107 operates to generate signals for setting and resetting a pair (RBASB) of base pointer B flip-flops 704-144. Other combinations of these signals are used to set and reset the descriptor number flip-flops of blocks 704-140 and 704-142.

As seen from FIG. 3c, the decoder 704-116 receives a control signal (EXH00 generated by the decoder circuits of block 704-117. These circuits receive signals from the RDESC register 704-140 and signals from the exhaust flip-flops of block 701-1. In accordance with the states of these signals, the circuits force signal [EXH000 to a binary ZERO to inhibit the generation of a cache memory command upon the occurrence of an exhaust condition. The signal [EXH000 is generated in accordance with the following Boolean expression:

[EXH000 = DESC0·FE11 + DESC1·FE2 + DESC-2·FE3.

The flip-flop FNUM is normally set in response to the CCS-OP field of the microinstruction word. When set to a binary ONE, this indicates that the descriptor being processed is a numeric type.

The FINH-ADR flip-flop inhibits the operation of the address preparation unit 704-3. When set to a binary ONE, an address cycle (FPOA/FPOP) consists of adding the contents of a temporary effective address register REA-T+ZERO. The register REA-T will have been loaded with the address prior to doing a FPOA/FPOP cycle. The FABS flip-flop enables the generation of absolute addresses. When set to a binary ONE, a 24-bit absolute address is used. As concerns the flag or indicator flip-flops of block 704-110, flip-flop FID when set to a binary ONE provides an indication that indirect address modification during an instruction is required on the descriptor loaded into the RSIR register.

The FRL flip-flop when set to a binary ONE indicates that the length is specified in a register associated with the instruction loaded into various instruction registers. The three flip-flops FINDA, FINDB and FINDC provide indications used in processing memory type instructions. Flip-flop FINDA is set to a binary ONE when a descriptor requires indirect address modification or length specified in a register. Flip-flop FINDB is set to a binary ONE when the descriptor does not include nine bit characters. The flip-flop FINDC is set to a binary ONE when the descriptor does include six bit characters.

As seen from FIG. 3c, the outputs from the control flag flip-flops of block 704-110 are applied as inputs to the branch indicator circuits of block 701-1.

It will be appreciated that the required timing signals for operating section 704 as well as other sections of processor 700 and cache unit 750 are provided by centrally located clock circuits. For example, in the preferred embodiment of FIG. 1, the clock circuits are located within the input/output processor 200. Such clock circuits can be considered as conventional in design and can comprise a crystal controlled oscillator and counter circuits. The timing or clocking signals from such clock circuits are distributed in a conventional manner to the various portions of the system of FIG. 1 for synchronized operation.

Register Section 704-150

As seen from FIG. 3c, the control logic unit 704-1 further includes a register section 704-150. This section contains the basic instruction register (RBIR) 704-152, the secondary instruction register (RSIR) 704-154, a base pointer A register (RBASA) 704-156 used for selecting one of the address registers RAR0 through RAR7 of block 704-304, a read index register A 704-158 (RRDXA) used for selection of index registers included within section 704-5 (not shown) and for selection of outputs from the ZDO multiplexer switch 704-340, and a descriptor type register (RTYP) 704-160 indicating the type of data characters being pointed to by the descriptor value (e.g. 9-bit, 6-bit, 4-bit). The section 704-150 further includes a 1-bit instruction/EIS descriptor register designated R29 of block 704-162. The state of this bit in conjunction with the contents of the RBAS-A register 704-158 are used to select the particular address register used for address preparation. When register R29 of block 704-162 is set to a binary ZERO, this indicates that none of the address registers of block 704-304 are used during address preparation. The last registers of section 704-150 include the data in register (RDI) of block 704-164 and a read index register B pointing (RRDXB) to registers used by execution unit 714.

As seen from FIG. 3, the RBIR register 704-152 is loaded via a two position switch 740-170 connected to receive signals from the sources indicated (i.e., a switch ZIB-B 704-172 and lines ZDI O-35). The RSIR register 704-154 similarly receives signals from the ZDI lines and switch 704-172. The RBASA register 704-156 receives signals from the ZDI line 0-2 in addition to a further switch ZBASA of block 704-174. The RRDXA register and RTYP register receive signals from the ZDI lines as well as a switch 704-176 and switch 704-178 as shown.

The switch 704-172 is a two position switch which receives inputs from the switches ZIB and ZRESB from the cache unit 750 and execution unit 714 respectively. The switch 704-174 is a three input switch which receives two inputs from the execution unit 714 and the output of the ZIB switch of cache unit 750.

Switch 704-176 is a four input switch which receives two of its inputs from the execution unit 714 and a single input from cache unit 750. The first position of the ZRDXA switch 704-176 selects the output of a ZRDXM switch 704-185. One position of this switch provides a tag field value from bit positions 5-8, 14-17, and 32-35 of the RBIR register 704-152 and bit positions 32-35 of the RSIR register 704-154 selected from ZIDD switch 704-180 and a two position ZMF switch 740-176.

The second position of switch 704-185 provides a constant value from the output of the ECS output register 704-1 (CCM field 32-34). The signals from the lines ZIDD 27-35 are applied as inputs to control flag flip-flops of block 704-110. The switch 704-178 receives an input from the control store 704-2, an input from cache unit 750 and an input from execution unit 714.

The data input register 704-164 receives a series of input signals from a ZIDD switch 704-180 which connects in series to a ZDIA switch 704-181 whose output provides one input of a further switch 704-182 which directly loads into the RDI register 704-164. The ZDIA switch 704-181 provides a further input to a three input switch 704-183 which receives the other inputs indicated from cache unit 750 and execution unit 714.

The ZIDD switch 704-180 receives inputs from the RBIR register 704-152, the RSIR register 704-154 and a two position ZMF switch 740-187. The ZDIA switch 704-181 receives signals from the ZDI lines 0-35, a constant value generated from the inputs to a first switch position in addition to signals from the output of the ZIDD switch 704-80 and the ZRESB switch in execution unit 714. The switch 704-182 receives the output of the ZDIA switch and signals from the ZDI lines 0-35. The RRDXB register 704-189 is loaded by a three position switch 704-188. The switch receives via a first position signals from a RREG register included in the execution unit, a constant value from control store 701-2 via a second position and signals from the ZIDD switch via a third position.

The section 704-150 further includes a two position switch 704-185 and a scratchpad pointer register 704-186 whose output is used by the AACU 722 to form addresses for access to the scratchpad memory of the EU 714. The first switch position provides a constant value and is selected under hardware control (FPOA.R29). The second switch position applies as an output the contents of the RBASA register 704-156. This position is selected under both hardware and microprogram control (i.e., FPOA.R29 or MISCREG field).

Address Preparation Unit 704-3

The address preparation unit 704-3 includes a number of registers and adders. The registers include a number of base registers (i.e., TBASE0 through TBASEB) of block 704-300 used for storing descriptor values of an instruction, a pair of temporary effective address registers (TEA0, TEA1) and a pair of instruction counters (ICBA, ICBB) included within block 704-302 used for addressing the instruction buffer and eight address registers (RAR0 through RAR7) of 704-304 used during address preparation operations. The unit 704-3 also includes an instruction counter 704-310.

The adders include adder 704-312 used to update instruction counter 704-310 via switches 704-311 and 704-314 and a pair of adders 704-320 and 704-322. The adder 704-322 is used to generate an effective address value which is normally stored in one of the registers of the block 704-302. The effective address is generated from a number of sources which include ZY switch 704-326 whose output is applied via a number of AND gates of block 704-327, selected address registers of block 704-304 or selected temporary address registers TEA0 and TEA1 of block 704-302 applied via another switch 704-328 or the index address signals ZX0-20 from unit 704-5. Additionally, adder 704-322 is used to update the contents of the instruction counter of the cache instruction buffer.

As seen from FIG. 3d, the outputs from adder 704-322 are also applied as an input to the adder 704-320. The adder 704-320 is used to combine base value stored in any one of the temporary base registers TBASE0 through TBASEB with the address signals ACSOS0-19 from adder 704-322. The resulting bits are applied as an input to a further adder network 704-320 which generates a logical address which is applied to the lines ASFA0-36 via an adder 704-321. This adder sums the operand inputs together with the carry inputs from blocks 704-300 and 704-320. The effective address is used to obtain an absolute address when the system is operated in a paged mode. Since this operation is not pertinent to the present invention, it will not be discussed further herein. For further information regarding such address development, reference may be made to U.S. Pat. No. 3,976,978.

The temporary base registers of block 704-300 are loaded via a switch 704-332. The switch receives an input from the execution unit 714 and the output from block 704-300. The execution unit 714 applies further inputs to the registers of block 704-302 via a switch 704-334 as well as to the address registers of block 704-304. An output multiplexer (ZDO) switch 704-340 enables the selection of the various registers within the address preparation unit 704-3 and unit 704-5 for transfer of their contents to the execution unit 714 via lines ZDO 0-35. Also, the ZDO switch 704-340 enables the contents of various ones of the registers and control flip-flops of unit 704-1 to be read out via a fourth position (ZDO-A). The fifth position enables the states of various indicators within the control store circuits of block 701-1 to be selected for examination.

XAQ Register Section 704-5 and Data Address Output Section 704-4 FIGS. 3e and 3f The section 704-5 includes the accumulator RA register 704-50, the quotient QA register 704-52 and the temporary index (RTX) register 704-54 utilized by the control logic unit 704-1. The contents of program visible registers RA, RQ and RTX registers are read out to the unit 704-3 via a ZXA2 switch 704-56, a ZXOB switch 704-57 and a ZX switch 704-58. From there, the register contents can be transferred to execution unit 714 or to cache unit 750 via the ZDO switch in unit 704-3.

The selection of outputs from the above mentioned switches are controlled by the contents of the RRDXA register 704-158, the FNUM flip-flop of block 704-104 and the RTYP register 704-160 in addition to bits 55-77 (ZX field). The ZXA2 switch 704-56 provides for the read out of the upper or lower 18 bits of RA and RQ registers 704-50 and 704-52 for address modification. The selected output signals from the ZXA2 switch and the ZXOB switch are applied to the ZX switch together with the RAAU, RTX and RIC register signals as shown.

The ZX switch selects as an output, bits of the RA/RQ registers for a 9-bit character string via a first position, RA/RQ bits for a 6-bit character string via a second position, RA/RQ bits for a 4-bit character string via a third position and RA/RQ bits for word type modification.

Positions five, six and seven are used for selecting the contents of the RAAU register, RIC register and RTX register respectively. A further ZXB2 switch 704-59 provides a second path to the unit 714 for read out of the program visible registers via the lines ZEB0-35. A similar path to the unit 728 is provided via the lines ZAQ0-35.

The section 704-4 includes the registers and switches used for transferring commands and data to the cache 750. Such transfer operations normally require at least two cycles, one for sending an address and another for sending the data. Bits 5-8 of a command word are derived from the output of a four position switch 704-40. This switch receives a first constant value via a first position, the contents of a RZN register 704-42 via a second position, a second constant value via a third position and a third constant value via a fourth position.

Bits 1-4 of a command are applied by the circuits of block 704-1 to an OR gate circuit 704-44 together with bits 5-8. The OR gate 704-44 also receives via a ZADO switch 704-46 bits 1-8 of an RADO register 704-48. The RADO register 704-48 is an address and data out register which receives via a first position of a ZADOB switch 704-48 a logical (virtual) address from address preparation unit 704-3 via the lines ASFA0-35 and data output signals from the EU 714 via lines ZRESB0-35. The positions of the ZADOB switch 704-48 is under the control of the FMTD field for small CU format and the RADO field in the case of large CU format.

As seen from the Figure, either the ZZN1-8 bits or the ZADO bits 1-8 are applied as outputs to the RADO/ZADO lines as a function of the state of control signal [RADO-ZADO. Bits 0 and 9 are always binary ONES while bits 10-35 are furnished by the RADO register 704-46.

Figure 3G:
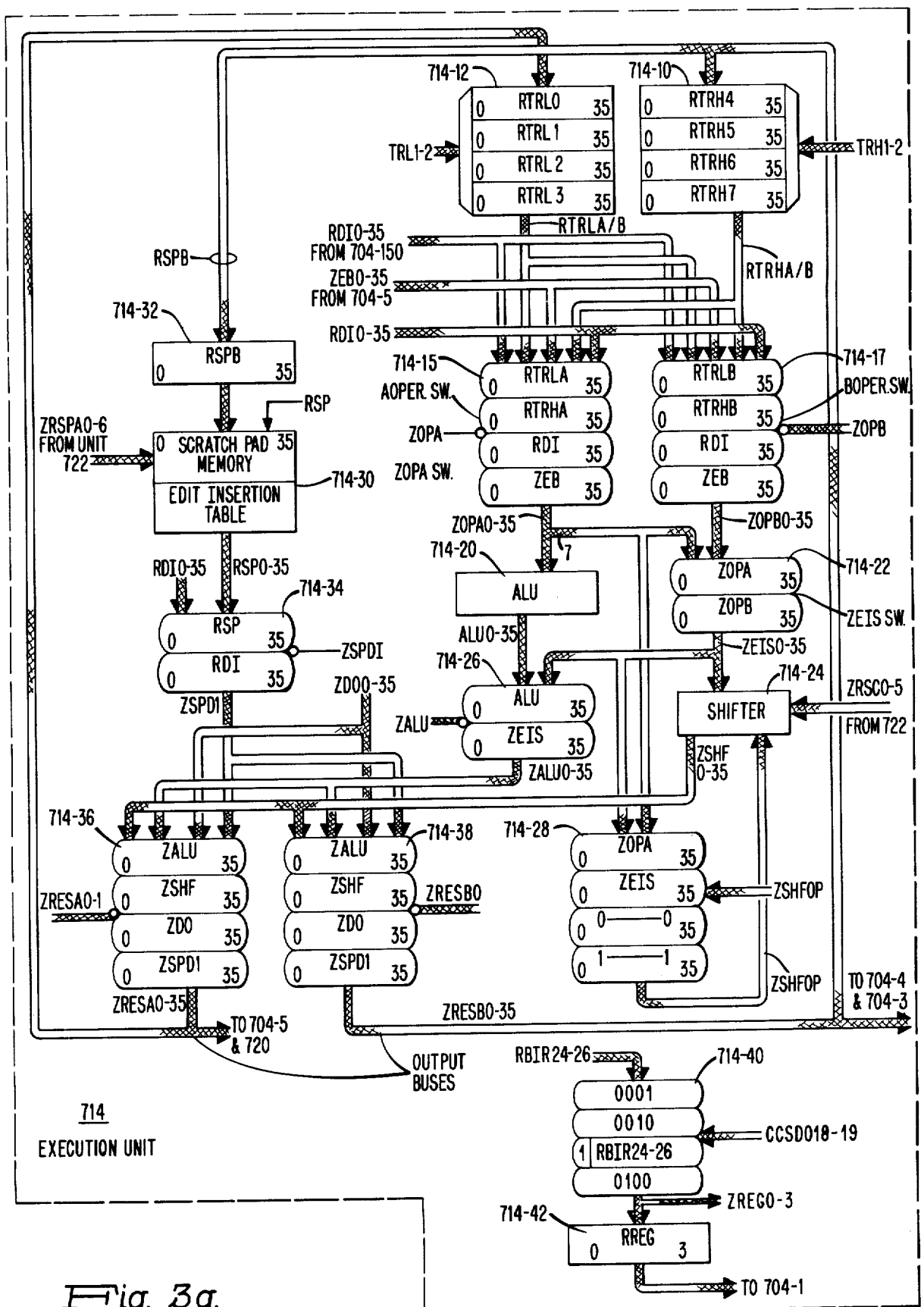

Execution Unit 714—FIG. 3g

The unit 714 includes as major units, addressable temporary register banks 714-10 and 714-12, an arithmetic logic unit (ALU) 714-20, a shifter 714-24 and a scratchpad memory 714-30. Additionally, the unit 714 includes a number of multiposition data selector switches 714-15, 714-17, 714-22, 714-26, 714-28, 714-34, 714-36 and 714-38 to provide flexibility in selecting operands and output results.

In operation, the operands are selected via the ZOPA switch 714-15 and ZOPB switch 714-17 from one of the registers of the banks 714-12 and 714-10 or from other input lines such as ZEB0-35 or RDI0-35 as shown. The ALU 714-20 and shifter 714-24 performs operations upon the selected operands and the results are selected via the switches 714-24, 714-36 and 714-38 to be applied to the output bus lines ZRESA 0-35 and ZRESB0-35. Similarly, the contents of a scratchpad location selected via the contents of a scratchpad pad buffer 714-32 can be read out via the switches 714-34, 714-36 and 714-38.

The selected output results or other data are thereafter loaded into other registers within processor 700 including the temporary register banks 714-12 and 714-10 or the scratchpad memory 714-30 of execution unit 714.

In greater detail, the sources of operands are identical for both the ZOPA and ZOPB switches 714-15 and 714-17. The selection of switch position for the ZOPA switch and ZOPB switch is under the control of bits 9-12 and bits 13-16 of the microinstruction word. The ALU 714-20 performs logical, decimal or binary operations upon the selected operand data under the control of bits 24-28 of the microinstruction word of FIG. 6a.

The shifter 714-24 is a combinatorial logic network used to align, shift or rotate binary data under microprogram control. The input data signals from the ZSHFOP and ZEIS switches 714-28 and 714-22 can be viewed as being concatenated to form a single double word input. The shifter 714-24 provides a 36-bit output shifted in accordance with the shift count. The ZSHFOP switch 714-28 is controlled by bits 24-25 of the microinstruction word while the shift count is established by the sequence control constant fields (bits 138-143 of the microinstruction word of FIG. 6a which is appropriately selected via the auxiliary arithmetic control unit 722. For the purposes of the present invention, the ALU 714-20 and 714-24 may be considered conventional in design.

The scratchpad memory 714-30 provides a working space for storing various data required for the execution of certain instructions as well as various constants and descriptor values. For example, octal locations 10-15 are used to store an edit instruction table value required for carrying out edit operations. Writing into the scratchpad memory 714-30 involves first loading the RSPB buffer register 714-32 with input data applied via the ZRESB switch 714-38. During a next cycle, the contents of the register 714-32 are written into the location specified by the signals applied to the ZPSPA 0-6 lines by the AACU unit 722. Writing takes place when bit 22 of the microinstruction word (RSP field) is forced to a binary ONE.

As concerns the other switches, as mentioned, the results produced by the unit 714 are provided via the ZALU switch 714-26, the BSPDI switch 714-34, the ZRESA switch 714-36 and the ZRESB switch under microprogram control. The ZALU and ZSPDI switches provide a first level of selection to the ZRESA and ZRESB switches which provide a last level of selection. Since both the ZRESA and ZRESB switches have identical input sources, they can provide the same output data. The selection of ZALU switch data is under control of bits 30-31 (ZALU field) while the selection of ZSPDI data is under control of bit 23 (ZSPDI field). The selection of ZRESA and ZRESB data is under the control of bits 17-18 and bits 19-20 respectively of the microinstruction word of FIG. 6a.

The registers of banks 714-12 and 714-10 are addressed independently by bits 3-5 (TRL field) and bits 6-8 (TRH field) respectively. The first bit in each field specifies whether one of the four registers is to be addressed while the other 2 bits select the register to be addressed. Lastly, a four position switch 714-40 is used to load a RREG register 714-42, with constant values or with signals corresponding to bit positions 24-26 of the RBIR register 704-152.

Figure 3H:
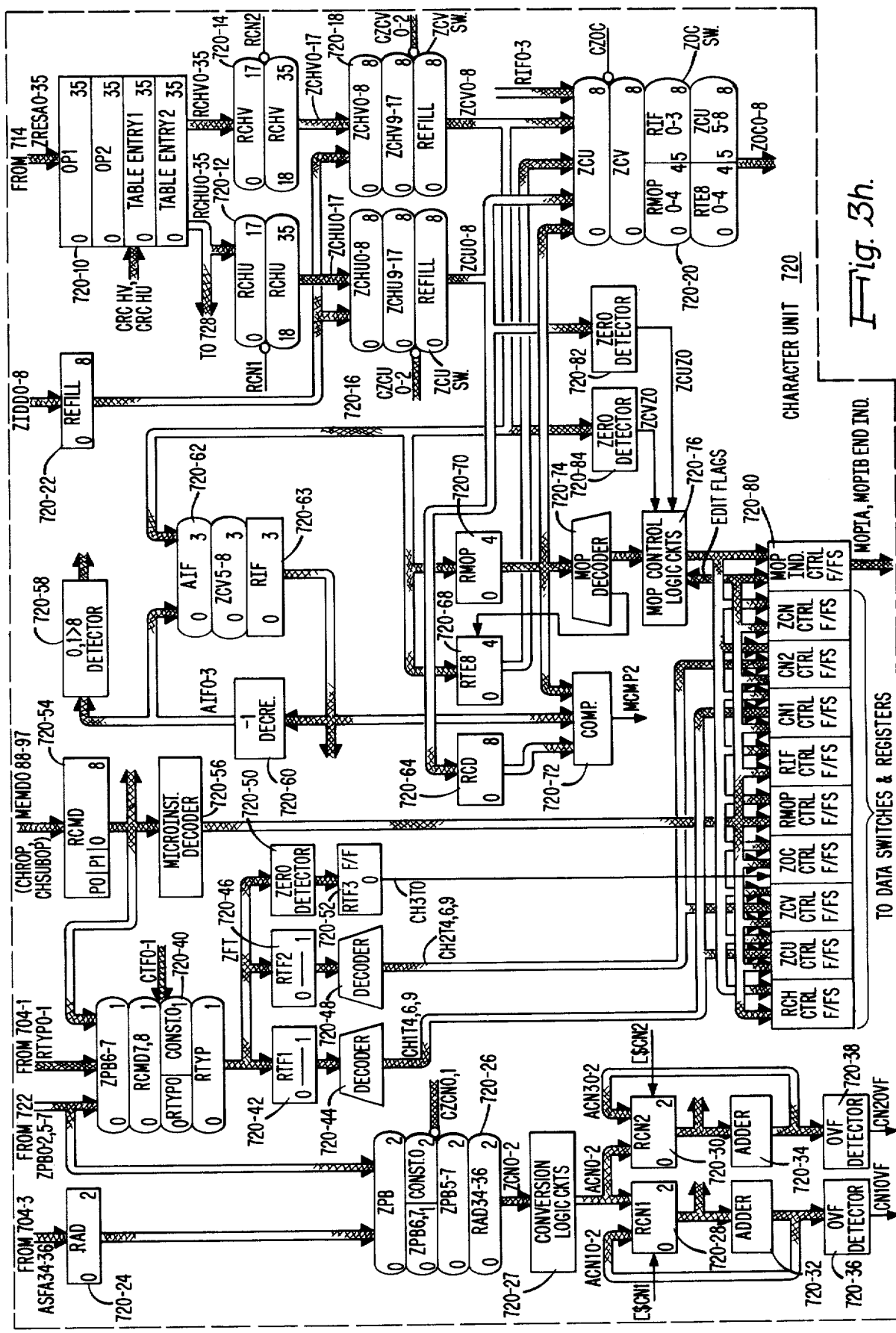

Character Unit 720—FIG. 3h

It is seen that the unit 720 includes a bank of 4 registers 720-10, a number of registers 720-22, 720-24, 720-28, 720-30, 720-42, 720-46, 720-54, 720-63, 720-64, 720-68 and 720-70, conversion logic circuits 720-27, adder networks 720-32 and 720-34, comparator network 720-72 and a number of decoder/detector networks 720-36, 720-38, 720-44, 720-48, 720-50, 720-56, 720-58 and 720-74 interconnected via a number of multiposition selector switches 720-26, 720-40, 720-62, 720-12 through 720-20. The control and selection of such switches and the strobing of the various registers is under the control of a number of flip-flop circuits included in block 720-80 and a pair of zero detector circuits 720-82 and 720-84.

The RCH bank of registers 720-10 are used as operand buffer registers for storing information received from the EU 714 via the ZRESA lines 0-35. A first register (OP1) is used to store the operand specified by descriptor 1 or data sent to unit 728 or unit 722. A second register (OP2) is used to store the operand specified by descriptor 2. Third and fourth registers (TABLE ENTRY 1, TABLE ENTRY 2) are used to store edit insertion table entry values obtained from EU 714.

The RCN1 register 720-28 holds the actual character position data for descriptor 1 which is used to select a character to be selected by ZCU switch 720-12. The RCN2 register 720-30 holds signals designating the character position data of descriptor 2. The contents are used to select a character from switch 720-14.

The ZCU and ZCV switches 720-16 and 720-18 are under the control of the ZCU and ZCV flip-flops of block 720-80. The RCN 1 and RCN 2 registers 720-28 are loaded under the control of the CN1 and CN2 flip-flops of block 720-80 in response to signals generated by decoder 720-56. This is done as a function of the character type (4, 6 or 9-bit characters) defined by the contents of the RTF1 and RTF2 registers 720-42 and 720-46 and the starting character position signals generated by the conversion logic circuits of block 720-27. The circuits of block 720-27 convert signals ZCN0-2 applied via switch 720-26 corresponding to an input character position value into an output character position. For 9-bit characters, there is no conversion necessary (i.e., input character position = output character position).

The two bit RTF1 register 720-42 holds the character type information relative to descriptor 1 while the two bit RTF2 register 720-46 holds the character type information for descriptor 2. The one bit RTF3 register 720-52 holds the character type information for descriptor 3. When descriptor 3 consists of 9-bit characters, the detector 720-50 sets the RTF3 register to a binary ONE. In all other cases, the RTF3 register is set to a binary ZERO. As seen from the Figure, these registers are loaded via switch 720-40.

The five bit RMOP register 720-70 stores the "microoperation" values required for processing an edit instruction while the 4-bit RIF register 720-63 stores the information field (IF) values for such instructions. The 9-bit RCD register 720-64 is used during certain compare instruction operations for storing a first operand value. The 5-bit RTE8 register 720-68 stores the 5 most significant bits of the eighth edit insertion table entry value in response to a load signal generated by decoder 720-74 in response to a load command. The REFILL register 720-22 is used to store signals received from the unit 704-150 via the lines ZIDD 0-8. The RAD register 720-24 stores character position bits received from the unit 704-3 via the lines ASFA34-36.

The indicator flip-flops of block 720-80 store the result of an operation specified by the contents of the RMOP register 720-70. The indicators include a 2-bit MOP indicator A (MOPIA), a 3-bit MOP indicator B (MOPIB) and a 1-bit END indicator. The MOPIA indicators are decoded as follows:

| | |
|---|---|
| 00 | go to MOP execute operation |
| 01 | go to LOAD MOP operation |
| 10 | Test MOPIB |
| 11 | N/A |

The MOPIB indicators provide additional status when the MOPIA indicators have the value "10". They are decoded as follows:

| | |
|---|---|
| 000 | test the state of a length 1 indicator for underflow (L1UDF set when the output of the AXP adder equals 0 means L1 exhausted) and the state of the CN1 overflow indicator (CN1 OVF). |
| 001 | test the state of a length 3 indicator for underflow (L3UDF set when the output of the AL adder equals 0, means L3 exhausted) and the state of a CN3 overflow indicator (CNLOVF) which is set when the output of the AP adder equals 0. |
| 010 | test the states of the L1UDF, CN1OVF, L3UDF and CN3OVF indicators. |
| 011 | decrement by 1, the length 2 value and test the states of the L3UDF and CN3OVF indicators during a first cycle and test the states of a length 2 underflow indicator (L2UDF) and the CN2OVF indicator during a second cycle. |
| 100 | test the states of the L3UDF, CN3OVF, L1UDF and CN1OVF indicators during a first cycle. Transfer the contents of the RAAU register to EU 174, decrement the length 3 value by 1 and increment the CN3 value by one during a second cycle. During a third cycle, test the states of the L3UDF and CN3OVF indicators. |
| 101 | load the table entry value. |
| 110 | change the table values. |
| 111 | N/A. |

The END indicator is set to indicate that the operation specified by the MOP value is complete.

The Auxiliary Arithmetic and Control Unit (AACU) 722—FIG. 3i

The AACU 722 includes 3 parallel added networks 722-2, 722-6 and 722-8 designated herein as a pointer adder network, an exponent added network and a length adder network respectively. The pointer network 722-2 includes two banks of 4 registers (RP0-RP3 and RP4-RP7) 722-20 and 722-22. Each bank has its own multiposition switch (722-23 and 722-24) for selecting the data to be written therein and a pair of four position output switches for selecting the data to be read therefrom (i.e., switches 722-27, 722-28 and 722-29, 722-30). Additionally, bank 722-20 has a second input switch 722-32 whose output feeds the ZRPA switch 722-23 and provides for the selection of additional input data.

The ZRPC switch 722-32, the ZRPA switch 722-23 and the register bank 722-20 are jointly controlled by either bits 64–68 (ZRPAC field), bits 69–71 (ZRPAC-3 field) or bit 67 (ZRPAC-4 field) depending upon the microinstruction format. The ZRPA switch 722-23 can select one of the outputs from the ZRPC switch 722-32 via a first position, a value for loading a character offset for address modification/loading address register instructions for the character unit 720 via a second position and a character pointer value for a 9-bit character via a third position.

The ZPA switch 722-27 and the ZPB switch 722-28 select data from the RP0-RP3 register bank 722-20 under the control of bits 59–60 (ZPA) and bits 61–62 (ZPB) respectively. The ZRPB switch 722-24 and register bank 722-22 are jointly controlled by a single control field depending upon the type of microinstruction format bits 74–78 (ZRPB-0), bits 69–73 (ZRPB), bits 72–74 (ZRPB-3) or bit 68 (ZRBP-4). The ZRPB switch 722-4 can select the output of adder output switch 722-36 via a first position, an information field from the character unit 720 via a second position, a word or character pointer value for a 9-bit character via a third position and a character pointer value for a 9-bit character via a fourth and a fifth position.

The ZPC switch 722-29 and the ZPD switch 722-30 select data from the RP4-RP7 register bank 722-23 under the control of bits 57-58 (ZPC field) and bits 67-68 (ZPD field) respectively. As seen from FIG. 3, the outputs from the switches 722-27 through 722-30 are applied to the A and B operand switches 722-25 and 722-26. The outputs of these switches are applied to a pointer adder 722-34.

The ZAPA switch 722-25, the ZAPB switch 722-26 and the adder 722-34 are jointly controlled by a single control field bits 79-84 (AP field) or bits 82-83 (AP-3 field) depending upon the microinstruction format. As seen from the Figure, the ZAPA and ZAPB switches 722-25 and 722-26 select the outputs from the ZPA, ZPC, ZPB or ZPD switches or a constant value for application to adder 722-34.

A ZLX switch 722-36, a ZXC switch 722-38, a RSC register 722-40 and a ZRSC switch 722-42 operated under micro-program control are arranged to provide shift counts to the execution unit shifter. The ZSC switch 722-38 can also be used for loading data into the RP0-RP3 register bank 722-20 via the ZRPC and ZRPA switches 722-32 or into the RP4-RP7 register bank 722-23 via the ZRPB switch 722-24.

The selection of ZLX switch positions is controlled by bits 48-49 (ZLX field). The ZSC switch 722-38 is used to select one of the outputs of the ZLX switch 722-38 under the control of bits 50-52 (ZSC field). The RSC register 722-40 is loaded with the right most 6 bits from the output of the ZLX switch 722-38 under the control of bit 47 (RSC field). The two position ZRSC switch 722-42 selects which of two sources is to supply a shift count to the execution unit 714. Bit 84 (ZRSC field) selects either bits 138-143 (CNSTU/L field) or the RSC register 722-40 as a shift count source.

The last group of circuits shown in block 722-2 include a ZAAU switch 722-44 and a RAAU register 722-46 connected to receive the output of switch 722-44. The ZAAU switch 722-44 is used for transferring data to the register 722-46. From thate the data is transferred via the section 704-5 to the execution unit 714 on the ZEB lines 0-35.

The inputs of the ZAAU switch 722-44 are selected by bits 50-52 (ZAAU field). The first position applied a 9-bit character output from the character unit 720 via the lines ZOC 0-8. The second and third positions are used for displaying the outputs from the length adder and exponent adder of blocks 722-6 and 722-8. The RAAU register 7-2-46 is loaded from the ZAAU switch 722-44 in response to bit 47 (RAAU field).

As seen from FIG. 3*i*, the exponent adder network 722-6 includes a single bank of 4 registers (RXPA-RXPD). The bank 722-60 has a multiposition switch 722-62 for selecting the data to be written therein and a pair of four position output switches for selecting data to be read therefrom (i.e., switches 722-64 and 722-66). The ZXP switch 722-62 and the RXPA-RXPD register bank 722-60 are controlled by bits 59-62 (ZXP field), bits 65-66 ZXP-1 field or bits 75-77 (ZXP-3 field).

A first position of the ZXP switch 722-62 is used to load the exponent result into register bank 722-60. The second position is used to store the result from the length adder 722-8. The next or third position is used for storing exponent values received from the character unit 720. Lastly, the fourth position is used for storing numeric scale factor information received from the RSIR lines 24-35.

The ZXPL switch 722-64 and ZXPR switch 722-66 select data from the register bank 722-60 under the control of bits 63-64 (ZXPL field) or bit 64 (ZXPL-1 field) and bits 65-66 (ZXPR field) respectively. The outputs from the switches 722-64 and 722-66 are applied as inputs to an A operand switch 722-68 and B operand switch 722-70 respectively. These switches apply selected inputs to a pair of 12-bit adders (AXP and AXM) of block 722-72 which generate an exponent output value applied to an output ZAXP switch 722-74. A single control field AXP (bits 69-73) controls the operation of the ZXPA switch 722-68, ZXPB switch 722-70, the adders, the ZAXP switch -22-74 and the loading of a RE register 722-76.

One adder AXM is arranged to receive the contents of the RE register 722-76 for providing absolute value when the sign of value generated by the AXP adder is negative (i.e., the AXP sign indicator not shown has control over the ZAXP switch selection).

The ZXPA switch 722-68 can select via a first position the contents of the RE register 722-76 or the output from the ZXPL switch 722-64 via a second position. The ZXPB switch 722-70 can select via a first position, a constant value, via a second position binary floating point exponent signals applied to the RDI lines 0-7, via a third position a numeric scale factor value applied to the RSIR lines 24-35, a fourth position the output from the ZXPR switch 722-66 and via a fifth position the output from the ZLNA switch 722-84.

The third adder network 722-8 for managing operand length data, similar to network 722-6, includes a single bank of 4 registers (RLN1-RLN4). The bank 722-80 has a multiposition switch 722-82 for selecting the data to be written therein and a pair of four position output switches for selecting data to be read therefrom (i.e., switches 722-84 and 722-86). The ZLN switch 722-82 and the RLN1-RLN4 register bank 722-80 are controlled by bits 59-63 (ZLN-1 field), bit 63 (ZLN-2 field) bits 79-81 (ZLN-3 field) or bits 79-83 (ZLN-4 field) depending upon microinstruction format.

The ZLN switch 722-82 applies the output of the length adder as an output via a first position, the output of the ZAXP switch 722-74 via a second position and a length field value from RSER lines 24-35 via a third position. Additionally, it applies a numeric length field value from RSIR lines 30-35 via a fourth position, a shift count value from RDI lines 11-17 via a fifth position and a length value from RCH lines 24-35 via a sixth position as inputs to register bank 722-80.

The ZLNA and ZLNB switches 722-84 and 722-86 select data from the register bank 722-80 under the control of bits 53-54 (ZLNA field) and bits 55-56 (ZLNB field) respectively as inputs to an A operand switch 722-88 and a B operand switch 722-90 respectively.

The outputs of these switches are applied as inputs to a 12-bit length (AL) adder 722-92. The ZALA switch 722-88, the ZALB switch 722-90 and AL adder 722-92 are all controlled by bits 74-78 (AL field). The ZALA switch 722-88 selects as an operand the output of the ZLNA switch via a first position, a constant field via a second position, the output of the ZPC switch via a third position and a numeric length field via a fourth position.

The ZALB switch 722-90 can select as an operand, a constant field via a first position, the output of the ZLNB switch 722-86 via a second position, the output of the ZXPL switch via a third position, a shift count value from RDI lines 11–17 via a fourth position, the output of the ZPC switch via a fifth position, the output of the ZPA switch via a sixth position and bit positions 6 and 7 of the ZPC switch 722-29 via a seventh position.

The unit 722 includes another group of circuits for furnishing a scratchpad address to unit 714. The circuits include a ZSPA switch 722-100, a RSPA register 722-102 and a ZRSPA switch 722-104, each controlled by bits 48–49 (ZSPA field), bit 47 (RSPA field) and bits 50–52 (ZRSPA field) respectively. The ZSPA switch 722-100 can select as an output, bits 91–97 corresponding to a scratchpad address field via a first position and the output of pointer adder 722-34 via a second position.

The ZRSPA switch 722-104 can select as an output, the contents of register 722-102 via a first position, a scratchpad address field via a second position and a descriptor value applied from the RSIR lines 32–35 via a third position and a value from the RSPR register of unit 704-150 via a fourth position. Additionally, the unit 722 includes a pair of registers 722-106 and 722-108 which are loaded with signals corresponding to bit positions 21–23 of RSIR register 704-154. One register is loaded when bit 53 of the microinstruction word of FIG. 6b or the FPOP flip-flop is a binary ONE. The registers are selected for loading in accordance with the states of the RDESC register 704-140 (00 or 10=R1DW; 011=R2DW).

The various control field signals used by the AACU 722 are derived from a decoder 722-110 which receives as inputs, the various microinstruction word bits loaded into a register 722-112.

CACHE UNIT 750—FIG. 4

General Description

The cache unit 750 is divided into five primary sections: a command buffer section 750-1, a control section 750-3, a cache directory section 750-5, a cache storage section 750-7 and an instruction buffer section 750-9.

Command Buffer Section 750-1

The command buffer section 750-1 includes a four word write command buffer 750-100 and a four word read command buffer 750-102 which are addressed via the counters 750-104 and 750-106. The write ZAC buffer 750-100 provides storage for a single ZAC write command while the read ZAC buffer 750-102 provides storage for up to four read ZAC commands.

The processor 700 transfers commands via the RADO/ZADO lines of interface 605 through the first position of a selector switch 750-110. The processor 700 transfers cache command information via the DMEM and DSZ lines through the first position of a selector switch 750-112. The states of these lines are held or stored in a register 750-114. As seen from the Figure, this information is also written into the buffers 750-100 and 750-102.

In addition to the cache command signals, the processor 700 sets a DREQCAC line. The processor 700 sets other control lines (e.g. HOLD-C-CU, CANCEL-C, CACFLUSH, BYPASS-CAC, READ IBUF, READ EVEN) when it wants to have the cache unit 750 perform other types of operations.

The states of the other control lines are decoded by a decoder 750-116 whose output is used to enable the ZAC buffers 750-100 and 750-102. Additionally, the processor 700 transfers zone bit signals for certain types of write commands via the lines DZD0-3. These signals are loaded into a RDZD register 750-132 via a switch 750-134. From there, the contents are applied via a switch 750-136 to a set of byte CBYSEL lines. Additionally, the signals on the DZO lines are applied to the MITS lines via a switch 750-139. Other zone signals (bits 5–8) are loaded into an RC address register 750-140 and thereafter applied to another set of byte CBYSEL select lines via a switch 750-142.

A plurality of busy bit registers 750-120 and 750-122 are used to determine which of the locations in the RZAC buffer 750-102 are available. The states of these registers are decoded via a priority decoder network 750-130 which selects the first available buffer location. The value developed is stored in the register 750-106 and is used as a write address for the read ZAC buffer 750-102. When the cache request involves doing a backing store (MEM memory) fetch (cache miss signaled by the state of signal BSPD), the appropriate busy bit or both busy bits are set in accordance with the number of SIU responses (ARDA signals) which will be generated. The busy bits are set by signals applied to a pair of lines SETBOTHBSY and SETONEBSY from a decoder, not shown, which decodes the particular command resulting in the application of a signal to one of the BSY lines. For example, a read single command (not bypassed) causes two SIU ARDA responses, each response for bringing in a pair of words. Thus, both busy bits are set. In the case of a read single bypass command, there is only one SIU ARDA response. Hence, only one busy bit is set. Resetting of the busy bits takes place in response to the ARDA line via a RSPB register 750-124 which receives signals from the SIU 100 via the RMIFS lines.

In greater detail, the contents of registers 750-120 and 750-122 are set in accordance with the number of ARDA responses as mentioned when a PENBIT signal is a binary ONE (i.e., the pending bit corresponding to the block is not set). The decoder circuit 750-130 decodes the states of the busy bits and sets counter register 750-106 to the appropriate address value specifying the next empty location within read RZAC buffer 750-102.

The same address signals PRACW0-1 are also applied to a second position of the switch 750-139 in the case of read commands. From there, the signals are loaded into a 4-bit MITS register 750-138 and applied to the MITS lines. The main memory 800 operates to return the coded signals to cache unit 750 via the MIFS lines upon transferring the requested pairs of data words of a block. Thereafter, the signals are loaded into a 4-bit RMIFS register 750-125 and then into the RSPB register 750-124 when the control state signal THCFD is a binary ONE. The received value causes the resetting of the appropriate busy bit indications stored in registers 750-120 and 750-122.

It will be noted that the RMIFS bit signals 2 and 3 are used to address read RZAC buffer 750-102 for read out of the appropriate command. Additionally, as explained herein, signals from an out pointer circuit (COUT), not shown, are used to access commands stored in read ZAC buffer 750-102. The busy bit indications stored in register 750-124 and 750-126 are applied as inputs to the exclusive OR circuits of block 750-132. These circuits are operative to generate output signals indicative of the number of busy bits set. These outputs are in turn applied to different positions of a 4 position selector switch 750-133. By selecting the appropriate position or location, in response to the RMIFS bit signals 2 and 3, the switch 750-133 provides output signal SECRCV whose state determines when the cache unit 750 has received the second pair of words of a block. The SECRCV signal is applied as an input to block 750-3.

The outputs of the write buffer 750-100 and read ZAC buffer 750-102 are applied to different ones of a group of two position switches 750-150, 750-152, 750-154, 750-156 and 750-158. The output of ZAC buffer switch 750-150 is loaded into a SIU output register 750-174 via the switches 750-170 and 750-172. The output from the ZAC switch 750-152 is loaded into a pair of data register 750-180 via the switches 750-177 and 750-178.

The outputs of switches 750-154 and 750-158 are applied to a further switch 750-160 and stored in a holding register 750-162. The output of switch 750-156 is applied to a decoder 750-166 together with the DMEM outputs of switch 750-160. The other outputs from this switch are applied to a decoder 750-168. Additionally, the output of the switch 750-158 is applied to a decoder 750-164.

The decoder 750-166 decodes the cache commands received from processor 700 via the DMEM0-3 lines and those read out from the buffers 750-100 and 750-102 and generates signals for transferring commands to the cache storage 750-7 and directory 750-5. That is, the cache decoder 750-166 is used to control what information will be written into the cache storage 750-7 from the processor 700. The decoder 750-168 decodes the states of the BYPCAC and DSZ1 signals. It will be noted that the source of these last mentioned signals corresponds to processor 700 or switch 750-154.

The decoder 750-164 decodes the commands read out from the buffers 750-100 and 750-102 and generates signals for transferring commands to MEM memory (backing store) via the SIU 100. That is, the S decoder 750-164 is used to control the sending of information from the command buffers 750-100 and 750-102 to the SIU.

Additionally, the ZPSW switch 750-178 via a first position selects the ZAC command from the processor 700 on the RADO/ZADO lines for transfer to the SIU 100 on the DTS lines via the switch 750-172 or writes the main memory data into cache storage 750-7 via the RDO, RDI data registers 750-180. The second position of the ZPSW switch 750-178 applies the data output of the ZALT switch 750-177 to the DTS lines (ZAC data) or writes the main memory data from the DFS lines into cache storage 750-7 via the RDO, RDI registers 750-180 or transfers the ZAC commands to the processor 700 via the ZDI lines.

The ZACSW2 switch 750-170 is used to transfer a ZAC command (first position) or data from the ZAC buffer to the SIU 100 via the DTS lines (second position).

Control Section 750-3

This section includes a number of control state flip-flops which generate signals for sequencing the cache unit 750 through the required cycles of operation for processing the various commands. Additionally, the section includes the necessary logic circuits for generating the required control signals during the required cycles of operation. For the purposes of the present invention, these circuits may be implemented in a conventional manner. Therefore, in order to simplify the description herein, only a brief description and the Boolean expressions will be given for certain control state flip-flops and control logic circuits as required for an understanding of the operation of the present invention.

The control state flip-flops generate a series of timing sequences which control the following data transfer sequences:

(1) processor to cache, SIU (operation to cache and to SIU);
(2) processor to SIU (transfer write data to SIU);
(3) ZACBUF to cache (operation to cache);
(4) ZACBUF to SIU (operation to SIU);
(5) processor to ZACBUF (write data saved in buffer);
(6) SIU to cache, processor (2 words transferred);
(7) SIU to cache, processor (1 word transferred).

The transfers utilize the following flip-flops.

Control State Flip-Flops

The OATB flip-flop is the first flip-flop set in a first sequence which enables a transfer information from the SIU 100 to cache 750 and to the processor 750.

The OATB flip-flop is set for one cycle in accordance with the following Boolean expression: ARDA·DPFS.

The THCFD flip-flop is the next flip-flop set in the first sequence which enables the information received furing cycle OATB from the SIU 100 to be transferred to processor 700 via the ZDI lines. The THCFD flip-flop is set for one cycle in accordance with the following Boolean expression:
SET: $\overline{OETF} = ARDA \cdot \overline{DPFS}$.

The UG COGTH flip-flop when set permits the setting/resetting of a F/F bit, the setting of a pending bit, the setting of RR bits, writing MSA into the address of the directory section and writing data for write-single command into CACHE memory. It is set and reset in accordance with the following Boolean expressions:
SET: $\overline{HOLD} \cdot SET\text{-}COGTH$.
RESET: $(\overline{HOLD})$: $\overline{CAC}\text{-}\overline{BSY1}\cdot\overline{NO\text{-}HOLD}\text{-}\overline{CAC}\cdot CACBSY1 + NO\text{-}HOLD\text{-}CAC$.

The UGSOGTH flip-flop is the first set in a CPU to SIU sequence. When set, a first data word is put on the DTS lines. It is set for one cycle in accordance with the following Boolean expression:
SET:     $\overline{HOLD}\text{-}DWRT$     wherein
DWRT=CWRT·SNG+CWRT·DBL+CWRT·RMT.

The CAOPR flip-flop is set in response to the read for an AOPR response. It is set for one cycle in accordance with the following Boolean expressions:
SET:     $\overline{SSET\text{-}IN\text{-}CLD\text{-}IBUF(CBYP\text{-}CAC+\overline{BPSD})+CPR\text{-}RD}$. $\overline{CBYP\text{-}CAC\cdot\overline{BPSD}}+(CRD\text{-}SNG+CRD\text{-}DBL)\cdot(CBYP\text{-}CAC+\overline{BPSD})+CRD\text{-}CLR+CRD\text{-}RMT+CWRT\text{-}SNG+CWRT\text{-}DBL+CWRT\text{-}RMT$.

The CPR-FF flip-flop is used for determining when the cache unit will respond to a DREQ-CAC signal from processor 700. When this flip-flop is set to a binary ONE during a previous cycle, the cache unit will not respond to a request except in the cases of PREREAD, INST-F1, INST-F2, LDQUAD, RD-SINGLE or RD-DBL type commands. It is set and reset in accordance with the following Boolean expressions:
SET: $(CINST\text{-}F1+CINST\text{-}F2+CLD\text{-}QUAD+CRD\text{-}DBL+CRD\text{-}SNG)\cdot(\overline{CBYP\text{-}CAC+\overline{BPSD}})+CPR\text{-}RD\cdot\overline{CBYP\text{-}CAC\cdot\overline{BPSD}}$.
RESET: $\overline{HOLD} = RD\text{-}BSY$.

The RBPSD flip-flop is used for turning off the processor 700 in the case of HOLD-ON-MISS or BYP-CAC condition. When the data comes back from the SIU 100, this flip-flop is reset except for an INST-F1 cycle. In the case of IF-1, after 4 words have been received from the SIU, this flip-flop is reset. It is set and reset in accordance with the following Boolean expressions:

SET: SSET-IN·$\overline{\text{HOLD}}$·$\overline{\text{CAN}}$·CRP·RMT+CRD-CLR+(CINST-F1+CRD-SNG+CRD-DBL)·(C-BYP-CAC+$\overline{\text{BPSD}}$)

RESET: ($\overline{\text{HOLD}}$)=THCFD·SEC-RCV·CINST-F1+DATA-RECOV·$\overline{\text{INST-F1-FF}}$.

CONTROL LOGIC SIGNALS

1. The CPSTOP signal is the signal which is used to turn off the processor 700.

CPSTOP=FBPSD=REQ CAC·[RDTYP·RZAC-ALL-BSY+CPRFF·(PR-RD+INST-F2+LDQUAD+RD-SNG+RD-DBL)+CAC-BSY1+CAOPR+UGCOGTH]+RBPSD+D-BL·FF+PENBIT·FF+(RD-IBUF/ZDI·CAC-BSY1)+(RD-IBUF/ZDI·LD-QUAD-FF)+(UG-COGTH·RD-DBL·CAC-BSY1).

2. The CAC-BSY1 signal indicates when the cache unit is busy.
CAC-BSY1=OATB+THCFD.

3. The [$F/E-WRT signal is a write enable signal for setting and resetting the full/empyt bits.
[$F/E-WRT=$\overline{\text{CAC-BSY1}}$·(UGCOGTH)·$\overline{\text{UGSOG-TH·RD-DBL·BYP-CAC·DLY-BPSD}}$·$\overline{\text{(INST-F2+LD-QUAD)·BYP-CAC·DLY-BPSD}}$.

4. The [$PEN1-WRT signal is a write enable signal for setting the operation pending bits.
[$PEN1-WRT=$\overline{\text{CAC-BSY}}$ 1·(UGCOGTH)·(INST-F2+LD-QUAD+PR-RD+RD-SNG·$\overline{\text{DLY-BPSD}}$+RD·DBL·$\overline{\text{DLY-BPSD}}$).

5. The [$PEN2-WRT signal is a write enable signal for resetting the pending bits when all data associated with a request has been received from main memory.
[$PEN2-WRT=THCFD·SEC-RCV·(INST-F2+LD-QUAD+PR-RD+RD-SNG+RD-DBL·BYP-CAC).

6. The RZAC-ALL-BSY signal indicates the busy status of the RZAC buffer established in accordance with the states of the busy bits.
RZAC-ALL-BSY=(RBB-00+RBB-01)·(RBB-10+RBB-11)·(RBB-20+RBB-21)·(RBB-30+RBB-31).

7. The [$RMIFS signal is a write a strobe signal which allows the multiport identifier bits to be stored when data or status information is received from main memory. These bits identify which location in the RZAC buffer contains the ZAC word associated with the received data (i.e., the data pertains to which of the several possible outstanding read requests).
[$ RMIFS=ARDA+AST.

8. The ALTSWO-DT signal enables incoming data from main memory to be saved in the RD0 and RD1 registers.
ALTSWO-DT=CAC-BSY 1.

9. The ALSTW2-DT signal enables data from the ZAC buffer to be transferred to the RD0 and RD1 registers.
ALTSW2-DT=DS-ALT+$\overline{\text{ALTSWO-DT}}$,
wherein DS-ALT=DS-11+DS-12+DS-13.

10. The signal OPSWO-DT through OPSW2-DT control the ZDI switch for transfers of data words from cache to processor 700 via the ZDI lines.
OPSWO-DT=RD-IBUF/ZDI
OPSW1-DT=RD-IBUF/ZDI (REQ-CAC+UG-COGTH+UGCOGTH)·WDSELO.
OPSW2-DT=RD-IBUF/SDI+WDSEL1·(RD-SNG+INST-F1)+REQ-CAC·$\overline{\text{UGCOGTH}}$·INST-F1+REQ-CAC·$\overline{\text{UGCOGTH}}$·RDSNG+REQ-CAC·$\overline{\text{UGCOGTH}}$·DBL-FF.

11. The signals ZACSW1-LC1 and ZACSW2-LC2 control the switch 750-702 which selects the source address for all cache memory chips. The sources are the processor 700 when receiving commands, the ZAC buffer and the CADR address register.
ZACSW1-LC1=$\overline{\text{ZACSW1-LC4}}$·$\overline{\text{CAC-BSY-1}}$·UGCOGTH.
ZACSW2-LC2=CAC-BSY1+UGCOGTH.

12. The signal DATA-RECOV enables the processor 700 to recover from a stop condition (e.g. restrobe registers).
DATA-RECOV=THCFD·(CINST-F1+CRD-SNG). ($\overline{\text{FMIFS-1}}$·WDSELO+THCFD·CRD-DBL (FSMIFS-1·WDSELO+$\overline{\text{FMIFS-1}}$·WDSELO+F-MIFS-1·WDSELO+CBYP-CAC)+THCFD·CRD-RMT.

13. The RD-BSY signal establishes when certain state flip-flops are reset.
RD-BSY=RBB-00+RBB-01+RBB-10+RBB-11+RBB-20+RBB-21+RBB-30+RBB-31.

14. The SSET-IN signal is used to set certain states flip-flops.
SSET-IN=$\overline{\text{RBPSD·CDBL-FF·PENBIT-FF·UG-COGTH·CAOPR·CAC-BBYI·[CPR-FF·CPR-RD·CINST-F2·CLD-QUAD·CRO-SNG·CRD-DBL]·[CRD-TYP·REAC-ALL-BSY]·DREQ-CAC}}$.

15.
SEC-RCV=$\overline{\text{RNIFS-2}}$·$\overline{\text{RMIFS-3}}$·[RBB-00⊕RBB-01]+$\overline{\text{RMIFS-2}}$·RMIFS-3·[RBB-10⊕RBB-11]+RMIFS-2·$\overline{\text{RMIFS-3}}$·[RBB-20⊕RBB-21]+RMIFS-2·RMIFS-3·[RBB-30⊕RBB-31].

16. The BPSD signal indicates a cache hit condition.

$$\text{BPSD} = \overline{\text{BYP-CAC}} \cdot \sum_{i=0}^{3} (\text{ZADO10-23} = \text{SP-i-00} \longrightarrow 14).$$

$$\text{F/Ei} \cdot \overline{\text{PENi}}$$

wherein SP-i-00-14 corresponds to the address directory outputs (the saved address bits), F/Ei corresponds to the full/empty bit "i" and PENi corresponds to the pending bit "i".

It will be appreciated that in the above expressions that the symbols
· denotes an AND operation,
+ denotes an OR operation, and
⊕ denotes an Exclusive OR operation.

Cache Directory Section 750-5

This section includes a 4 level control directory 750-500 and a 4 level set associative address directory 750-502. The directory 750-502 includes 128 columns, each column being divided into 4 levels, 15 bits in length thereby providing space in each column for four blocks. The control directory 750-500 includes 128 10-bit locations, each of which stores a 10-bit word of control information. The control information for each of the blocks includes two round robin (RR) bits, 4 full/empty (F/E) bits and 4 operation pending bits as shown.

The full/empty bits indicate whether a particular directory address has any significance (i.e., is valid). For a cache hit to occur, the F/E bit must be set to a binary ONE. A binary ZERO indicates the presence of an empty block. The round robin bits provide a count which indicates which block was replaced last. This count is incremented by 1 under the control of the full/empty bits by a counter 750-512 and is used to identify the next block to be replaced. As seen from FIG. 3, this operation takes place when the round robin and full/empty bits are read out into a pair of output registers 750-504 and 750-506. The full/empty bits are also read into a register 750-510 which controls the incrementing of the round robin bits. That is, the round robin bits are used after all the full/empty bits are set to establish which of the full blocks is to be used for new data. The resulting value (ADDRR0-1) is applied as an input to switch 750-518. All of the full/empty bits are reset by an initialize signal. The full/empty bits can be set via a register 750-516. When the processor 700 issues a read request which is a miss, during the state UGCOGTH, a value "1000" is loaded into the register 750-516. This value is written into the control directory 750-500. On the next request, the value "1100" is loaded into the register 750-516 and etc. until all the full/empty bits are set.

The operation pending bits are used to indicate when a particular operation is still outstanding. For example, the pending bits when set indicates that all the read data for a particular block has not been received. Accordingly, during a read operation, when the address directory signals a hit, with the pending bit set, the cache unit 750 halts the operation of processor 700. Hence, no new request is made to main memory.

The network for setting and resetting the operation pending bits includes a 4-bit buffer register 750-520, a block decode register 750-524 and a decoder 750-512. The registers 750-520, during a write cycle of operation, are addressed by the signals PRZACW0-1 via an address register 750-522 and signals MIFS2-3 during a read cycle. The block decode register 750-524 forces different ones of the output signals BKDCOD0-3 to binary ONES under the following conditions: (1) If at least one full/empty bit is a ZERO, when that bit is set to a binary ONE, the corresponding pending bit is set via the decoder 750-512. When all the full/empty bits are set, the next value for the round robin count is encoded and that bit position within the set of four pending bits is set to a binary ONE. A pending bit is reset via the decoder 750-512 only when the cache 750 has received all of the information (i.e., 4 words) from SIU 100. The contents of the registers 750-520 indicate the position of the pending bit to be reset. The pending bits read out from control directory 750-500 are applied as an input to decoder 750-514 for updating as required.

The pending bits are set and reset under the following conditions:
SET:INSTF2(BYPCAC+CACMISS)+LDQUAD(-BYPCAC+CACHEMISS)+PREREAD(BYP-CAC·CACMISS)+READSINGLE·CACMISS+-READDBL·BYPCAC·CACMISS.
RESET: INSTF2+LDQUAD+-PREREAD+RDSNG+RDDBL·BYPCAC.
The actual control signals are as listed previously.

The address directory 750-502, as mentioned, contains 128 sets of 4 words, each 15 bits in length. Each 15-bit word corresponds to the address of a 4 word block in the cache storage section 750-7. Whenever, a ZAC command is processed and involves either writing to or reading from cache unit 750, the 15 bits of the block address contained in the ZAC buffers 750-1h0 or 750-102 are compared on a "set basis" with the address contents of the directory 750-502 to determine the presence of a hit or miss condition. More specifically, the directory 750-502 makes its associations on bits 0-14 of the ZAC address for detection of a hit or miss condition. These bits correspond to the address signals applied to either the ZAC 11-18, 20-26 lines or to the ZADO/RADO 10-24 lines selected via an input two position ZACSW switch 750-530.

The address of the directory set is defined by a cache address (CADDL0-6) applied via a three position input switch 750-702. This enables the referencing of 4 block addresses which are read out and applied as one input to each of a group of 4 comparator circuits 750-536 through 750-542. Each of the comparator circuits compares its block address with bits 0-14 of the ZAC address. The results generated by the circuits 750-536 through 750-542 are applied to corresponding inputs of a first group of AND gates 750-544 through 750-550 together with corresponding ones of the full/empty bit signals from register 750-506. A second group of AND gates 750-552 through 750-558 combine the outputs from AND gates 750-544 through 750-550 with signals ZEXTBK0-3 indicative of which block is being selected applied via register 750-518.

The AND gates 750-552 through 750-558 provide a group of output block selection signals (i.e., signals CBSEL0-3) which are applied as inputs to a cache storage 750-700 and to a group of directory hit detection circuits of block 750-560. The circuits of block 750-560 include a group of AND gates 750-562 which logically combine signals indicative of the operation pending bits with the block selection signals, the results of which are "ored" by an OR gate 750-564 to provide a directory hit signal on line BPSD. The circuits of block 750-560 force the line BPSD to a binary ONE when the address bits 0-14 match the directory contents, the corresponding full/empty bit is a binary ONE, and the corresponding pending bit is a binary ZERO. It is assumed there are error conditions.

Cache Storage Section 750-7

The section 750-7 includes a storage unit 750-700 having 2048 (2K), 40-bit word locations organized into 128 sets of 4 blocks. The unit is constructed from bipolar chips, conventional in design. The cache storage unit 750-700 is addressed by the 7-bit address CADDL0-6 applied via the switch 750-702. The address is stored in a holding register 750-704. This causes 4 blocks of 4 words to be applied as inputs to a group of 1 of 4 selection switches (not shown). The appropriate block (level) is determined by the states of the block select signals applied to the CBSEL0-3 lines. The signals applied to the CBYSEL0-7 lines via switch 750-708 provide the appropriate selection of even word and odd word bytes. Between words 0, 2 and 1, 3 the byte selection is independent and proceeds as follows:

OBYSEL0 (byte 0 select)
for words 0, 2

-continued

```
    .
    .
    .
CBYSEL3 (byte 3 select)
    for words 0, 2
CBYSEL4 (byte 0 select)
    for words 1, 3
    .
    .
    .
CBYSEL7 (byte 3 select)
    for words 1,3.
```

The signals applied via lines CWSELO-3 via a decoder 750-706 is used for desginating the words. This ensures that the contents of the appropriate bit positions of the group of memory chips which comprise the unit 750-700.

The words of a selected block are applied as inputs to a number of sets of OR (NAND) gates 750-712 through 750-716. Each group of gates select the word of the selected block. The word outputs from the OR gates are applied as inputs to an instruction buffer 750-900 via a second position of a two position switch 750-902 and to the first 4 positions of an output ZDI switch 750-720 for forwarding to processor 700. The fifth position of the switch applies the word contents of registers 750-180 to processor 700 via a ZBP switch 750-902. Lastly, the sixth position of the ZDI switch 750-720 applies the output of the instruction buffer 750-900 via the ZIB lines 0–39.

As seen from the Figure, during a write cycle of operation, the word contents from the register 750-180 are applied as inputs to the unit 750-700.

Instruction Buffer Section 750-9

This section includes a 16 word instruction buffer 750-700 which receives data inputs from the registers 750-180 via the switch 750-902. As mentioned previously, the outputs from cache storage 750-700 are also written into the buffer 750-700 via the switch 750-902. Control signals and address signals applied via a switch 750-904 are decoded by a decoder 750-906 and are used to set a read address counter 750-908 and a write address counter 750-910 to the appropriate states. The address outputs of the counters are applied via a switch 750-912 and 750-914 to the buffer 750-900 and used to provide the appropriate addresses during read and write cycles of operation.

DESCRIPTION OF OPERATION

Figure 8:
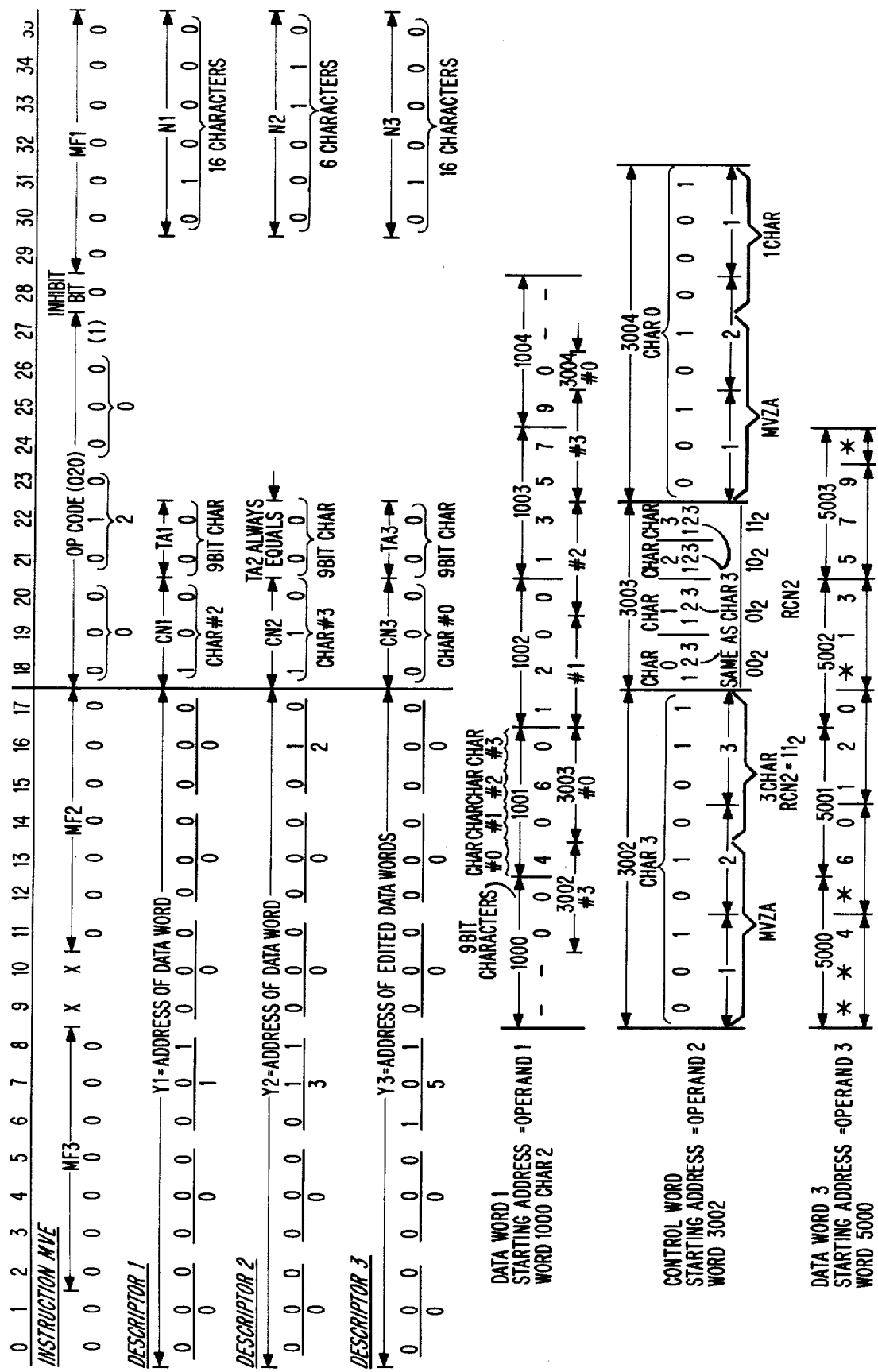
FIG. 8 is a diagram used to illustrate the operation of the system of FIGS. 3a through 3i and 4 constructed in accordance with the principles of the present invention.

With reference to FIGS. 1–10, the operation of the present invention will now be described in connection with the processing of an edit instruction having the format of FIG. 8. It is assumed that the edit instruction is coded as illustrated in FIG. 8.

This instruction is included in a repertoire of instructions having the capabilities for processing bytes, characters and bit strings termed an extended instruction set (EIS). The instruction has a multiword instruction format. The first word is a basic instruction word containing the operations code which is followed by first, second and third descriptor words. The bits 0–17 contain additional information concerning the operation. More specifically, the bits include two 7-bit modification fields coded to specify any address modifications to be performed on operand descriptors. Here, the fields can be assumed as ZEROS.

Bits 18–27 include the op-code value coded to specify an edit operation while bit 28 is an interrupt service bit which is assumed to have the value 0. Bits 29–35 correspond to another 7-bit modification field coded to specify the address modification to be performed for descriptor 1. It is assumed that this field contains all zeros.

The second word contains an 18-bit address for descriptor 1, a 3-bit CN1 field coded to specify the original character number within the word being referenced, a 2-bit TA field coded to specify which type of alphanumeric characters are in data and a 6-bit N1 field coded to specify the number of characters or bits in the data string or a register that contains the number of characters or bits. The maximum allowable length is 63. The TA field is coded as follows.

| Code | Data Type |
|------|-----------|
| 00   | 9 bit     |
| 01   | 6 bit     |
| 10   | 4 bit.    |

The CN field for 9-bit characters is coded as follows.

| Code | Character Number |
|------|------------------|
| 000  | 0                |
| .    | .                |
| .    | .                |
| .    | .                |
| 110  | 3.               |

The maximum third and fourth words contain similar information for descriptors 2 and 3 respectively.

The edit instruction requires microoperations (MOP'S) to perform the editing functions in an efficient manner. The sequence of microsteps to be executed are contained in storage and are referenced by the second operand descriptor word. Some of the microoperators require special characters for insertion in the string of characters being manipulated. These special characters are contained in the edit insertion table stored in the scratchpad memory of unit 714. This table is made up of 8 9-bit characters and at the start of each edit instruction, the processor 700 initializes the table to contain the following values:

TABLE ENTRY 1 2 3 4 5 6 7 8
VALUE ƀ * + − $ , · O ·

The operand descriptor for microoperations (OP2) points to a string of 9-bit characters which specify the microoperation to be performed during the edit instruction. Each of the 9-bit characters has a format which includes a 5-bit MOP field coded to specify the microoperation to be performed and a 4-bit IF field coded to specify either the number of source digits to be manipulated (1-16), or the number of the particular entry in the edit insertion table to be used depending upon the coding of the MOP field. The microoperations are terminated normally when the receive string length becomes exhausted (L3).

The different fields of the EDIT instruction are coded as indicated in FIG. 8. For further information regarding the subject instruction, reference may be made to the publication "Series 60 (Level 66)/6000 Macro Assembler Program (GMAP)" by Honeywell Information Systems Inc. copyright 1977 order number DD08B, Rev. 0.

For this example, it is assumed that the instruction of FIG. 8 is stored in the instruction buffer 750-700. Also, it is assumed that the operand data specified by descriptors 1, 2 and 3 is not stored in the cache unit 750 but resides in main memory 800.

Figure 10:
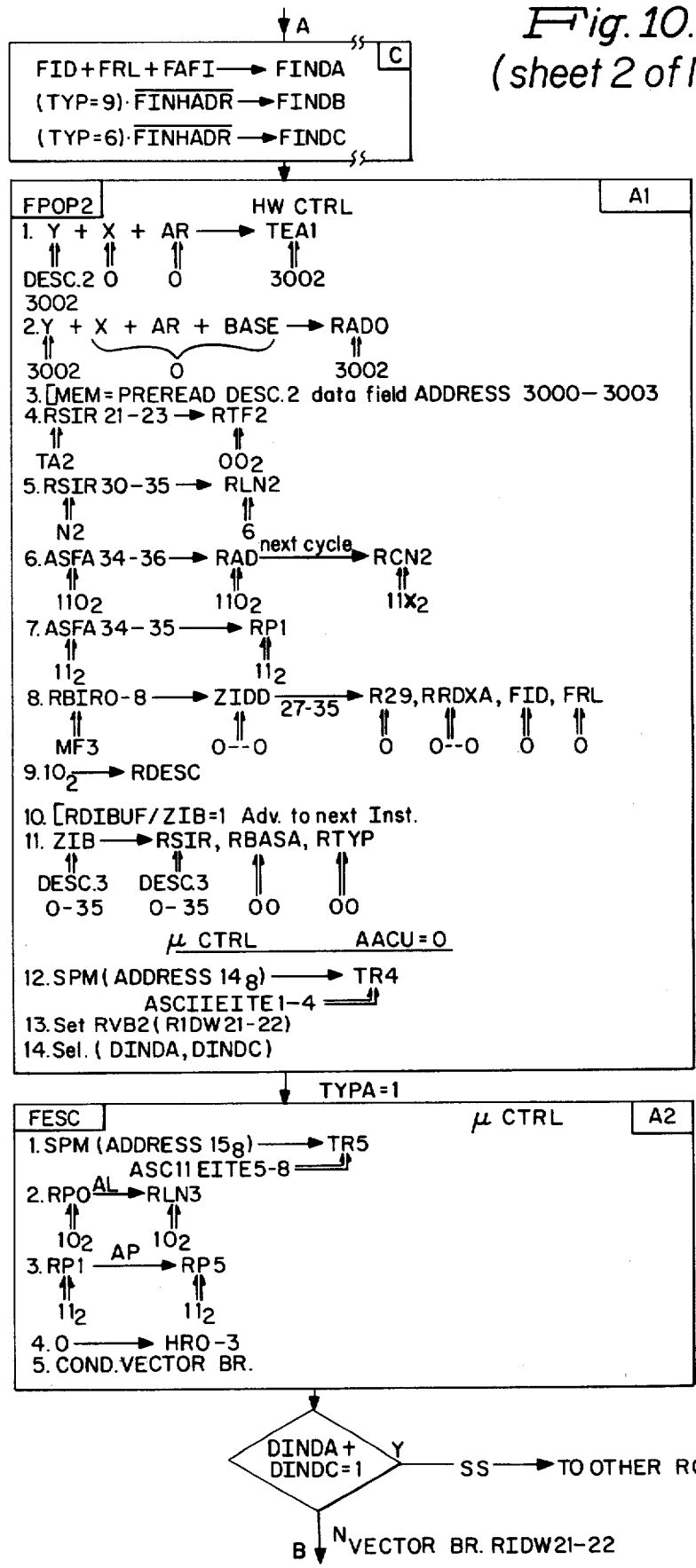
FIG. 10 is a flow chart illustrating the sequencing of processor 700 required for processing the instruction of FIG. 8 in accordance with the present invention.
Figure 10:
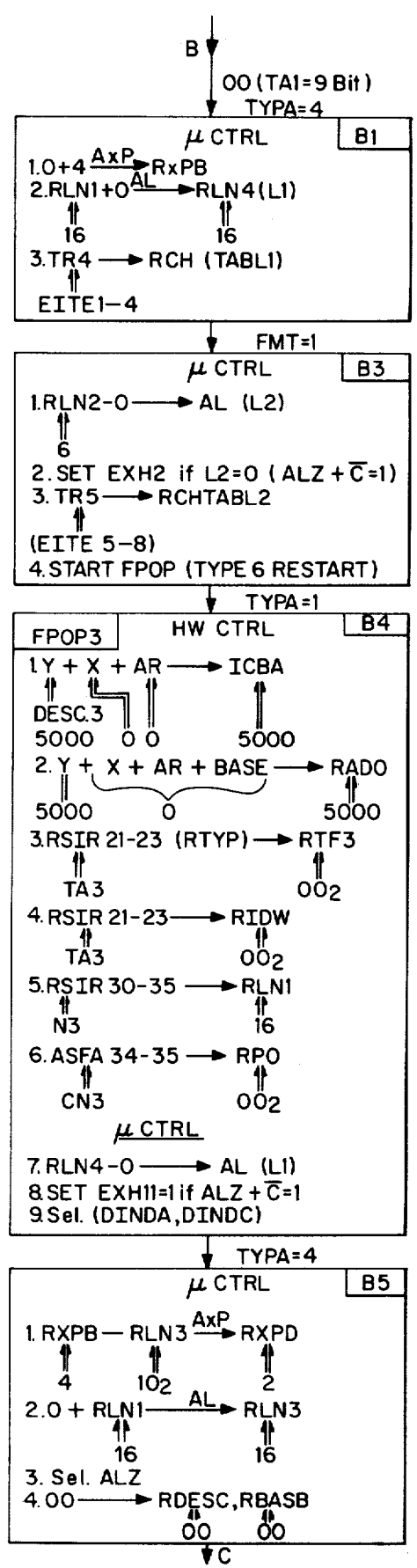
Figure 10:
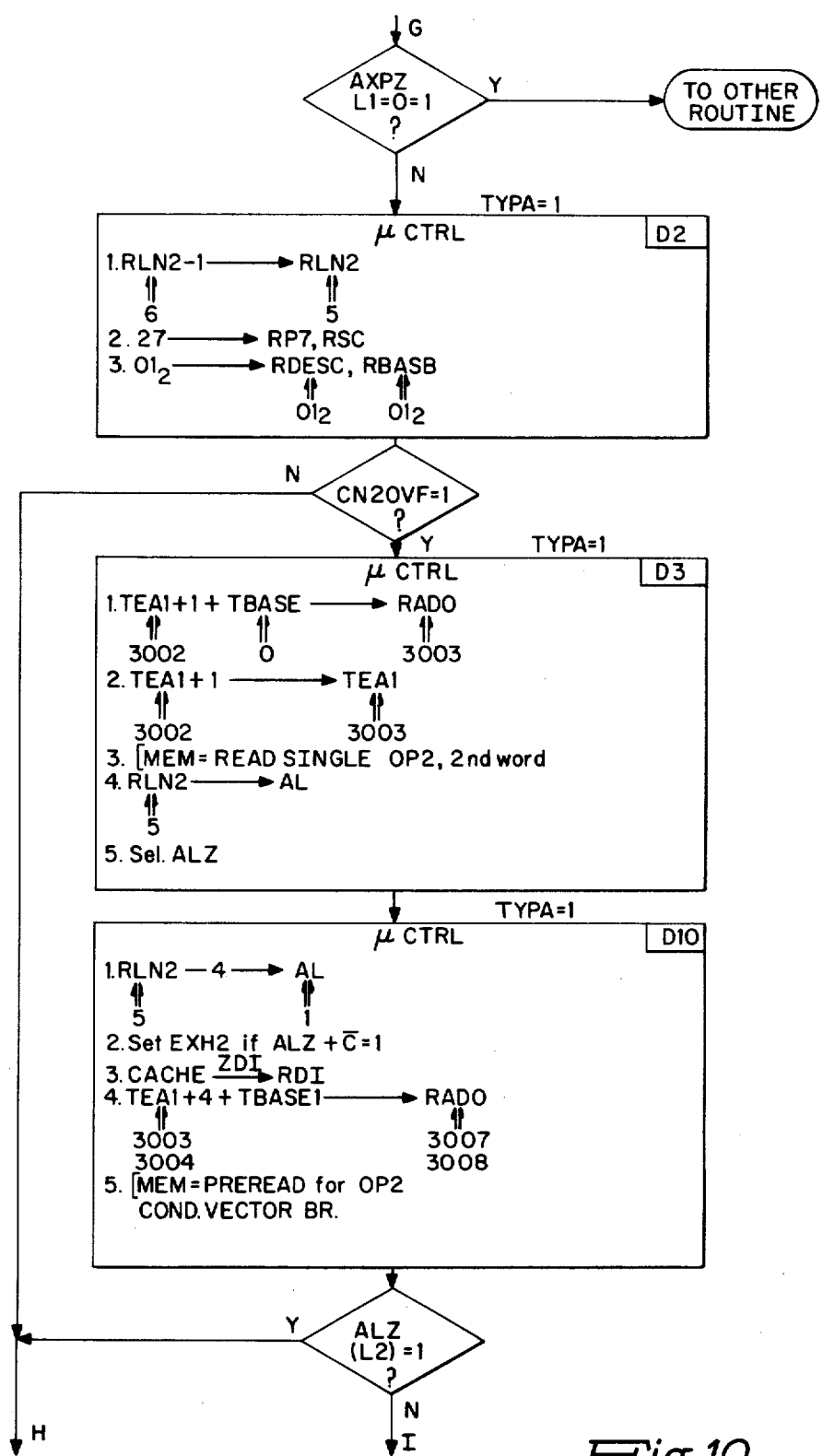
Figure 10:
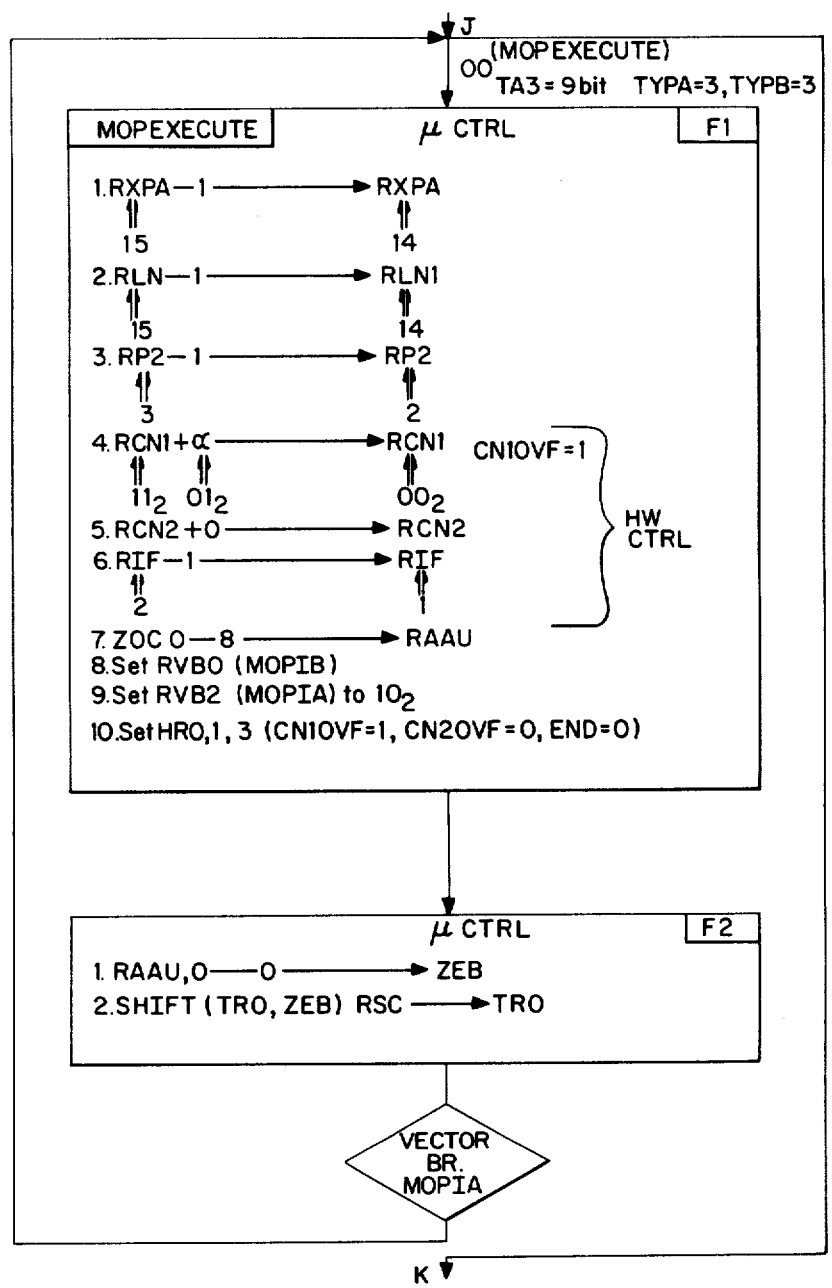
Figure 10:
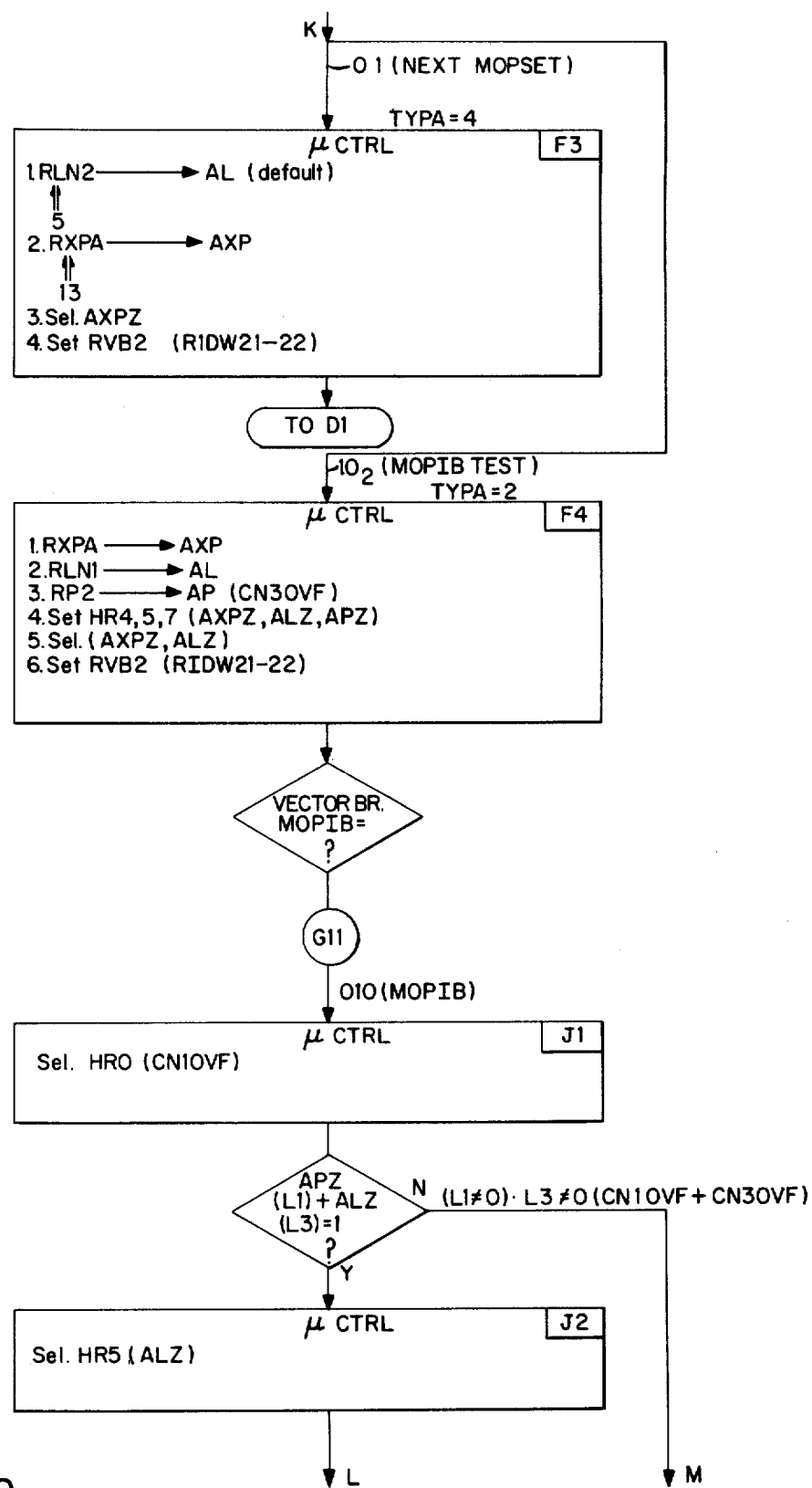
Figure 10:
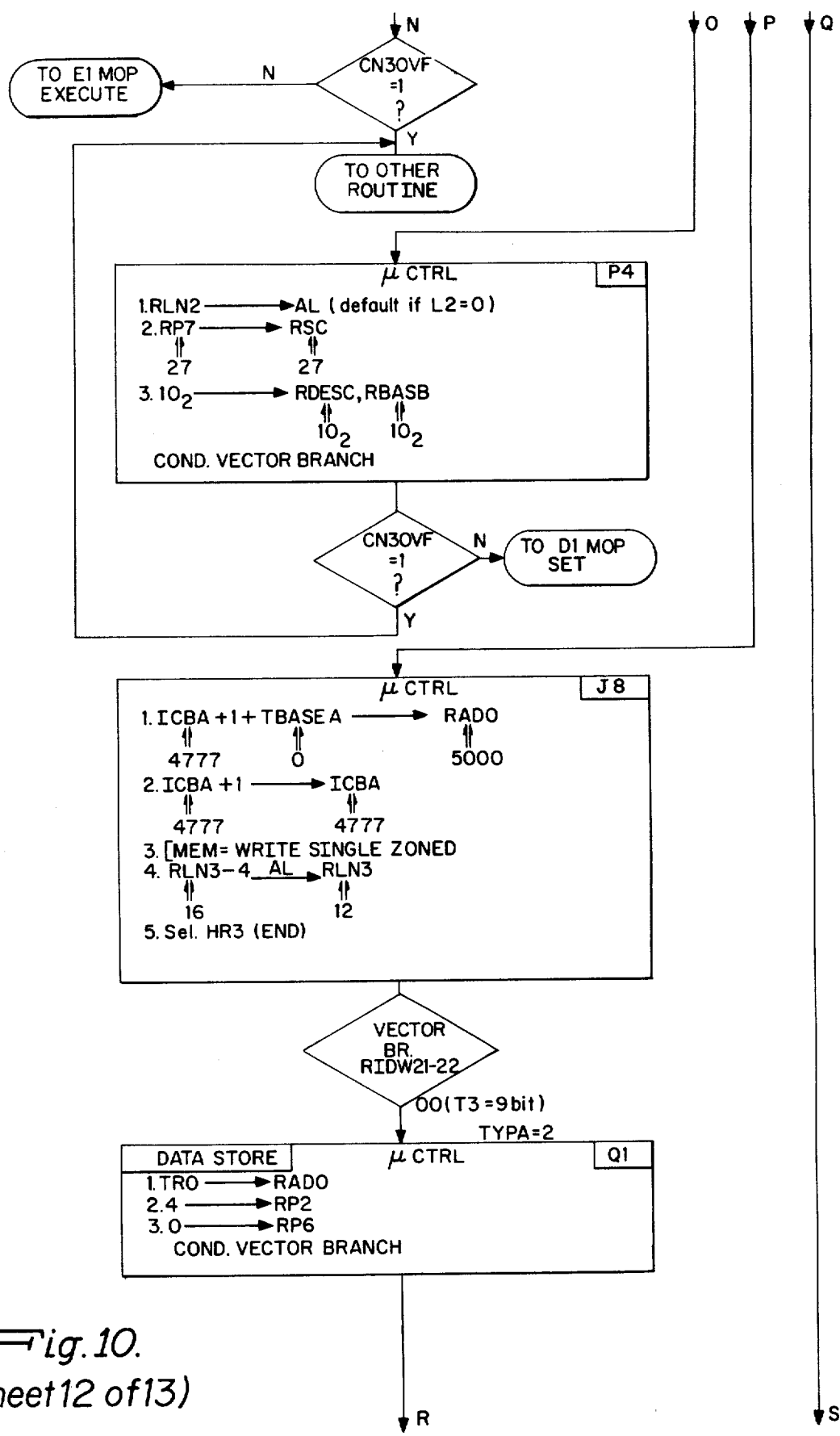
Figure 10:
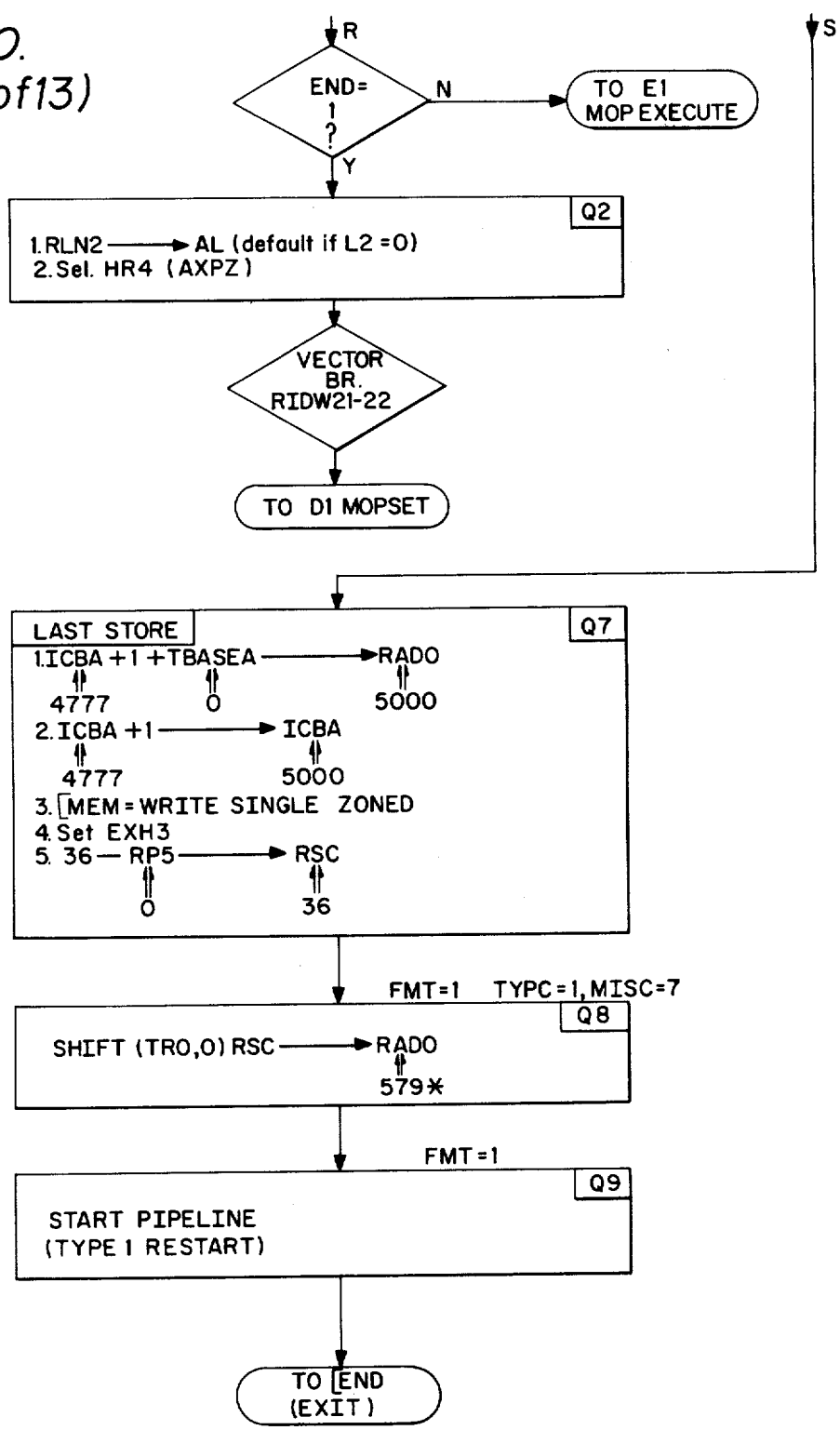

Referring to FIG. 10, it is seen that the first cycle pertinent to the processing of the edit (MVE) instruction is an [end cycle which corresponds to a last cycle of the previous instruction. This cycle is established by forcing an [END control signal to a binary ONE in accordance with the following Boolean expression: [END=FESC100·DPIPE 1-4 + . . . The state flip-flop FESC is a binary ONE when the processor 700 is operating under microprogram control such as during the execution of a program instruction. Signal DPIPE1-4 is a binary ONE when bits 38–40 are coded to specify the restarting of the pipeline wherein the processor's registers are loaded with a new instruction (i.e., type 1). Since both FESC100 and DPIPE1-4 are binary ONES, the [END cycle is entered via the circuits of block 704-102.

During the [end cycle, the processor 700, under microprogram control, transfers signals corresponding to the first word of the edit instruction into the RBIR, RSIR, RBASA, RRDXA and R29 registers of block 704-150 from the buffer 750-900 via the ZIB lines 0–39. In this example, RBASA, RRDXA and R29 registers are set to ZEROS (i.e., the fields corresponding to bits 0–2, 32–35 and 29 of the EDIT instruction are ZEROS).

Assuming that the previous instruction was not a transfer instruction, the processor 700 applies a signal to the [RDIBUF/ZIB line for incrementing by one the read out counter 750-910 of the buffer 750-900 for the read out of the next word of the edit instruction (descriptor 1). Concurrently therewith the contents on the the ZIB lines are loaded into the RBIR and RSIR registers in response to signals [$RBIR and [$RSIR generated by decoder 704-106 via switches 704-172, 704-170 and 704-173. Bits 0–2 are loaded into the RBASA register 704-144 and bits 32–35 are loaded into the RRDXA register 704-158 in response to signals [$RBASA and [$RRDXA via switches ZBASA, 704-175, 704-176 and 704-177. Bit 29 is loaded into the R29 register in response to signal [$R29 via switch 704-183.

Assuming that the previous instruction was not a transfer instruction or EIS instruction, the contents of the instruction counter 704-310 are incremented by one by adder 704-312 via position 3 of the ZIC-N switch 704-314 (i.e., 001 value).

Next, cycle FPOA is entered in response to the switching of the FPOA state flip-flop of block 704-102 of FIG. 3. The FPOA flip-flop is set to a binary ONE under hardware control in accordance with the following Boolean expression:

SET = [$\overline{HOLDI}$·(DIBFRDY·DIBFEMTY·[$\overline{STRC}$-PR·$\overline{DXEDRPTS}$·DPIPE1-4).

That is, the FPOA cycle is entered following an [END cycle when there is no hold condition relating to the pipeline (i.e., signal HOLDI00=1), the instruction buffer 750-900 is not empty (i.e., DIBFEMTY00=1), it has at least one instruction ready for transfer to processor 700 (i.e., DIBFRDY100=1), the previous instruction was not a store compare instruction (i.e., [STRCPR00=1) or an execute/repeat instruction (i.e., DXEDRPTS00=1) and the pipeline has been restarted (i.e., DPIPE1-4=1).

At this time the RBIR register 704-152 stores the edit instruction op-code field as well as the address modification fields MF1, MF2 and MF3 for descriptors 1, 2 and 3 respectively. During this cycle, the flag flip-flops FID and FRL are set by signals corresponding to bits 30 and 31 of the RBIR register 704-152 applied via the ZIDD switch 704-180 in response to [ZIDD generated by the circuits of block 704-124. Also, the R29 and RRDXA registers 704-162 and 704-158 are set by signals corresponding to bit 29 and bits 32–35 of the RBIR register 704-152 applied via ZIDD switch 704-180. Similarly, the RDESC1 flip-flop is reset to a binary ZERO as a consequence of the FPOA state flip-flop having been set to a binary ONE. The values loaded into these registers are ZEROS as seen from FIG. 8b.

Under hardware control, the value "00" is forced into the RDESC register 704-170. That is, the RDESC0 flip-flop of register 704-140 is set and reset in accordance with the following Boolean expression:
SET: RDESC0 = LARGECU field Misc. Reg + Small CU field FMTD + DESC1·(DNUM3EDIT)·FPOP·
RESET: RDESC0 = FPOA + large CU field + small CU field.

In this case, the RDESC0 flip-flop is reset to a binary ZERO as a consequence of the FPOA state flip-flop of block 704-102 being a binary ONE.

The RDESC1 flip-flop is set and reset in accordance with the following Boolean expression:
SET: RDESC1 = large CU field + small CU field + DESC0·FPOP·MTM MTR.
RESET: FPOA + (DESC1·(DNUM3EDIT)·FPOP)· + large CU field + small CU field.

Additionally, the contents of the next word (descriptor 1) of the edit instruction applied to the lines ZIB 0-39 are loaded into the RSIR register 704-154 in response to control signal [$RSIR. Bits 0–2 are loaded into the RBASA register 704-156 from the ZIB lines while bits 21–22 corresponding to the TA1 field are loaded into the RTYP register 704-160 via the ZIB lines in response to the signals [$RBASA and [$RTYP generated by the circuits of block 704-106.

The TA1 field value of 00 specifying a 9-bit character is loaded into the RTYP register 704-160 via switches 704-178 and 704-179. ZEROS are also loaded into the RBASA register 704-156 via switches 704-174 and 704-175. Also, the circuits of blocks 704-108 and 704-128 force line [RDIBUF/ZIB to a binary ONE. This increments by one the read counter 750-910 for read out of the third word of the edit instruction (descriptor 2).

The op-code signals applied via the RBIR register 704-152 to the CCS store 704-200 cause the contents of the designated storage location to be read out into output register 704-202 upon the occurrence of a clocking signal.

As seen from FIG. 3, the contents are coded to contain the following control information:
CCSO = 000;
CCSR = 0100; CCSS = 11101 and
CCSI = don't care.

Since the field CCSO contains ZEROS, the FNUM flip-flop of block 704-104 remains a binary ZERO. The CCSR field is coded to designate a 4 word field and used to increment the instruction counter by the appropriate amount upon completion of the edit instruction.

The 10-bit op-code (bits 18–27) in the RBIR register 704-152 is transformed by the CCS store 704-200 into a 6-bit code suitable for controlling and selecting the proper control sequences. The CCSS field is decoded by the circuits of 704-100 and thereafter establishes the particular sequence as well as causing the FPOP flip-flop to be switched to a binary ONE. That is, the CCSS field when decoded indicates that the instruction type is an EIS DEDIT instruction.

The FPOP flip-flop is set and reset in accordance with the following Boolean expression:
SET: FPOP=[$\overline{\text{HOLDI}}$·([NEEDDESC·FPOA·
·DEIS·$\overline{\text{DBIT}}$·DIBFRDY+DESCO·F-
POP·DEDIT+DPIPE-6)+ . . . .
RESET: FPOP=$\overline{\text{SET}}$.
In this case, the FPOP state flip-flop is set since no descriptor is needed (i.e., NEEDDESC000=1), the FPOA flip-flop is set (FPOA=1), the CCS field specifies an EIS instruction (DEIS=1), the CCS bit DBIT=0 and the instruction buffer 750-900 is in a ready state (i.e., DIBFRDY=1).

During the first FPOP cycle, the address preparation unit 704-3 generates the address specified by the first descriptor word. That is, bits 0–20 (y) of the RSIR register 704-154 are applied as one input to adder 704-322 (i.e., descriptor address) via switch 704-326 and AND gates in response to R29 register 704-162. This value is added to the contents of the address register selected by the contents of the RBASA register applied via switch 704-328 when bit R29 is a binary ONE. Since bit R29 is a binary ZERO, the effective address corresponds to the descriptor address. The output of the switch 704-328 is ZEROS as it is disabled by the state of bit 29. The effective address value is added to an address modification field (X or AR) selected via the ZX switch as a function of the contents of the RRDXA register 704-158, RTYP register 704-160 and FNUM flip-flop of block 704-104. Since these values are ZEROS, the address modification field is ZEROS.

The resulting value is then stored in the TEAO location as designated by the contents of the RDESC register 704-144 via switch 704-334. The adder 704-320 adds to the same resulting value a base value stored in a temporary base register specified by the contents of the RBASB register 704-144. It is assumed that the base value is ZERO. Thus, the resulting address corresponds to the descriptor address. The ZBASE value is also stored in the TBASE0 register via switch 704-332.

In accordance with the present invention, under hardware control, the processor 700 issues a cache pre-read command to the cache unit 750. This ensures that it gets loaded immediately with the required data while the processor 700 continues its processing of the edit instruction. As seen from FIG. 9, this command causes a first 4 word block of descriptor 1 data stored in locations 1000-1003 as specified in FIG. 8 to be read from main memory 800 in parallel with instruction processing so when the processor 700 is ready to utilize such data it will reside in cache. That is, the pre-read command permits data required in the performance of an instruction to be fetched in advance concurrently with the processing of the next descriptor of the instruction. This course speeds up the execution of the operation specified by the instruction during the initial phases of operation (i.e., fetch operands). Thus, the arrangement of the present invention has the effect of speeding up the processor in its execution of the subject instruction.

The pre-read command is generated as follows. The descriptor absolute address is loaded into the RADO register via the ZADOB switch in response to the signal [$RADO generated by the decoder circuits 704-124. Additionally, the command bits 1–4 and zone bits 5–8 are applied through the switch 704-40 in place of bits 1–8 from switch 704-46 while bits 0 and 9 are forced to ZEROS. The bits 1–4 from the RMEM register 704-130 are converted to a command code of 0111 by the decoder circuits of block 704-118. This command code specifies a memory read quad operation. Zone bits 5–8 are set to binary ONES via the input switch 704-40 and are not used for a read. Simultaneously therewith, the circuits of block 704-108 generate the pre-read code of "0111" which corresponds to the signals [MEM0TB through [MEM3TB. These signals are generated in accordance with the following Boolean expressions:

| [MEM0TB | = 0 |
| [MEM1TB | |
| [MEM2TB | } = FPOP · EDIT · DLNNZ(DESCO · |
| [MEM3TB | $\overline{\text{FE1I}}$ + DESC1 · $\overline{\text{FE2}}$). |

Since the FPOP flip-flop is set, the instruction is an edit, the length is not zero (DLNNZ=1 established by FIGNLEN control flag), these signals are binary ONES when either the first flip-flop descriptor field (DESCO=1) or second descriptor (DESC1) field being processed has not been exhausted ($\overline{\text{FE1I}}$ or $\overline{\text{FE2}}$=1). Obviously, these values can be assumed to be all binary ONES at the start of instruction processing.

These signals are thereafter loaded into the RMEM0-3 register 704-130 via decoder 704-116. The contents of the RMEM0-3 register 704-130 are in turn applied to the DMEM0-3 lines. Also, the circuits of block 704-108 generate signals which force the RSZ register 704-132 to the value "00". The contents of this register are applied to the DSZ lines to specify a full word write (not used for generation of preread commands). The decoder 704-120 forces the DREQCAC line to a binary ONE upon decoding the DMEM command stored in the register 704-130. The BYPCAC line can be assumed to be a binary ZERO throughout the example.

During the FPOP cycle, signals corresponding to the TA1 field are transferred from the RTYP register 704-160 via switch 720-42 of unit 720 in accordance with the state of the RDESC register 704-140. The signals have a value of "00" signifying that the descriptor 1 data field is made up of 9-bit characters. Also, signals corresponding to the N1 field representative of the length are transferred from the RSIR register 704-154 via the ZLN switch 722-82 into the RLN1 register of bank 722-80. These signals have a value indicating that the descriptor data field has 16 characters.

As seen from the Figure, the RCN1 register 720-28 of character unit 720 is loaded with the value "10$_2$" corresponding to the CN1 field of descriptor 1 applied via the lines ASFA 34-36 and RAD register 720-24 from the TEAO register of bank 704-302 which had stored descriptor 1. This value points to character #2 of the first data word of descriptor 1 as the starting character to begin processing. The RPO register of bank 722-20 of unit 722 is loaded with the character pointer value "01" via the lines ASFA33-35 and the ZRPA switch 722-23 for the temporary storage thereof.

Next, signals corresponding to the MF2 field are transferred to the R29 register 704-162, the RRDXA register 704-158, the FID and the FRL flip-flops of block 704-110. Again, the signals are applied via the ZIDD switch 704-185 from bit positions 9-17 of the RBIR register 704-152. As seen from FIG. 10, these values are all ZEROS indicating that there is no modification for descriptor 1 data. The RDESC register 704-140 is loaded under hardware control with the value "01₂" for designating a descriptor 2 operation. Here, the RDESCO flip-flop remains reset while the RDESC1 flip-flop is set to a binary ONE since descriptor 1 has been processed (DESCO=1), the cycle is a FPOP cycle (FPOP-1) and the instruction is not a memory type instruction (MEM to MEM or MEM to REG-MTMMTR=1).

Again, the processor 700 applied a control signal to the [RDIBUF/ZIB] line for incrementing the read counter 750-910 of the buffer 750-900 for read out of the next word of the edit instruction (descriptor 3). The buffer descriptor 2 contents applied to the ZIB lines are loaded into the RSIR register 704-154 while bits 0-2 and 21-22 from the ZIB lines are loaded into the RBASA register 704-156 and the TYP register 704-160 respectively.

At this time, the RSIR register 704-154 contains descriptor 2, the R29 register 704-156 contains ZEROS indicating no address register modification and the RTYP register 704-160 contains ZEROS indicating that the descriptor 2 data field is made up of 9-bit characters.

As concerns the cache unit 750, in response to the DREQCAC signal, the pre-read memory command applied to lines ZPSWA0-39 is written into an empty location of the RZAC buffer 750-102 specified by the contents of counter 750-106. As mentioned, the address of the empty location is determined by the state of the busy bits. This entry is made independently of whether there is a hit or miss condition (i.e., state of BPSD). The read ZAC buffer contents is used on a next cycle to supply the address to be written into the control directory 750-500.

Next, the cache command is decoded by the cache decoder 750-166 to establish which one(s) of the control state flip-flops of block 750-3 is to be set. In the case of a pre-read command, a cache miss results in a directory assignment cycle wherein the address is written into control directory 750-500, the full/empty bit is set if not set and the appropriate pending bit is set including that the operation is now outstanding. As explained herein, the directory assignment cycle is entered where the UGCOGTH state flip-flop is switched to a binary ONE state. It will be noted that it is the cache unit 750 which determines whether the processor 700 continues its processing in accordance with the state of the CPSTOP00 line. In the case of a pre-read command, both the turnoff 1 and turnoff signals are binary ZEROS holding the CPSTOP00 line at a binary ONE. The state of the CPSTOP00 line enables the continued application of clock pulses to the processor's circuits thereby enabling the processor 700 to continue processing. By contrast, the cache unit 750 stops the operation of processor 700 in the case of a cache read command upon the occurrence of a miss.

In parallel, with the command decoding, the cache unit 750 accesses the directories 750-500 and 750-502 and cache storage 750-700. The directories 750-500 and 750-502 and cache storage 750-700 are accessed using the address signals from the RADO lines 25-33 applied via switch 750-702. The comparison circuits 750-536 through 750-542 compare the address which applied from the RAD0-ZAD0 lines with the directory address. Since the first descriptor data is not in cache, the circuits 750-560 cause the hit-miss signal BSPD to remain a binary ZERO. Accordingly, the UGCOGTH flip-flop is switched to a binary ONE by signal SETCOGTH due to the signals BPSD and CPRRD immediately following the processor request when the control directory 750-500 is to be updated.

During the directory assignment cycle, the address written into the RZAC buffer 750-102 is passed through ZAC switch 750-530 and instead of being compared as in the previous cycle is strobed into directory 750-502. When the command is deferred because data is being received from main memory, an alternate state TLTHM flip-flop is set to a binary ONE. The directory assignment cycle is dropped, the data from memory is stored in cache and the directory search and assignment cycle is reexecuted. Stated differently, the command operation is interrupted and restarted via the alternate TLTHM flip-flop.

During the directory search cycle, before it is determined a hit or miss, the ZAC command is loaded into the SIU output register 750-174 via the ZPSWA switch 750-110 and the ZPSW switch 750-178 (cache unit assumes a miss condition).

During the directory assignment cycle, the cache unit 750 makes a request to the SIU 100 for a memory operation under the control of state flip-flop CAOPR. That is, the CAOPR flip-flop forces the AOPR line to a binary ONE signaling the SIU 100 of the memory request. At that time, the ZAC command is applied to the DTS lines together with the appropriate memory identifier signals and steering signals applied to the MITS and SDTS lines. The memory identifier signals are applied via register 750-138 previously loaded from register 750-106 via switch 750-139. The steering signals are generated in a conventional manner by means not shown for designating the processor 700 as the source of the request. For further information regarding the use of steering signals, reference may be made to U.S. Pat. No. 4,006,466.

The SIU 100 signals acceptance of the cache memory request by forcing the ARA line to a binary ONE. Thereafter, it forwards the request to the main memory which fetches the 4 word block of descriptor 1 data. Upon transfer of a first pair of data words, the SIU 100 forces the ARDA line to a binary ONE indicating that the even word of the pair is available on the DFS lines. The SIU 100 also forces the DPFS line to a binary ONE indicating a double word transfer. This causes the OATB flip-flop to switch to a binary ONE which indicates that the odd data word is available on the DFS lines. Thereafter, the THCFD flip-flop is switched to a binary ONE.

The first data word is loaded into the RP register 750-179. Also, the memory identifier signals applied to the MIFS lines by the SIU 100 are loaded into the RSPB register 750-124. Bits 2 and 3 are used to access the ZAC read command in the RZAC buffer 750-102. The address is again applied to the cache storage 750-700 and directories 750-500 and 750-502.

In parallel with accessing the directories and cache storage 750-700, the first data word is loaded into the RDO register 750-180. The second word is transferred to the RP register 750-179 and loaded into the RD1 register 750-180. At this time, both words are written into the cache storage 750-700 at the location specified by the ZAC command. Also, the first busy bit is reset in accordance with the coding of the MIFS1-3 signals.

The SIU 100 is operative to transfer the next two data words to the cache unit 750 by again forcing the ARDA and DPFS lines to binary ONES. This again switches the OATB flip-flop to a binary ONE which is again followed by the switching of the THCFD flip-flop to a binary ONE. Again, the signals stored in the MIFS register 750-124 access the ZAC command from the ZAC buffer 750-102 for addressing the directories and cache storage 750-700.

In parallel with the addressing, the next two data words are transferred via the RP register 750-179 into the RD0 and RD1 registers 750-180. Thereafter, the words are written into the cache storage 750-700 completing the storage of a first block of descriptor 1 data making it available to processor 700. Since the command is a pre-read command, the cache unit 750 does not enable the ZDI switch 750-720 enabling the data words to be transferred to processor 700. Also, in parallel with the writing operation, the cache unit 750 resets the second busy bit in accordance with the MIFS signals and the pending bit indicating the completion of the pre-read operation.

Figure 9:
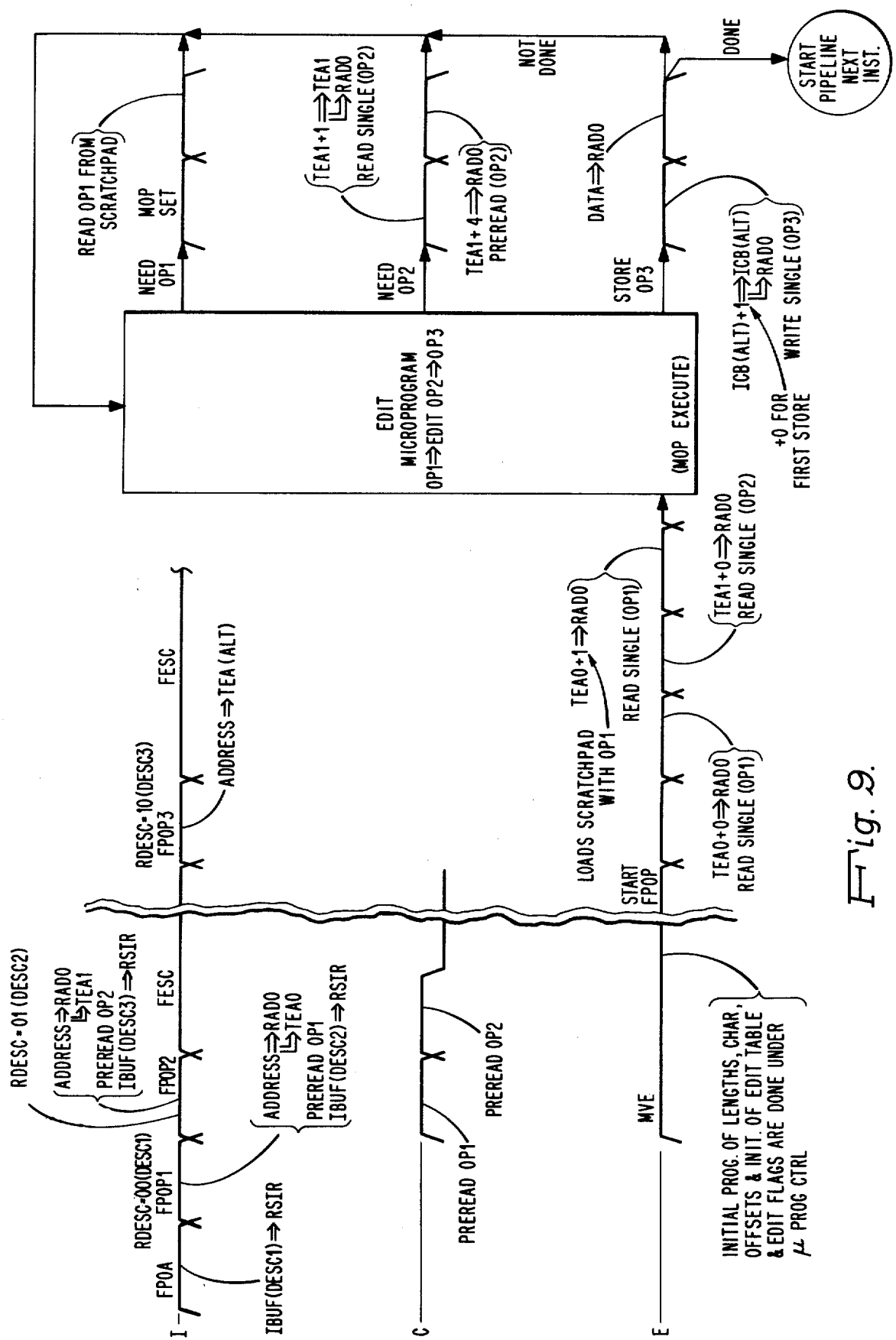
FIG. 9 is a diagram which sets forth the various cycles required for processing the instruction of FIG. 8 in accordance with the present invention.

As seen from FIG. 9 and the flow chart of FIG. 10, processor 700 executes a second FPOP cycle. That is, the FPOP flip-flop remains set to a binary ONE because descriptor 1 has been processed (DESCO-1), the previous cycle was a FPOP cycle (FPOP=1) and the instruction is an edit instruction (DEDIT=1). Signals corresponding to Y address value of descriptor 2 (RSIR0-20) loaded into the RSIR register 704-154 during the first FPOP cycle are transferred via the ZY switch 704-326 for combination with index (X) or address register (AR) values from ZX switch 704-58 and register bank 704-304 respectively by adder 704-322. Since there is no index or address register modification (MF2=0), the values applied to the ZAR0-23 lines and ZX0-20 lines are ZEROS. Thus, the descriptor 2 address value is transferred to the TEA1 location of bank 704-302 selected by the contents of the RDESC register 704-144 and to the RAD0 register 704-46 via the ASFA lines and adder 704-320. It will be appreciated that the appropriate base value is added to the descriptor 2 address in the same manner as described previously in connection with descriptor 1.

As seen from FIGS. 9 and 10, the processor 700 generates another pre-read command wherein the ZAC command word applied to the RAD0/ZAD0 lines includes the descriptor 2 address value 3000 and a memory read quad operation. This command is forwarded to the cache unit 750 and is processed in the same manner as the other command. That is, since it is assumed that the descriptor 2 data is not in cache, the pre-read command causes the first block of descriptor 2 data to be loaded into cache. As seen from FIG. 7, this block includes the data characters of the words at addresses 3000-3003.

During the cache units' processing of the pre-read command, processor 700 continues processing. During the second FPOP cycle, the RTF2 register 720-46 is loaded with signals corresponding to the TA2 field via the RTYP register 704-160. Again, the "00" value indicates that the descriptor 2 data consists of 9-bit data characters. The RLN2 register of bank 722-80 is loaded with signals corresponding to the N2 field via the ZLN switch 722-02 from the RSIR lines. The value indicates that the length of the descriptor 2 data field is 6 characters as indicated in FIG. 7.

Additionally, the RCN2 register 720-30 is loaded with the value "1$1_2$" via the ASFA 34-36 lines and the RAD register 720-24. This indicates that the third character of the first data word of descriptor 2 is the first character in the field to be processed. Also, the RP1 register of bank 722-20 is loaded with the "1$1_2$" character pointer value for the temporary storage thereof.

Signals corresponding to the MF3 field bits 0-8 are transferred from the RBIR register 704-152 into the R29 register 704-162, the RRDXA register 704-158, FID and FRL flip-flops via the ZIDD switch 704-180. The ZEROS values indicate no address modification is required for descriptor 2. The RDESC register 704-140 is forced to store a "1$0_2$" value designating a descriptor 3 operation (see Boolean expression).

Again, the [RDIBUF/ZIB line is forced to a binary ONE for advancing the read address counter to point to the next instruction. The signals corresponding to descriptor 3 applied to the ZIB lines are loaded into the RSIR register and R29 register 704-162. Also, the RBASA register 704-156 is loaded with signals from ZIB lines 0-2. Similarly, the RTYP register 704-160 is loaded with ZEROS via the ZIB lines indicating that the descriptor 3 data field consists of 9-bit characters.

During the FPOP cycle, under microprogram control, the first 4 ASCII characters are transferred from location 14(8) of scratchpad memory 714-30 to the RTRH4 (TR4) register of bank 714-10. Also, signals are generated for testing of the control flag indicators FINDA and FINDC and a conditional vector branch operation RB2 established by the TA1 field derived from bits 21-23 BSIR register 704-754 performed by the circuits of block 701-1. The indicator testing is not pertinent to this instruction and therefore can be ignored.

As seen from the flow chart of FIG. 10, a FESC cycle is entered upon the switching of the FESC control state flip-flop to a binary ONE. The FESC flip-flop is set and reset in accordance with the following Boolean equations:

SET: FESC=[$\overline{\text{HOLDI}}$(FPOP·$\overline{\text{SETFPOP}}$).
RESET: FESC=$\overline{\text{DPIPE0-5}}$.

In this case, the FESC flip-flop is set since the FPOP flip-flop is set (FPOP=1) and the flip-flop is not going to be set again ($\overline{\text{SETFPOP}}$=1) as it is assumed that there is no operation start specified by microprogram control (see Boolean expression-DPIPE field).

This cycle is under microprogram control in which the microinstruction word cycle A=1 field is utilized. During this cycle, the second 4 ASCII characters are transferred from location 158 of scratchpad memory 714-30 to the RTRH5 (TR5) register of bank 714-10. The descriptor 1 character pointer value stored in the RP0 reigster of bank 722-20 is transferred via the ZPA switch 722-27 and adder A1 722-92 into the temporary storage register RLN3 of bank 722-80. Also, the descriptor 2 character pointer value stored in the RP1 register is transferred via the ZPB switch 722-28 and ZRPB switch 722-24 to the RP5 register of bank 722-22.

Also, indicator storage (history) registers, not shown, included within the branch circuits of block 701-1 are cleared to ZEROS. These registers are used to store the states of input Group 1 indicators selected via bits 136-139 of a microinstruction word for testing during a subsequent cycle of operation.

As seen from FIG. 10, since the TA1 field tested via the vector branch circuits of block 701-1 has stored the value "00" specifying 9-bit data characters, the processor 700 enters a B1 cycle of operation. During this cycle, under control of a microinstruction word having a type A=4 field, the number of characters in a word for the descriptor 1 data field is loaded into the RXPB register of bank 722-60. As seen from FIG. 10, this value is 4 for 9-bit characters and is generated by the adder 722-72 in response to a constant applied via the ZXPB switch 722-70.

The descriptor 1 data field length stored in the RLN1 register is transferred to the RLN4 register via the adder 722-92. Also, signals corresponding to the first 4 characters of the edit insertion table stored in the TR4 register of bank 714-10 are loaded into the table entry 1 register of bank 720-10 via the ZRESA switch 714-36.

The processor 700 next enters the B3 cycle and carries out the operation specified by a microinstruction word having a second format. During this cycle, signals corresponding to the length of the descriptor 2 data field stored in the RLN2 register of bank 722-80 are applied to the adder 722-92 and tested for zeros. The resulting indication is applied to certain ones of the auxiliary flip-flops of block 701-42 and if ZERO causes the switching of one of the exhaust flip-flops (EXH2) to a binary ONE. This inhibits the processor 700 from reading descriptor 2 during a B7 cycle.

Signals corresponding to the next 4 characters of the edit insertion table stored in the TR5 register of bank 714-10 are loaded into the table entry 2 register of bank 720-10 via the ZRESA switch 714-36. Also, bits 44-46 (PIPE field) are coded to specify a type 6 restart wherein the FPOP flip-flop is switched to a binary ONE during the next cycle of operation. Accordingly, there is a transfer of control to hardware control wherein processor 700 begins a third FPOP cycle of operation for processing descriptor 3.

During the FPOP(3) cycle the address bits 0-20 (Y) of the descriptor 3 read into the RSIR register 750-154 during the second FPOP cycle, are transferred into the ICBA register of bank 704-302 via the ZY switch 704-326 adder 704-322 and the ZRESB switch 704-334. Since there are no index or address register modifications specified (i.e., MF3 field=ZEROS), the address value corresponds to the descriptor 3 value of 5000. The same value (Z Base=ZEROS) is also loaded inot the RADO register 704-46 via the ASFA lines.

As seen from FIG. 10, the RTF3 flip-flop 720-52 is set to a binary ONE by the detector 720-50 indicating that the descriptor 3 data field consists of 9-bit characters. That is, the "00" value corresponding to the TA3 field applied via the RTYP register 704-160 are decoded by the detector 720-50 and cause it to switch the flip-flop 720-52 to a ONE. Additionally, signals corresponding to the N3 field are transferred from bit positions 30-35 of the RSIR register 750-154 into the RLN1 register of bank 722-80 via the ZLN switch 722-82. The RPO register of bank 722-70 is loaded with the descriptor 3 character pointer value of all ZEROS via the ASFA lines indicating that the descriptor 3 data field starts with the number ZERO character (address 5000).

As seen from FIG. 10, the processor 700 under microprogram control tests the descriptor 1 length value stored in the RLN4 register for ZEROS. This is done via testing one of the status indicator flip-flops of block 701-1 which indicates whether the output of adder 722-92 is ZERO or there was no carry out generated. The conditions mentioned cause one of the exhaust flip-flops (EXH11) to be set to a binary ONE for subsequent testing.

Next, the processor 700 begins a B5 cycle wherein under the control of a microinstruction word utilizing the TYPEA=4 format, it transfers the difference between the RXPB register value of 4 corresponding to the number of characters in a descriptor 1 data word and the RLN3 register value (10)₂ which points the character #2 as the starting character in the data field. The difference value of 2 generated by adder 722-72 is stored in the RXP2 register and indicates the number of data characters to be read or processed in the first data word of descriptor 1.

The data field length of descriptor 3 is read out of the RLN1 register and stored in the RLN3 register via the adder 722-92 and ZLN switch 722-82 for a ZONED write command. Next, the adder AL-0 indicator is selected for testing. Next, the RDESC register 704-10 and the RBASB register 704-144 are set to ZEROS for the reading of descriptor 1 data.

The B5 cycle is followed by a B6 cycle of operation wherein the processor 700 under microprogram control transfers signals (value 1000) corresponding to the sum of address of the first data word of descriptor 1 from the TEAO register and base value from the TBASEO register generated by adder 740-320 to the RADO register via the ASFA lines. The control unit 704-1 sets the ZAC command code bits 1-4 to a code of 0000 to specify a read single command and forces the DMEM lines to a code of 1000 to specify a cache read single operation.

In the manner previously described, the processor 700 forwards the read command to the cache unit 750. As seen from FIGS. 7 and 9, this data was previously fetched from main memory 800 and stored in cache. Accordingly, when cache unit 750 decodes the read single command, accesses the directories and cache storage 750-700, the hit-miss detection circuit 750-560 forces the BPSD line to a binary ONE indicative of a cache hit. None of the control state flip-flops are set in this instance. The cache unit 750 conditions switch OPSWO-2 for enabling the transfer of the data word at address 1000 to processor 700 via the ZDO switch 750-9 during a subsequent cycle. Thus, the previous processing of the pre-read command by the cache unit 750 eliminates stopping the operation of the processor 700 to wait for the required data word. This would occur in the case of a read single command where a miss was detected.

Also, the processor 700 subtracts from the descriptor 1 length value (16), the number of characters in the data word (2) via the AL adder 722-92 and stores the value indicative of the number of remaining descriptor 1 characters in the RXPD register of bank 722-60 via the ZXP switch 722-62. During this operation, if the RLN4 value is ZERO (ALZ=1 or carry out), one of the indicator flip-flops of block 701-1, (EXH11) is set to a binary ONE.

Additionally, under microprogram control, processor 700 sets the RDESC register 704-140 and RBASB register 704-144 of control unit 704-1 to the value "01" (i.e., the NXTD field). This specifies a read of descriptor 2 information.

The B6 cycle is followed by a B7 cycle upon testing of the length of the descriptor 3 field via an indicator (ALZ) which would have been set during the B5 cycle. Since the ALZ indicator is not set, the processor 700 begins the B7 cycle. The first data word of descriptor 1 (operand 1) previously fetched from address 1000 and applied to the ZDI lines 0-35 is loaded into the RDI register 704-164 via switch 704-182. Also, the length of descriptor 1 is read out from the RLN4 register and stored in the RXPA register via the ZXPS switch 722-70 and adder 722-72. In a similar fashion, a copy of descriptor 3 length is read out from the RLN1 register and stored in the RLN4 register via the adder 722-92.

The resulting descriptor 2 address generated by summing the contents of the TEA1 and TBASE1 registers generated by adder 704-320 is transferred to the RADO register 704-46. The processor 700 is operative to generate another cache read single command for forwarding to cache unit 750. The command is generated in the manner previously described. However, in this case, the ZAC command specifies the address of the descriptor 2 (operand 2) data (i.e., address 3002) for bringing in the operand 2 data. This data corresponds to the string of control words (MOP) characters of FIG. 8. As seen from FIG. 9 and as discussed previously, the cache unit 750 previously fetched a block of operand 2/descriptor 2 data in response to a previously issued pre-read command. Therefore, when the cache unit 750 decodes the read single command, accesses the directories and cache storage 750-700, the circuits 750-560 again force the BPSD line to a binary ONE signaling a "hit". It thereafter reads out the first data word of operand 2 which it applies to the ZDI lines in the manner previously described. Again, under microprogram control (via the NXTD field), the processor 700 loads the RDESC and RBASB registers with the value "00" for selecting descriptor 1 temporary registers.

As seen from FIG. 10, the processor 700 begins a B8 cycle wherein a microinstruction word having TYPEA-2 format is executed. During this cycle, the first word of descriptor 1 (operand 1) data is transferred from the RDI register 704-164 into the OP1 register of the character unit register bank 720-10 the execution unit ALU 714-20, the ZRESA switch 714-36 on the ZRESA lines 0–35.

Next, the value 4 is subtracted from the character pointer value read out of the RP5 register and added to the value read out of the RLN2 register. This operation is carried out by AL adder 722-92 which receives the appropriate values via the ZLNA position of the ZALA switch 722-88 and the last position of the ZALB switch 722-90. The result provided by the state of ALZ or no carry out signal indicative of the remaining number of descriptor 2 characters to be fetched, is used to set one of the indicator flip-flops (EXH2) for subsequent testing of an exhaust condition.

Also, the first word of the descriptor 2 (operand 2) applied to the ZDI lines by the cache unit 750 is loaded into the RDI register 704-164. The constant value of $120_8$ is generated by the AP adder 722-34 and written into the RP3 register of bank 722-20. This value corresponds to the scratchpad address designating the location in scratchpad memory 714-30 into which the second operand 1 (descriptor 1) data word is to be stored.

The first operand 2 data word applied to the ZDI lines from cache unit 750 is loaded into the RDI register 704-164. The CSO adder 704-322 increments by 1 (1 word) the descriptor 1 address read out from the TEAO register and the sum is restored in the TEAO register. Also, adder 704-320 sums the incremented value to the base value read out from the TBASO register and the resulting address (1001) is loaded into the RADO register 704-46. As seen from FIGS. 7 and 8, this address specifies the second word of operand 1 having the 4 9-bit data characters shown in FIG. 8.

Again, the processor 700 is operative to generate another cache read single command to cache unit 750. In this case, the ZAC command specifies the address 1001 for fetching the second word of operand 1 (descriptor 1). As a consequence of the pre-read command forwarded to the cache unit 750, this second word also resides in "cache".

As seen from FIG. 10, the processor 700 via its test and branch circuits tests the state of the exhaust indicator selected flip-flop EXH11 via a vector branch operation (i.e., RIDW) register 722-106. Since this indicator is not set, the processor 700 enters a B13 cycle of operation. During this cycle, the first word of operand 2 is transferred from the RDI register 704-164 into the OP2 register of character unit bank 720-10 via the execution unit 714.

Next, the AXP adder 722-72 subtracts the value stored in the RXPB register indicative of the number of characters per word from the present descriptor 1 length value (14) stored in the RXPD register and stores the result (10) in the RXPD register via the ZXP switch 722-62. Since the output of the AXP adder 722-72 is not ZERO (i.e., AXPZ indicator or no carry signal not ZERO), the exhaust flip-flop EXH11 remains reset. During this cycle, the second word of operand 1 (address 1001) read out from the cache unit 750 and applied to the ZDI lines is loaded into the RDI register 704-164.

Also, the constant value $117_8$ is generated by the AP adder 722-34 and loaded into the RP5 register via the ZRPB switch 722-24. This value serves as a starting scratchpad address for transferring operand 2 data to the character unit 720. Lastly, under microprogram control, processor 700 loads the RDESC and RBASB registers 704-140 and 704-144 with the value "00" for selecting descriptor 1 temporary registers.

As seen from FIG. 10, the processor 700 enters a two microinstruction sequence which includes cycles B14 and B15. This sequence is used to load the scratchpad memory 714-30 with the remaining data characters of operand/descriptor 1. The scratchpad memory 714-30 is able to store up to 63 characters. Since the length of the string is 16 data characters or 4 words, the sequence is repeated several times.

During the first pass through the B14 cycle, the processor 700 under control of a microinstruction word having a format wherein AACU=0. transfers the second word of operand 1 from the RDI register 750-164 into the scratchpad input RSPB register via the ZRESB switch 714-38. Again, the adder 704-322 increments by 1 (word) the contents read out from the TEAO register which is returned to that register. Also, the adder 704-320 adds the incremented value to the contents of the TBASEO register and the result address is loaded into the RADO register 704-46 via the ASFA lines.

The address (1002) which points to the third data word of operand 1 is included in another read single command which is generated and forwarded to the cache unit 750. This data word also resides in cache storage 750-700.

As seen from FIG. 10, the AP adder 722-34 increments the contents of the RP5 register by 1 and the resulting address of $120_8$ for descriptor 1 is rewritten into the RP5 register via the ZRPB switch 722-24 and into scratchpad address RSPA register 722-102 via the ZSPA switch 722-100. Under microprogram control (field NXTD), the processor 700 loads the value "$10_2$" into the RDESC and RBASB registers 704-140 and 704-144. This value specifies the selection of the descriptor 3 temporary registers (i.e., TBASEA, ICBA) and is not used until the data words have been loaded into the scratchpad memory 714-30. This value in cycle B15 to select the descriptor 1 temporary registers (value "00") for generation of further descriptor 1 addresses.

As seen from FIG. 10, the processor 700 tests for the end or exhaust of the operand 1 data string in a previous cycle via examining the states of the AP adder indicators to detect whether the adder output was ZERO or there was no carry out. Since the operand 1 data string was not exhausted, the processor 700 begins the B15 cycle. During the B15 cycle, the AXP adder 722-72 subtracts the number of characters per word value stored in the RXPB register from the present descriptor 1 length value (10) stored in the RXPD register and stores the result (6) in the RXPD register via the ZXP switch 722-62. The resulting length value is tested and since it is still not ZERO, the exhaust flip-flop EXH11 remains reset.

Next, the third word of operand 1 applied by the cache unit 750 to the ZDO lines is loaded into the RDI register 750-164 and thereafter loaded into the RSPB scratchpad buffer 714-32 to be written into the location specified by address 120$_8$ stored in the RSPA register 722-102.

Again, the AP adder indicators are selected for subsequent testing and the RDESC and RBASB register are set to "00" for selection of the descriptor 1 temporary registers.

The processor 700 returns to cycle B14 and repeats the operations indicated resulting in the generation of the second group of values. Next, the processor 700 repeats the operations in the B15 cycle producing the second group of values shown. This is followed by another pass through the B14 and B15 cycles which produces the third group of values.

During the third pass through the B14 cycle, the processor 700, under microprogram control, issues a read single command to the cache unit 750 to fetch the fifth data word of operand 1. As seen from FIG. 8, this word resides in main memory 800 and not in cache.

The cache unit 750 in response to the read single command is operative to fetch from main memory 800 another block of data words corresponding to addresses 1004-1007 in a similar manner as described in connection with the pre-read command. However, in this case, since the command is a read single command, the cache unit 750 forces the CPSTOP00 line to a binary ZERO. This forces the IHOLD00 and EHOLD00 signals to binary ZEROS stopping the operation of processor 700.

That is, since the contents of all processor registers are unable to be altered, the processor 700 remains in the same state until the cache unit 700 has fetched the requested data words. That is, when the cache unit 750 receives the data words which include the addressed words, it forces a DATA RECOV control signal to a binary ONE which in turn resets the RBPSD state flip-flop which turned off processor 700. This results in the cache unit 750 forcing the CPSTOP00 line to a binary ONE enabling the processor 700 to continue its operation.

Since the processor 700 is at a point in the processing of the EDIT instruction where it requires the data requested and it cannot perform another operation, stopping the processor's operation does not alter the efficiency at which instructions are executed. In cases where the processor 700 can begin another operation, it may be advantageous to allow for generation of further pre-read commands during the execution of the B14 and B15 cycles. Of course, where the operand 1 data string is 16 characters or less, the generation of the single pre-read command under hardware control is all that is necessary.

During the third pass through the B15 cycle, when the AXP adder 722-72 subtracts the number of characters per word value stored in the RXPB register from the present descriptor 1 length value (2) stored in the RXPD, the result is negative producing no carry out. This causes the exhaust flip-flop EXH11 to be switched to a binary ONE in addition to causing a branch to a B16 cycle following completion of a fourth B14 cycle.

As seen from FIG. 10, during the third pass through the B15 cycle, the fifth data word obtained from main memory 800 by the cache unit 750 is loaded into the RDI register 704-164. Also, the negative result generated by the AXP adder 722-72 causes the exhaust flip-flop EXH11 to be set to a binary ONE. The fourth data word previously stored in the RSPB buffer register 714-32 is written into the location of scratchpad memory 714-30 having address 1003. Following the selection of the AXP adder indicators, and the loading of the RDESC and RBASB registers 704-140 and 704-144, the processor 700 begins its last pass through the B14 cycle.

During the last B14 cycle, the processor 700 repeats the indicated operations producing the fourth group of values shown in FIG. 10. Briefly, it loads the fifth data word (1004) into the RSPB buffer register 714-32, increments and stores the scratchpad address in the RP5 and RSPA registers. However, since the exhaust flip-flop EXH11 was previously set, the processor 700 inhibits the generation of another read single command specified by the small CU field of the microinstruction word. That is, the exhaust condition causes an all ZEROS code to be applied to the DMEM lines. Next, under microprogram control, the processor 700 sets the values "10$_2$" into the RDESC and RBASB registers for read out of the descriptor 3 temporary registers.

At the end of the B14 cycle, the processor 700 branches to cycle B16 wherein it writes the last word of the operand 1 data string into the location designated by scratchpad address 123$_8$. This cycle is followed by the W8 cycle wherein the lengths of both operands 1 and 2 are tested via the AL and AXP adders 722-92 and 722-72 to ensure that neither operand 1 nor operand 2 has a field of ZERO number of characters indicative of a default condition. Since this is not the case, no default indication is generated.

The processor 700 reads out the descriptor 3 starting address contents of the ICBA register. The adder 704-322 decrements the ICBA address value by one and the resulting address is stored back into the ICBA register. The same address before it is used is incremented by one during the processor's execution of cycles of a common edit routine. The resulting address is transferred via the ZZ switch 704-328 and ZDO switch 704-340 to the RTRH7 register of the execution unit's register bank 714-10 and stored therein. At the end of this cycle, the processor 700 does a vector branch of the contents of the R1DW register 722-106 which corresponds to the TA3 value stored in bit positions 21-23 of the RSIR register 704-154 transferred thereto during the FPOP3 cycle.

The processor 700 now begins a C2 cycle of operation. During this cycle, the processor 700 utilizing the AP adder 722-34 subtracts the descriptor 3 starting character pointer value "0" read out of the RPO register from the constant value of 4 which specifies the number of characters per operand 3 data word. The result of 4 is then stored in the RP2 register. Also, the character point value read out from the RPO register is written into the RP6 register. Next, the AXP adder indicator AXPZ is selected for testing the length of operand 1 during subsequent cycles. The state of this indicator as established in cycle W8 is stored in a history register, not shown, HR4, to enable the subsequent testing thereof.

As seen from FIG. 10, the processor 700 executes another vector branch operation using the TA3 contents of the R1DW register 722-106 and enters a D1 cycle (9-bit characters) to begin execution of a MOP set up operation. During this cycle, a constant value "0110$_2$" or 6 is loaded into the RRDXB register via the switch 704-188 for selection by the section 704-5 of the RAAU register for use in the execution unit 714 during subsequent cycles.

The contents of the OP2 register are read out from the bank 720-10 and the first MOP character selected by the contents of the RCN2 register 720-30 is loaded into the RMOP register 720-70 and the RIF register 720-63 via the ZCV switch 720-18. In this example, the EDIT instruction results in replacing zeros with asterisk characters. Thus, the RMOP register 720-70 stores the micro-op code specifying the replacement of "0" characters to the left with asterisks. The RIF register 720-63 stores information defining the length of the operand 1 field on which this micro-op code operation will take place. In this example, this character is used for processing 3 operand 1 characters.

Next, the value stored in the RCN2 register 720-30 is tested for an overflow by conditioning adder 720-30 to add a value of $\alpha = 2$ to it. The result is restored in the RCN2 register 720-30. Since RCN2 register 720-30 is pointing to character #3 of word 3002 of operand 2, the detector 720-38 forces the CN2OVF output to a binary ONE. This means that at this time another word of operand 2 is required in order to have a minimum of 4 words stored and ready for processing. This is seen from FIG. 7.

Next, bits 0-4 of entry 8 of the edit insertion table previously stored in table entry 1 register of unit register bank 720-10 are read out during the next cycle of operation and loaded into the RTE8 register 720-68. Also, an indication of the CN2OVF condition detected during this cycle is stored in a history register, not shown, for testing during a subsequent cycle of operation. The CN2OVF indicator is also selected for testing under microprogram control during a subsequent branch operation.

At the end of the D1 cycle, the length of operand 1 is tested via the AXP adder indicator (AXPZ). Since the length is not zero, the processor 700 begins cycle D2. During this cycle, the AL adder 722-92 decrements by one the operand 2 length value of 6 read out from the RLN2 register and rewrites the resulting value of 5 in the RLN2 register. Next, a constant value of 27 is generated via the AP adder 722-34 and loaded as a shift count into the RSC register 722-40 in addition to being written into the RP7 register via the ZRPB switch 722-24. This is in preparation for carrying out a shift operation by execution unit shifter 714-24. The shifter 714-24 includes two registers whose contents are shifted relative to one another. By shifting 27 bit positions, this enables the selection of an amount equal to one data character corresponding to the 9 most significant bits.

Next, the processor 700 under microprogram control sets the RDESC and RBASB registers 704-140 and 704-144 to the value "01" for selection of the descriptor 2 temporary registers. At the completion of this cycle, the processor 700 performs a conditional vector branch operation based on the state of the CN2 overflow indicator. Since this indicator was previously set, the processor 700 begins a D3 cycle of operation.

As seen from FIG. 10, during cycle D3, the adder 740-322 increments by one (1 word) the descriptor 2 address read out from the TEA1 register and rewrites the resulting address into the TEA1 register. Also, the resulting word address 3003 is added to the base value read out from the TBASE 1 register by adder 704-320 which is then loaded into the RADO register 704-46. Next, the processor 700 generates a cache read single command for fetching the second word of operand 2 since the word is needed immediately for processing. As seen from FIG. 7, this word which includes characters 1 through 4 was previously read into cache storage 750-700 in response to the hardware generated pre-read command. Hence, the operation of the processor 700 is permitted to continue and the cache unit 700 is operative to fetch the requested word and apply it to the ZDO lines.

During the D3 cycle, the present value corresponding to the length of operand 2 is read out from the RLN2 register and tested for zero by the AL adder 722-92. Since the value is "5", the AL adder indicator ALZ is not set to a binary ONE. At this time, this indicator is selected for testing during a subsequent cycle.

The next cycle is a D10 cycle wherein the AL adder 722-92 decrements by 4 the operand 2 length value of 5 read out from the RLN2 register to test whether the operand 2 is exhausted. Since the value is not zero, the output AL adder indicators ALZ or no carry out do not set the exhaust flip-flop EXH2 to a binary ONE. The second word (3003) of operand 2 read out from cache storage 750-700 is loaded into the RDI register 704-164.

Next, adder 704-322 increments the descriptor 2 address read out from the TEA1 register by 4 words. The adder 704-320 adds the value read out from the TBASE1 register to the incremented address and the resulting address is loaded into the RADO register 704-46. However, the address value in the TEA1 register remains unchanged. Under microprogram control, the processor 700 generates a pre-read command (0110) in accordance with the coding of the MEM field of the small CU field of a microinstruction word having format 1. Format 1 is used because it lends itself to more complete control of the auxiliary unit 722. However, it will be appreciated that the pre-read command could also have been generated by a microinstruction having the alterante format shown in FIG. 6b.

The pre-read command fetches the next 4 word block (addresses 3004-3007). Since the ZAC command specifies address 3007, the cache unit 750 by forwarding such ZAC command to main memory 800 causes the memory to read out the block of data which includes the specified word.

As previously explained, while the cache unit 750 is processing the pre-read command generated under microprogram control, the processor 700 is permitted to continue its execution of the edit instruction. That is, the cache unit 750 holds the CPSTOP00 line in a binary ONE state. This, in turn, speeds up the execution of the edit instruction.

As seen from FIG. 10, the processor 700 executes a conditional vector branch based upon the state of the AL adder indicator ALZ. Since the operand 2 length was not zero, the processor 700 begins a D11 cycle of operation. In this cycle, the second word of operand 2 (at address 3003 in FIG. 7), stored in the RDI register 704-164, is written into the OP2 register of bank 720-10 via the execution unit ALU 714-20 on the ZRESA lines.

At the end of the D11 cycle, the processor 700 executes a conditional vector branch operation based on the TA3 value stored in the R1DW register 722-106. The result is that the processor 700 begins an E1 cycle of operation in which character unit 720 performs the execution of the type of edit operation specified by the coding of the first MOP control character.

During the E1 cycle, under the control of a microinstruction word having an AACU=3 format, the AXP adder 722-72 decrements by 1 the operand 1 length value read out from the RXPA register with the resulting value (15) being rewritten back into the RXPA register. Similarly, the AL adder 722-92 decrements by 1, the operand 3 length value read out of the RLN1 register with the resulting value (16) also being rewritten back into the RLN1 register. Also, the AP adder 722-34 decrements by 1, the complement of the CN3 value read out from the RP2 register and the resulting value (3) is rewritten into the RP2 register.

Under hardware control, the contents of the RCN1 register 720-38 are updated by the value α=2 (010) via the adder 720-34 indicating selection of the next 9-bit character. Since only the upper two bits are used, the remaining bit will be ignored. Thus, it will appear that the increment value=1. The contents of the RCN2 register 720-30 remains set at ZERO until the value stored in the RIF register 720-63 decrements to ZERO.

As seen from FIG. 10, the number (3) indicative of the remaining characters to be processed by the first MOP control character stored in the RIF register 720-63 is decremented by 1 via the circuit 720-60 and returned to the register.

The decoder 720-74 is operative to decode the MOP control character and generate signals for controlling the operation of character unit 720. During operation, the first character is read out of the OP1 register and when it is a ZERO as signaled by detector 720-82, it is replaced by the asterisk character read out from the second character position of the table entry 1 register of bank 720-20. Since the first data character is a zero as seen from FIG. 8, the asterisk character is selected via the ZOC switch 720-20 and loaded into the RAAU register 722-46 via switch 722-44.

Also, the processor 700 under microprogram control sets the RVB0 and RVBZ registers in accordance with the states of the MOP indicates MOPIA and MOPIB for subsequent branch operations. The MOPIA indicator signals the processor 700 to continue execution of MOP execute cycles, to process the next MOP control character and to determine whether more processing is to be done using the same MOP character. The MOPIB indicator signals the processor 700 to terminate operations. Additionally, several history registers, not shown, HR0.1 and 3 are set in accordance with the states of the control indicators CN1OVF, CN2OVF and END for subsequent testing. Here, the values are ZEROS.

As seen from FIG. 10, the processor 700 begins an E2 cycle of operation during which the asterisk contents of the RAAU register 722-46 are applied to the ZEB lines via the ZXB2 switch 704-59 of section 704-5. From there, the asterisk character is applied to the shifter 714-24 via the ZOPB switch 714-17 while the contents of the TRO register is applied via the ZOPA switch 714-15 and the switch 714-28. The shifter 714-24 shifts these signals by 27 bit positions under the control of the shift count from the unit 722. The shifted result which corresponds to the first character of operand 3 in FIG. 8 is then loaded into the TRO register via the ZRESBO switch 714-38.

At the end of the E2 cycle, the processor 700 tests the state of the control indicator MOPIA by a vector branch operation. Since the MOPIA value is 00, the processor 700 begins an F1 cycle followed by an F2 cycle of operation. During the F1 cycle, the processor 700 executs operations similar to those executed during the previous E1 cycle of operation. This results in the group of values shown. That is, the RXPA, RLN1 and RP2 registers store the values 14, 14 and 2 respectively.

Also, during the F1 cycle, under hardware control, the character unit adder increments the RCN1 register 720-28 by 1 which causes a CN10VF condition stored in a history register HR0, not shown, for subsequent testing. This indicates that the second word of operand 1 is needed to be fetched from scratchpad memory 714-30 and stored in the OP1 register. The RCN2 register 720-30 remains at ZERO and the RIF register after being decremented by 1 stores the value "1". Again, an asterisk character is selected via the ZOC switch 720-20 to place the second operand 1 ZERO data character. The vector branch registers RVB0 and RVB2 are set in accordance with the MOPIB and MOPIA indicators respectively. The RVB0 register is set to 010 signaling the testing for CN10VF condition. The RVB2 register is set to the value 10 indicating that the MOPIB indicators are to be tested during a subsequent cycle of operation.

During the F2 cycle, the second asterisk character is applied to the ZEB lines via the ZXB2 switch 704-59 from the RAAU register 722-46. Again, the contents of the TRO register and the asterisk character are applied as inputs to shifter 714-24, shifted 27-bit positions with the result being written into the TRO register. The result corresponds to the first two characters of operand 3 shown in FIG. 8. At the end of the F2 cycle, the MOPIA indicator is tested via a conditional branch operation and the processor 700 begins an F4 cycle.

During the F4 cycle, under microprogram control, the processor 700 sets up the states of the various indicators for a subsequent branch operation. Indications as to L1 underflow, L3 underflow and CN3 overflow are set by read out of the contents of the RXPA, RLN1 and RP2 registers to the AXP, AL and AP adders and storing the status of the adder output ZERO indicators (AXPZ, ALZ and APZ) in history registers HR4, 5 and 7, not shown. The AXPZ and ALZ indicators are selected and the RVB2 register is set by the TA3 contents of the R1DW register 722-106.

At the end of the F4 cycle, the processor 700 performs a vector branch operation based upon the state of the MOPIB indicator and enters a J1 cycle. During this cycle, the CN1OVF storage register (HR0) is selected for testing. At the end of this cycle, the processor 700 performs a branch based upon the status of the previous selected adder indicators AXPZ and ALZ. Since neither the length of operand 1 or 3 was not zero, the processor 700 enters a J7 cycle.

During the J7 cycle, under microprogram control, the processor 700 loads the scratchpad address for operand 1 and out from the RP3 register into the RSPA register 722-102 via the AP adder 722-34. The processor 700 also selects the end indicator storage register, HR3, not shown, for subsequent testing. At the end of the J7 cycle, the processor 700 performs a branch based upon the stored status of the CN1OVF indicator. Since the indicator was previously set, the processor enters a P1 cycle.

During the P1 cycle, the second word of operand 1 previously stored in address 1001 is read out of address 120$_8$ of scratchpad memory 714-30 and loaded into the OP1 register of bank 720-10 via the ZRESA lines. As seen from FIG. 8, this word includes the data characters 4060 wherein the editing of the first character is performed under the control of the first MOP control character while the editing of the next three characters is performed under control of the next MOP control character of FIG. 8.

Also, during the P1 cycle, the operand 1 scratchpad address value is read out of the RP3 register, incremented by 1 by the AP adder 722-34 and the resulting address 121$_8$ is rewritten into the RP3 register via the ZRPC switch 722-32. The processor 700 also selects for subsequent testing, the history register, HR7, which stores the CN3OVF status.

At the end of the P1 cycle, the processor 700 executes a branch operation based upon the testing of the state of the end indicator. Since this indicator is not set, the processor 700 enters a P2 cycle. During this cycle, operand 1 length stored in the RXPA register is tested for zero via the AXP adder 722-72 for detection of a default condition. The shift constant 27 stored in the RP7 register is loaded into the RSC register 722-40 for controlling the shifter 714-24 during subsequent cycles of operation.

At the end of the P2 cycle, the processor 700 performs a conditional vector branch operation based upon the status of the CN3OVF condition previously selected for testing. Since there was no CN3 overflow condition detected, processor 700 begins another MOP execute sequence starting with cycle F1 which is followed by another E2 cycle.

During the E1 cycle, the processor 700 sets the RXPA, RLN1 and RP2 registers to the values 13, 13 and 1 respectively as illustrated in FIG. 10. Again, under hardware control, the RCN1 register 720-28 is incremented to a value 01, the RCN2 register 720-34 remains the same and value stored in the RIF register 720-63 is decremented to ZERO. The decrementing of the RIF register contents to ZERO causes a value of 01 for MOPIA to be loaded into the RVB2 register. This causes the processor 700 to read in the next MOP control character which corresponds to the operand 2 character at address 3003 previously written into the OP2 register during the D11 cycle.

Since there was no zero character detected, the data character having the value "4" is selected via the ZOC switch 720-20 for loading into the RAAU register 722-46. Again, the result of the microoperation specified by the contents of the RMOP register 720-70 indicated by the states of the MOPIA, MOPIB and END indicators is stored in history registers HR0, 1 and 3 for later testing during a subsequent cycle of operation.

During the second E2 cycle, the data character "4" is applied to the ZEB lines via the ZXBZ switch 704-58. The data character and contents read out from the TR0 register applied to shifter 714-24 are shifted left by 27 bit positions and the result is written back into the TR0 register. At this time, the register contains the values **4 and the RP2 register contains the value 1. This indicates that one more operand 1 data character can be processed and stored in the TR0 register.

At the end of the E2 cycle, the processor 700 performs another vector branch operation based on the states of the MOPIA indicators. Since the value is "01", the processor 700 now begins a F3 cycle. During this cycle, the A1 adder 722-92 tests the value 5 stored in the RLN2 register indicating the number of remaining operand 2 characters (L2) for detection of a fault condition. Also, the AXP adder 722-22 tests the value 13 stored in the RXPA register indicative of the number of characters remaining in the operand 1 or descriptor 1 data field (L1). The result of this test is denoted by the state of the AXPZ indicator which the processor 700 selects for testing during a subsequent cycle.

After loading the TA3 value stored in the R1DW register 722-106 into the RVB2 register, the processor 700 performs another vector branch and begins another D1 cycle of operation. Since the processor 700 performs the same operations as previously described only the pertinent results will be discussed herein relative to the cycles previously described.

During this cycle, character #0 of the descriptor 2 word stored at address 3003 is selected by ZCV switch 720-18 and loaded into the RMOP register 720-70 and the RIF register 720-63 when the word is read out from the DP2 register. Also, the value stored in the RCN2 register 720-30 is advanced from "00$_2$" to "01$_2$" designating character #1 in the OP2 register as the next MOP control character to be read out.

During the D2 cycle, processor 700 decrements by one the contents of the RLN2 register so that it indicates that there are 4 more operand 2 MOP control characters to be processed. As seen from FIG. 10, since there is no CN2 overflow condition, the processor 700 begins another E1 cycle. During this cycle, the values for L1 and L3 stored in the RXPA and RLN1 registers are decremented to 12. Also, the value stored in the RP2 register is decremented to ZERO indicating that the TR0 register now stores a complete 4 character word which should be written into the first position of the operand 3 data field.

Under hardware control, the value stored in the RCN1 register is increased to "10$_2$" indicating that the data character "6" is the next character to be selected from the OP1 register. The RCN2 register 720-30 remains at "01" indicating the next MOP control character while the contents of the RIP register is decremented from a value of 3 to the value 2. This indicates that 2 operand 1 data characters are to be processed by the presently stored MOP control character.

Since the selected data character is a ZERO, this causes the control logic circuits 720-76 to condition the ZOC switch 720-20 to select another asterisk character to be loaded into the RAAU register 722-46. This results in the replacement of character #1 at address 1001 in FIG. 8 with an asterisk.

Since the value stored in the RP2 register is ZERO, the processor 700 sets the MOPIA and MOPIB indicators to the value "01$_2$". During the next E2 cycle, the asterisk character is loaded into the TR0 register. At this time, the TR0 register stores the values **4*. In the manner previously described, the processor 700 begins a second F4 cycle based upon the status of the MOPIA and MOPIB indicators. During this cycle, the contents of the RP2 register is tested for zero and the history register HR7 is set to indicate the occurrence of a CN3OVF condition (RP2=0). Next, processor 700 begins a second J1 cycle during which the stored status of the CN1OVF indicator (HR0) is selected for testing during a subsequent cycle. The processor 700 begins a second J7 cycle in which the RDESC and RBASA registers 704-140 and 704-144 are again set to the value $10_2$ for selection of descriptor 3 temporary registers.

Since there was no CN1 overflow condition, processor 700 begins a first J8 cycle. During this cycle, the descriptor 3 address (4777) read out from the ICBA register is incremented by 1 (word) via adder 704-322 and the result (5000) is written back into the ICBA register. The base value stored in the IBASE A register address 5000 is added to the address 5000 by adder 704-320 and the resulting address 5000 is loaded into the RAD0 register 704-46. The processor 700 generates a write single zoned command under microprogram control. More specifically, the processor 700 forces bits 5–8 to a value 1111 specifying the bytes of the word to be written at address 5000 in response to the write command. Also, the processor 700, under microprogram control, forces command bits 1–4 to a code of 1000 specifying that the ZAC command is of the write single zoned type. The ZAC command is forwarded to the cache unit 750 for processing.

Additionally, processor 700 under the control of the MEMADR field forces the DMEM lines to a code of 1100 signaling the cache unit 750 that it is to perform a write single operation. Further, it forces the DREQ-CAC line to a binary ONE signaling the cache unit 750 of the command. The processor 700 via the AL adder 722-92 decrements by 4 the operand 3 length value stored in the RLN3 register and writes back the resulting value "12" into the RLN3 register. Next, the processor 700 performs a vector branch operation based upon the value of the TA3 field stored in the RIDW register 722-106 and begins a first Q1 cycle.

During the Q1 cycle, the first data word of descriptor 3 (**4*) is read out from the TR0 register and loaded into the RAD0 register 704-46 via ALU 714-20 an the ZRESB lines. Next, the AP adder 722-34 loads a value 4 into the RP2 register used for counting the next 4 characters to be written into the TR4 register. The RP6 register is loaded with ZEROS as was it stated previously.

At the end of the Q1 cycle, the processor 700 performs a branch based upon the state of the previously stored END indicator status. Since the indicator was not set, the processor 700 returns to an E1 cycle by a vector branch operation based upon the TA3 field value stored in the RIDW register 722-106.

The cache unit 750 processes the write signal command in a manner similar to that used in the processing of a read command. More specifically, in response to the DREQCAC line being set to a binary ONE, the cache unit 750 loads the ZAC command word transferred to the RAD0 register 704-46 by processor 700 during the J8 cycle into the first location of the WZAC buffer 750-100. The write address counter 750-104 contents are incremented by one. The data word read out from the TR0 register and loaded into the RAD0 register 704-46 during the Q1 cycle is written into the second location of the WZAC buffer 750-100.

In the manner previously described, the directories and cache storage 750-700 are accessed by the signals applied via the RAD0 lines. Assuming that the block including address 5000 does not reside in cache, the hit/miss detector circuits 750-560 do not force the BPSD line to a binary ONE.

Upon the decoding of the write single command by the decoder 750-166, the UGCOGTH and CAOPR control state flip-flops are switched to binary ONE states. The UGCOGTH flip-flop when set permits the processor data word to be written into cache storage 750-700 when the block containing the word resides in cache. The CAOPR flip-flop when set forces the AOPR line to a binary ONE state. At this time, the first ZAC command word is loaded into the ZIU output register 750-174.

Additionally, the cache unit 750 switches the UG-SOGTH control state flip-flop to a binary ONE upn the receipt of a binary ONE signal on the ARA line from the SIU 100. The cache unit 750 completes the operation by loading the data word into the SIU output register which remains on the DIS lines until the occurrence of a next clock pulse.

Since the cache command was a write command, processor 700 can continue its execution of the edit instruction following its completion of transferring the data portion of the command. As seen from FIG. 10, the processor 700 begins a fourth E1 cycle. This results in the unit 722 setting the RXPA, RLNI and RP2 registers to values of 11, 11 and 3 respectively. Also, the RCNI register 720-28 is set to the value $11_2$ while the RCN2 register 720-30 remains set to the value $01_2$. The RIF register 720-63 following decrementing stores the value 1. The operand 1 data character #2 having the value 6 is selected by the ZOC switch 720-20 for transfer to the RAAU register 722-46 upon read out of the contents of the OP 2 register.

During the fourth E2 cycle, the selected data character applied to the ZEB lines is shifted by the shifter 714-24 and the result "6" is written back into the TR0 register. The processor 700 branches to begin a fourth F1 cycle followed by F4, J1, J7 and P1 cycles.

During the F1 cycle, the registers are set as follows: RXPA=10; RLNI=10; RP2=2; RCN1=00.RCN2=01 and RIF=0. The status of the CN1 overflow indicator produced by RCNI=0 is stored in the history register, HR0 not shown. The status of the END indicator produced by RIF=0 is stored in the history register, HR3, not shown.

Also, the operand 1 data character #3 having the value "0" is selected by the ZOC switch 720-20 for transfer to the RAAU register 722-46 upon read out of the OP2 register contents. Since the "0" character appears at the right of non-zero data character, an asterisk character is not substituted for the "0" data character.

During the F2 cycle, the "0" character is stored in the TR0 register with the resulting contents "60". In the J7 cycle, the scratchpad address value $121_8$ is loaded into the RSPA register 722-102 and the third word of descriptor 1 at address 1002 is loaded into the OP1 register from the addressed location ($121_8$) of scratchpad memory 714-30 during cycle P1. Also, during the P1 cycle, the scratchpad address is incremented by one and the resulting address $122_8$ is written back into the RP3 register.

As seen from FIG. 10, since the END indicator was set during a previous cycle, the processor 700 branches to begin a first P4 cycle. In this cycle, the processor 700 tests the length of operand 2 (L2) for zero to detect a default condition. During the remainder of the cycle, operations identical to those in cycle P2 are performed. Next, the processor 700 begins another D1 cycle followed by D2, E1, E2, F1, F2, F4, J7, J8 and Q1 cycles.

Briefly, during the D1 cycle, the next MOP character (char #1-3003) is loaded into the RMOP and RIF registers and the RCN2 register is incremented to a value $10_2$. During cycle D2, the processor 700 tests for the end of the operand 2 field and decrements the RLN2 register to a value 3. In cycle E1, the registers are set to the following values: RXPA, RLN1=1; RP2=1; RCN1=01$_2$; RCN2=10$_2$ and RIF=2. Also, the operand 1 data character #0 having the value 1 is selected to be loaded into the RAAU register.

During the E2 cycle, the data character is written into the TR0 register which now stores the values "601". In the F1 cycle, the above mentioned registers are set as follows: RXPA, RLNI=8; RP2=0; RCN1=10$_2$; RCN2=10$_2$ and RIF=1. Also, the operand 1 data character #1 having the value 2 is selected for loading into the RAAU register. During the F2 cycle, the data character is written into the TR0 register which now contains a full word "6012".

Accordingly, during cycle J7, the RDESC and RBASB registers are set to the value "10" for selecting descriptor 3 temporary registers. In the J8 cycle, the processor 700 loads the address 5001 into the ICBA register and into the RADO register. Another write single zoned command is generated and transferred to the cache unit 750. Also, the RLN3 register contents are decremented to the value 8. During the Q1 cycle, the data word corresponding to the second word F3 of descriptor 3 is loaded into the RADO register for forwarding to the cache unit 750. This results in the values 6012 being written into the location having address 5001.

The Q1 cycle is followed by E1, E2, F3, D1 and D2 cycles. Briefly, during the E1 cycle, the different registers are set to the following values: RXPA, RLN1=7; RP2=3; RCN1=11$_1$; RCN2=10$_2$ and RIF=0. Also, operand 1 data character #2 having a value "0" is selected to be loaded into the RAAU register. During the E2 cycle, the data character is written into the TR0 register. In the F3 cycle, the L1 and L2 indicators are tested for the value "0".

The next MOP character (char #2-3003) is loaded into the RMOP and RIF registers during the D1 cycle. Also, the RCN2 register is incremented to a value 11$_2$. In cycle D2, the RLN2 register is decremented to a value 2. The D2 cycle is followed by E1, E2, F4, J1, J7 and P1 cycles.

During the E1 cycle, the registers are set to the following values: RXPA, RLN1=6; RP2=2; RCN1=00$_2$ (signals CN10VF condition); RCN2=11$_2$ and RIF=2. Also, an asterisk character is selected for loading into the RAAU register in place of data character #3 (1002) having a zero value. During the E2 cycle, the asterisk character is written into the TR0 register which now stores the values "0*".

During the P1 cycle, the next data word of operand 1 containing the values 1357 are read out from the location 122$_8$ of scratchpad memory 714-30 into the OP1 register. Also, the scratchpad address is incremented by one and the result 123$_8$ is written back into the RP3 register.

The P1 cycle is followed by E1, E2, F1, F2, F4, J1, J7, J8, Q1 and Q2 cycles. During the E1 cycle, the registers are set as follows: RXPA, RLN1=5; RP2=1; RCN1=01$_2$; RCN2=11$_2$ and RIF=1. Also, the data character #0 (1003) of operand 1 having a value 1 is selected to be loaded into the RAAU register. During the E2 cycle, this character is written into the TR0 register which now stores the values "0*".

During the F3 cycle, the above registers are set to the following values: RXPA, RLN1=4; RP2=0; RCN1=10$_2$; RCN2=11$_2$ and RIF=0 (signaling finished with that MOP character). Also, the data character #1 having the value 3 is selected for loading into the RAAU register. Further, the status of the indicator is stored in history register HR3. During the F2 cycle, the data character is written into the TR0 register which now contains the values "0*13".

During the J7 cycle, the RDESC and RBASB registers are set to "10" to select the descriptor 3 temporary registers. In cycle J8, the descriptor 3 address 5002 is loaded into the ICBA register and into the RADO register. At this time, the processor 700 generates another write single zoned command for having the cache unit 750 write the third word of descriptor 3 into main memory 800. Also, the RLN3 register is decremented to store the value 4. During the Q1 cycle, the contents of the TR0 register are loaded into the RADO register for transfer to cache unit 750. Also, the RP2 register is again loaded with the value 4. In cycle Q2, the length of operand 2 (L2) is tested.

The Q2 cycle is followed by D1, D2, D3, D10, D11, E1, E2, F1, F2, F4, J1, J7 and P1 cycles. During the D1 cycle, the next MOP control character #3 (3003) is loaded into the RMOP and RIF registers 720-70 and 720-63. Also, the RCN2 register 720-30 is incremented to a value "00" which causes the CN20VF indicator to be set to a binary ONE.

In cycle D2, the RLN2 register is decremented to the value 1 and the RDESC and RBASB registers 704-104 and 704-144 are set to the value 01 to select descriptor 2 temporary registers. During cycle D3, the processor 700 loads the address 3004 into the TEA1 register and into the RADO register 704-46. Again, under microprogram control, the processor 700 generates a read single command to cache unit 750 for fetching the data word at address 3004.

Since the 4 word block including the word was fetched by cache unit 750 in response to a cache pre-read command, the cache unit 750 upon completing the directory search cycle forces the BPSD line to a binary ONE indicative of a "hit". Therefore, the CPSTOP00 line remains a binary ONE enabling the processor 700 continues its processing of the edit instruction.

During the D10 cycle, the value stored in the RLN2 register is decremented by 4 which results in the value −2. This forces the no carry out indicator to a binary ONE which switches the EXH2 indicator to a binary ONE. The data word at address 3004 including the value "90" applied to the ZDI lines by cache unit 750 is loaded into the RDI register 704-164. The processor 700 increments the descriptor 2 address by 4 (words) and loads the resulting address 3008 into the RADO register 704-46. Another cache pre-read command specifying reading of the next 4 word block (addresses 3008-3011) is generated by the processor 700 under microprogram control.

From the foregoing, it is seen that through the use of pre-read commands, the processor 700 is able to perform the edit operation more expeditiously in that the required operand 2 data will always be brought into cache storage 750-700 in advance making it available to the processor 700 as it is needed. Thus, the processor 700 can continue processing without interruption.

During the D11 cycle, the data word fetched by the cache unit 750 is transferred from the RDI register 704-164 to the OP2 register of character unit 720. In the next E1 cycle, the registers are set as follows: RXPA, RLN1=3; RP2=3; RCN1=11$_2$; RCN2=00$_2$ and RIF=2. Also, the operand 1 data character #2 having the value "5" is selected for transfer into the RAAU register 622-46. In cycle E2, the data character is shifted and written into the TR0 register.

The execution of the F1 cycle results in the above registers being set to the following values: RXPA, RLN1=2, RP2=2; RCN1=$00_2$ (signals CNIOVF condition); RCN2=$00_2$ and RIF=1. Also, the operand 1 data character #3 having the value "7" is selected for transfer into the RAAU register 722-46. In cycle F2, the data character is written into the TR0 register. Lastly, in the P1 cycle, the operand 1 data word at address 1004 in FIG. 8 which includes data characters "90" is read out of scratchpad location having address $123_8$ and loaded into the OP1 register.

The P1 cycle is followed by another series of E1, E2, F3, D1, D2, E1, E2 and F4 cycles. At the completion of the E1 cycle, the registers contain the following values: RXPA, RLN=1; RP2=1; RCN1=$01_2$; RCN2=$00_2$ and RIF=0 (signals that a new MOP character is needed). During the E1 cycle, the operand 1 data character #0 (address 1004) having the value "9" is selected for transfer to the RAAU register 722-46. In cycle E2, the data character is written into the TR0 register which at this time stores the values "579".

During the D1 cycle, the next MOP control character, (char #0) in FIG. 8 is located into the RMOP and the RIF registers 720-70 and 720-63. Also, the RCN2 register 720-30 is incremented to the value "$01_2$". During the D2 cycle, the RLN2 register is decremented to the value 0. This signals that the operand 2 string has been exhausted (L2=0).

In cycle E1, the last character of oeprand 1 (char #1 at address 1004 in FIG. 8) is processed by character unit 720. Since the character is the first character to be processed under control of the MOP control character loaded into the RMOP register 720-70 in cycle D1, its zero value is detected and an asterisk character is selected for loading into the RAAU register 722-46. At the completion of cycle E1, the register values are as follows: RXPA, RLN1=0; RP2=0; RCN1=$10_2$; RCN2=$01_2$ and RIF=0 (the MOP character was coded to specify processing of 1 character).

In cycle E2, the asterisk character is written into the TR0 register which at this time contains a full word (i.e., "5790"). In cycle F4, when the adders test the values in the RXPA, RLN1 and RP2 registers, this results in the setting of the AXPZ, ALZ and APZ indicators to binary ONES. The status of these indicators are stored in history registers HR4, HR5 and HR7, not shown. Also, the zero value in the RP2 register is stored in the RP5 register.

Next, the processor 700 executes a J1 cycle wherein the status of the CNIOVF indicator (HR0) is selected for testing in a subsequent cycle. At the end of the J1 cycle, the status of the AXPZ and AL indicators are tested. Since both are set, the processor 700 sequences to cycle J2.

In cycle J2, the processor 700 selects the ALZ indicator (HR5) for testing in a subsequent cycle and begins cycle J3. As seen from FIG. 10, the value $10_2$ is loaded into the RDESC and RBASB registers 704-140 and 704-144 for selection of operand 3 temporary registers. Also, the END indicator is selected for testing during a subsequent cycle.

At the end of the J3 cycle, the processor 700 performs a conditional vector branch operation based on the state of the ALZ indicator. Since the indicator was set, the processor 700 branches to cycle Q7 based upon the TA3 contents of the R1DW register 722-106. During cycle Q7, the processor 700 increments by 1 (word) the descriptor 3 address read out from the ICBA register. The resulting address 5003 is written back into the ICBA register. Also, this address is added to the TBASEA address by adder 704-320 and the resulting address (5003) is loaded into the RADO register 704-46.

As seen from FIG. 10, the processor 700 generates a last write signal zoned command which is forwarded to the cache unit 750. At this time, the processor 700 sets the EXH3 indicator to a binary ONE. Also, the AP adder 722-34 generates a shift count value by subtracting from the value (0) stored in the RP5 register from a constant value 36 with the result being loaded into the RSC register 722-40.

Next, processor 700 begins a Q8 cycle wherein the contents of the TR0 register are shifted by 36-bit positions via the shifter 714-24. The resulting data word having the values 579* is loaded into the RADO register 704-46 for writing into the location having address 5003 as shown in FIG. 8. As seen from FIG. 10, the processor 700 begins cycle Q9 wherein it restarts the instruction pipeline in response to a microinstruction word having the second format illustrated in FIG. 6b.

In greater detail, the PIPE field of the microinstruction word is coded to specify a type 1 restart. Upon the decoding thereof, the processor 700 sets the [END signal to a binary ONE which starts the beginnning of the next instruction.

As seen from the foregoing description, the arrangement of the present invention is able to speed up the execution of various instructions required to be executed by a data processing unit. By having a processor execute sequences which include pre-read commands for types of instructions whose execution can be facilitated, the overall efficiency of the processor is increased.

It will be appreciated that the subject matter of the present invention is not directed to any particular manner of microprogramming a given instruction. By contrast, the microprogrammer is free to select those cycles which should be coded to include a pre-read command.

In accordance with the teachings of the present invention, pre-read commands should be included in those cycles where advance calls to a cache unit for data can be carried out while the processor performs operations which does not require immediate use of the data. For example, as illustrated, this can be done where the processor is generating addresses or is carrying out an editing or translation operation. Thus, in accordance with the teachings of the present invention, pre-read commands are generated under hardware control during the initial portion of a multiword instruction enabling the generation of addresses of certain descriptors to proceed in parallel with the development of addresses for other descriptors.

It will be obvious that many changes can be made to the system of the preferred embodiment.

To prevent undue burdening the description with matter within the ken of those skilled in the art, a block diagram approach has been followed, with a detailed functional description of each block and specific identification of the circuits it represents. The individual engineer is free to select elements and components such as flip-flop circuits, shift registers, etc., from the individual's own background or available standard references as given herein.

It will also be noted that the exact coding patterns for all microinstructions were not disclosed herein since the engineer is free to select alternate forms of coding. For further details and insight into techniques and deriving such coding and for additional background information concerning the system, reference may be made to the text titled, "Computer Design Fundamentals" by Chu, McGraw-Hill Book Company, Inc., copyright 1962, and the text titled, "Microprogramming Principles and Practice" by S. S. Husson, Prentice-Hall, Inc., copyright 1970.

While in accordance with the provisions and statutes there has been illustrated and described the best form of the invention known, certain changes may be made to the system described without departing from the spirit of the invention as set forth in the appended claims and, in some cases, certain features of the invention may be used to advantage without a corresponding use of other features.

What is claimed is:

1. A data processing system comprising:
   an addressable main store having a plurality of word locations for storing information including data and instructions;
   high speed buffer storage means coupled to said main store for providing immediate access to data and instructions fetched from said main store and stored therein, said buffer storage means having a plurality of addressable locations, and said buffer storage means including control means for fetching said information from said main store in response to memory commands; and,
   processing means coupled to said high speed buffer storage means, said processing means for processing a normal repertoire of instructions, each instruction including an operation code portion and a plurality of descriptor address portions, said processing means including control means for generating signals including said memory commands required for the execution of said instructions, said control means including decoder circuit means in response to signals indicative of said operation code portion of each type of instruction within said normal repertoire coded to specify an operation involving a plurality of operand data strings specified by said plurality of descriptor address portions which can be processed concurrently, being operation to generate memory command signals accompanied by a set of coded command signals specifying fetching in advance a predetermined segment of data of a first operand string specified by an address developed from a first one of said plurality of instruction descriptor address portions and
   said buffer storage control means being operative in response to said set of coded command signals to generate signals for forwarding said memory command to said main store to fetch said segment of data when said predetermined segment specified by said memory command is not stored in said buffer storage means for storage in advance in said buffer storage means and enabling signals for conditioning said processing control means to continue to process another one of said plurality of descriptor address portions of said each type of instruction thereby increasing the efficiency of executing said each predetermined type of instruction.

2. The system of claim 1 wherein said buffer storage control means includes interface signaling means coupled to said processing control means for stopping the operation of said processing means when said requested data is not stored in said buffer storage means, said buffer storage control means including means operative in response to said set of coded command signals to generate said enabling signals to inhibit the switching of said interface signaling means when said requested data is not stored in said buffer storage means so as to condition said processing control means to enable said processing means to continue the processing of said another one of said plurality of descriptor address portions in parallel with the fetching of said segment of data of said first operand data string from said main store by said buffer storage control means.

3. The system of claim 2 wherein said main store is organized into a plurality of sets of blocks of word locations and wherein said processing means further includes address preparation means coupled to said processing control means for generating addresses in response to said plurality of descriptor address portions of said instruction, said memory command including a command code specifying the type of main store read operation and a memory command address generated by said address preparation means specifying the data word of said first operand data string to be fetched and said decoder circuit means including circuit means operative to generate signals corresponding to said command code coded to specify the reading out from main store of said segment corresponding to a block of operand data words including said data word specified by said memory command address.

4. The system of claim 3 wherein each main store set being defined by a set address corresponding to the low order portion of said memory command address and each main store block being identified by a block address corresponding to the high order portion of said memory command address and
   wherein said buffer storage plurality of addressable word locations are arranged in a plurality of sets of blocks of word locations defined by said set addresses and block addresses, said buffer storage means further including:
   register means for storing said memory read command from said processing means;
   a data directory having a plurality of locations corresponding in number to the number of sets in said buffer storage means and being addressable by said set addresses, each location of said data directory storing the block addresses of blocks of words within the associated set stored in said buffer storage means, said data directory responsive to said low order portion of said memory command address from said processing means to read out said block addresses from said directory; and,
   comparison means coupled to said data directory and to said processing means for comparing said block addresses read from said data directory with the high order portion of said memory command address and generating a hit-mass detection signal indicative of whether or not the data word being requested is stored in said buffer storage means,
   said buffer storage control means further including transfer means operative in response to said miss signal to generate signals for transferring said memory read command to said main store for fetching the words of said block containing said requested data word and said means being conditioned by said miss signal to inhibit said switching of said interface signaling means so as to enable the storage of said words of said block in said buffer storage means without transfer of any data words to said processing means.

5. The system of claim 3 wherein said processing means further includes output means for applying said memory commands to said buffer storage means, said output means being coupled to said circuit means, said address preparation means, said processing control means and said buffer storage means, said processing control means being operative in response to said operation code portion coded to specify said operation involving said plurality of operand data strings which can be processed concurrently to generate signals for conditioning said address preparation means to generate said memory command address and for conditioning said output means to apply said command code and said memory command address along with said set of coded command signals to said buffer storage means.

6. The system of claim 1 wherein said processing control means further includes:
cycle control means including said decoder circuit means for generating signals which define processor cycles required for controlling the operation of said processing means during the certain ones of different phases of processing of each of said instructions, said cycle control means in response to said signals indicative of said each type of instruction being operative to condition said decoder circuit means during a first one of said different phases for generating said set of coded command signals specifying said predetermined type of buffer storage operation.

7. The system of claim 6 wherein said different phases of processing include an instruction cycle (I cycle) wherein instruction operand addresses are generated, a cache cycle (C cycle) wherein said buffer in response to processor command signals fetches a number of operands specified by said instruction and an execution cycle (E cycle) wherein the manipulations specified by said instruction operation code to be performed upon said operands are executed by said processing means and wherein said first different phases corresponds to said I cycle.

8. The system of claim 7 wherein said cycle control means further includes instruction cycle control state means for generating signals corresponding to sequences of control states in accordance with the coding of the operation code portions of said instructions defining the sequences of operations to be performed by said processing means during said I cycle phase of operation, said I cycle control means in response to the operation code specifying said each type of instruction generating one of said sequences including a predetermined control state and said decoder circuit means being conditioned during said predetermined control state to generate said set of coded command signals specifying said predetermined type of buffer storage operation.

9. The system of claim 8 wherein said processing unit further includes address preparation means coupled to said processing control means for generating command addresses from said instruction address portions, said I cycle control means in response to said operation code portion of each type of instruction being operative to generate a number of said predetermined control states and said decoder circuit means being conditioned during each of said number of predetermined control states to generate said coded command signals specifying said predetermined type of buffer storage operation for fetching in advance, data words corresponding to a different one of said number of operands and to generate signals for conditioning said address preparation means during each of said number of predetermined control states to generate a command address from a different one of said number of address portions enabling said processing means to perform address preparation and operand fetching operations concurrently.

10. The system of claim 8 wherein said control means further includes microprogram control means including:
an addressable address store coupled to receive signals corresponding to said operation code portion, said address store including a plurality of locations, each for storing a word including at least a first address identifying a first microinstruction of a different one of a plurality of execution sequences and an output register connected to said store for storing the word contents of a location specified by said operation code portion; and,
a cycled addressable control store including a plurality of locations storing at least one microinstruction of a different one of said plurality of execution sequences required for controlling the operation of said processing means during the execution of said instructions during said E cycle phase of operation and an output register connected to said control store and to said decoder circuit means, said output register for temporarily storing the microinstruction contents of an accessed location during a cycle of operation of said control store.

11. The system of claim 10 wherein one of said plurality of execution sequences includes a number of microinstructions coded for conditioning said processing unit during execution of the operation specified by said operation code portion specifying said type of instruction, each of said microinstructions including a number of fields, at least one of said number of fields being used to specify buffer storage commands and decoder circuit means being coupled to said control store output register, said decoder circuit means being operative in response to signals from said one field of each microinstruction read out from said control store containing a predetermined code to generate an additional set of coded command signals specifying said predetermined type of buffer storage read operation for fetching in advance another segment of said first operand data string specified by said address developed in response to said first instruction descriptor address portion as required for the continued processing of said type of instruction, for storage in advance in said buffer storage means concurrent with the continued execution of said type of instruction by said processing means under microprogram control.

12. The system of claim 11 wherein said memory read command signals include a command code specifying the type of main store read operation and an address specifying the data word to be fetched, said main store plurality of word locations being arranged for addressing into a plurality of sets of blocks of word locations, each set being defined by a set address corresponding to a low order portion of said command address and each block being identified by a block address corresponding to the high order portion of said command address;
said buffer storage plurality of addressable word locations being arranged in a plurality of sets of blocks or word locations defined by said set addresses and block addresses and
said buffer storage means further including:

register means for storing said memory read command from said processor;

a data directory having a plurality of locations corresponding in number to the number of sets in said buffer storage means and being addressable by said set addresses, each location of said data directory storing the block addresses of blocks of words within the associated set stored in said buffer storage means, said data directory responsive to said low order portion of said command address from said processing means to read out said block addresses corresponding to said high order portion of said command address; and, comparison means coupled to said data directory and to said processing means for comparing said block addresses read from said data directory with the high order portion of said command address and generating a hit-miss detection signal indicative of whether or not the data word being requested is stored in said buffer storage means, said buffer storage control means in response to said miss signal generating signals for transferring said memory read command to said main store for fetching the words of block containing said requested data word and for inhibiting said means from switching said interface signaling means enabling the storage of said words of said block into said buffer storage means without transfer of any data words to said processing means.

13. The system of claim 12 wherein during said E cycle phase of operation said control store reads out a microinstruction including said one field coded to specify buffer storage read single operation included within said memory request for fetching an operand data word previously fetched in response to coded command signals generated during said I cycle phase of operation specifying said predetermined type of buffer storage operation;

said data directory being operative in response to said low order portion of said command address from said processing means to read out said block addresses corresponding to said low order portion of said command address;

said comparison means upon comparing said block addresses read from said data directory with the high order portion of said command address generating a hit detection signal indicating that the word being requested is now stored in said buffer storage means; and, said buffer storage control means in response to said hit detection signal generating signals for transferring said requested data word to said processing means and for processing said request as requiring no operation whereby said processing means is able to continue execution of said type of instruction by having immediate access to said requested data word.

14. The system of claim 11 wherein said processing unit further includes execution means for executing the operations specified by the operation code portions of said instructions, said execution means being coupled to said control store output register for receiving signals corresponding to certain fields of each microinstructions read out from said control store during said E cycle of operation and said execution means being conditioned by each microinstruction containing said predetermined code in said one field to execute the operation specified by said type of instruction upon said operands concurrent with fetching said operand data.

15. The system of claim 12 wherein said microprogram control means further includes branch control means having a number of test inputs and coupled to said control store for conditioning said control store to branch to microinstructions within said sequence in accordance with signals applied to said inputs and said branch control means in response to signals from said execution means applied to certain ones of said test inputs to condition said control store to branch to locations within said control store for repeating the execution of said microinstructions containing said predetermined codes for generating a succession of said sets of coded command signals, each specifying said predetermined type of buffer storage read operation for continued fetching in advance of said operand data.

16. A data processing system comprising:
a main store including a plurality of word locations for storing data and instructions;
a cache unit operatively coupled to said main store for providing immediate access to data and instructions fetched from said main store and stored therein, said cache unit including:
a buffer store including a plurality of addressable word locations arranged into a plurality of sets of blocks of word locations, each set and each block being defined by a set address and a block address respectively;
a register for storing memory command signals, said command signals including a command code and a command address, said command address having a low order portion containing a set address and a high order portion containing a block address;
a data directory having a plurality of locations corresponding in number to the number of sets in said buffer store and being addressable by said set addresses, each location of said data directory storing block addresses of blocks of words within the associated set stored in said buffer store, said data directory responsive to said set address corresponding to the low order portion of said command address to read out said block addresses stored in said data directory; and,
comparison means coupled to said data directory for comparing said block addresses read from said data directory with the high order portion of said command address and generating a hit-miss detection signal indicative of whether or not the data word being requested is stored in said buffer store; and
control means for fetching information from said buffer store and said main store, said control means being coupled to said register, said buffer store, said directory and said comparison means; and
a processing unit coupled to said cache unit, said processing unit for processing a normal repertoire of instructions, each instruction including an operation code and a number of descriptor address portions, said processing unit including control means for generating signals including memory commands required for execution of said instructions, said control means including decoder circuit means responsive to signals indicative of each operation code specifying a type of instruction within said normal repertoire which specifies an operation including a plurality of operand strings of data specified by a plurality of said number of descriptor address portions which can be processed concurrently to generate memory command signals to said cache unit accompanied by cache command signals coded to specify a cache pre-read operation for fetching a block of data words of a first operand data string specified by a first one of said plurality of descriptor address portions and said cache unit control means being operative in response to said cache pre-read command signals to generate signals for forwarding said memory command signals loaded into said cache unit register to said main store when said comparison means generates a miss detection signal indicating that none of said block addresses read out from said directory in response to said low order portion of said command address match said high order portion of said command address and said cache unit generating signals for writing the data words of the block containing the requested word transferred from said main store into said buffer store and for enabling said processing unit to continue processing of said type of instruction thereby providing advance storage of said block read from said main store in said buffer store notwithstanding the occurrence of said miss detection signal.

17. The system of claim 16 wherein said buffer storage control means includes interface signaling means coupled to said processing control means for stopping the operation of said processing unit in response to said miss detection signal, said cache unit control means including means operative in response to signals coded to specify said cache pre-read operation to inhibit the switching of said interface signaling means enabling said processing control means to continue the processing of said type of instruction in parallel with the fetching of said block of data of said first operand string of data from said main store.

18. The system of claim 17 wherein said main store is organized into a plurality of sets of blocks of word locations, said memory command signals including a command code specifying the type of main store read operation and an address generated from one of said descriptor address portions specifying the data word to be fetched and said decoder circuit means including circuit means operative to generate signals corresponding to said command code coded to specify the reading out from main store of said block of data words including said data word specified by said command address.

19. The system of claim 18 wherein said processing unit further includes address preparation means coupled to said processing control means for generating command addresses from said instruction descriptor address portions and output means for applying said memory command signals to said buffer store, said output means being coupled to said circuit means, said address preparation means, said processing control means and to said buffer store, said processing control means being operative in response to said operation code specifying said predetermined class of instruction to generate signals for conditioning said address preparation means to generate said command address and for conditioning said output means to apply said command code and said command address to said buffer store.

20. The system of claim 16 wherein said processing control means further includes:

cycle control means including said decoder circuit means for generating signals which define processor cycles required for controlling the operation of said processing unit during the certain ones of different phases of processing each of said instructions, said cycle control means in response to said signals indicative of said predetermined class of instruction being operative to condition said decoder circuit means during a first one of said different phases for generating said coded command signals specifying said cache pre-read operation.

21. The system of claim 20 wherein said different phases of processing include an instruction cycle (I cycle) wherein instruction operand addresses are generated, a cache cycle (C cycle) wherein said buffer in response to processor command signals fetches a number of operands specified by said instruction and an execution cycle (E cycle) wherein the manipulations specified by said instruction operation code to be performed upon said operands are executed by said processing unit and wherein said first different phases corresponds to said I cycle.

22. The system of claim 21 wherein said cycle control means further includes instruction cycle control state means for generating signals corresponding to sequences of control states in accordance with the coding of the operation code portions of said instructions defining the sequences of operations to be performed by said processing unit during said I cycle phase of operation, said I cycle control means in response to the operation code specifying said type of instruction generating one of said sequences including signals specifying a predetermined control state and said decoder circuit means being conditioned during said predetermined control state to generate said coded command signals specifying said cache pre-read operation.

23. The system of claim 22 wherein said processing unit further includes address preparation means coupled to said processing control means for generating command addresses from said instruction descriptor address portions, said I cycle control means in response to said predetermined type of instruction operation code being operative to generate signals specifying a number of said predetermined control states and said decoder circuit means being conditioned during each of said number of predetermined control states to generate said coded command signals specifying said cache pre-read operation for fetching in advance, data words corresponding to a different one of said number of operands and to generate signals for conditioning said address preparation means during each of said number of predetermined control states to generate a command address from a different one of said number of address portions enabling said processing unit to perform address preparation and operand fetching operations concurrently during the processing of said each type of instruction.

24. The system of claim 22 wherein said control means further includes microprogram control means including:

an addressable address store coupled to receive signals corresponding to said operation code, said address store including a plurality of locations, each for storing a word including at least a first address identifying a first microinstruction of a different one of a plurality of execution sequences and an output register connected to said store for storing the word contents of a location specified by said operation code; and, a cycled addressable control store including a plurality of locations storing at least one microinstruction of a different one of said plurality of execution sequences required for controlling the operation of said processing unit during the execution of said instructions during said E cycle phase of operation and an output register connected to said control store and to said decoder circuit means, said output register for temporarily storing the microinstruction contents of an accessed location during a cycle of operation of said control store.

25. The system of claim 24 wherein one of said plurality of execution sequences includes a number of microinstructions coded for conditioning said processing unit during execution of the operation specified by said operation code portion specifying said predetermined class of instruction, each of said microinstructions including a number of fields, at least one of said number of fields being used to specify buffer storage commands and decoder circuit means being coupled to said control store output register, said decoder circuit means being operative in response to signals from said one field of each microinstruction read out from said control store containing a predetermined code to generate additional command signals specifying said cache pre-read operation for fetching operand data relating to one operand of said type of instruction specified by said memory request for storage in advance in said buffer store concurrent with processing another operand specified by said predetermined type of instruction while execution is proceeding under microprogram control.

26. The system of claim 25 wherein during said E cycle phase of operation said control store reads out a microinstruction including said one field coded to specify buffer storage read single operation included within said memory request for fetching an operand data word previously fetched in response to coded command signals generated during said I cycle phase of operation specifying said cache pre-read operation;

said data directory being operative in response to said low order portion of said command address from said processing means to read out said block addresses corresponding to said low order portion of said command address;

said comparison means upon comparing said block addresses read from said data directory with the high order portion of said command address generating a hit detection signal indicating that the word being requested is now stored in said buffer store; and, said cache unit control means in response to said hit detection signal generating signals for transferring said requested data word to said processing unit and for processing said request as requiring no operation whereby said processing unit is able to continue execution under microprogram control of said type of instruction by having immediate access to said requested data word.

27. A data processing system comprising:

a main store including a plurality of word locations for storing data and instructions, said plurality of word locations being arranged into a plurality of sets of blocks of word locations, each set being defined by a set address and each block being identified by a block address;

a cache unit operatively coupled to said main store for providing immediate access to said data and instructions fetched from said main store and stored therein, said cache unit including:

a buffer store including a plurality of addressable word locations arranged into a plurality of sets of blocks of word locations defined by said set addresses and block addresses;

a register for storing memory command signals, said command signals including a command code and a command address, said command address having a low order portion defining a set address and a high order portion defining a block address;

an addressable data directory having a plurality of locations corresponding in number to the number of sets in said buffer store and being addressable by said set addresses, each location of said data directory storing block addresses of blocks of words within the associated set stored in said buffer store, said data directory responsive to said set address corresponding to the low order portion of said command address to read out said block addresses stored in said data directory; and, comparison means coupled to said data directory for comparing said block addresses read from said data directory with the higher order portion of said command address and generating a hit-miss detection signal indicative of whether or not the data word being requested is stored in said buffer store; and command control means being coupled to said register, said buffer store, said data directory and said comparison means, said command control means being operative in accordance with said hit-miss detection signal and said memory command signals to generate control signals for fetching the data requested from said buffer store and said main store; and a processing unit for processing a normal repertoire of instructions, each instruction including an operation code and a number of descriptor addresses, said processing unit being coupled to said cache unit for transferring and receiving information to and from said cache unit and said processing unit including:

control means for generating signals including memory commands required for the execution of said instructions, said control means including:

a plurality of registers for storing instructions received from said cache unit;

means coupled to at least one of said plurality of registers for receiving signals corresponding to said operation code and for generating signals indicative of the type of instruction to be processed; and, hardware control decoder circuit means coupled to said cache command control means for generating cache command signals specifying the type of buffer store operation to be performed by said cache unit and said memory command signals in accordance with said signals from said processing unit means, said hardware control decoder circuit means being conditioned by signals from said means indicating that an instruction stored in one of said plurality of registers is of a type involving operations upon a plurality of variable length operand data strings which can be processed concurrently to generate said cache command signals coded as cache pre-read command signals to specify a pre-read buffer store operation for fetching a block of data words of a first operand data string together with said memory command signals and said cache unit command control means being operative in response to said cache pre-read command signals to generate signals for forwarding said memory command signals loaded into said cache unit register to said main store when said comparison means generates said hit-miss detection signal indicating that none of said block addresses read out from said data directory in response to said low order portion of said command address match said high order portion of said command address concurrent with a signal for enabling said processing unit in response to said hit-miss detection signal and said cache unit generating signals for writing the data words of said block containing the requested word transferred from said main store into said buffer store concurrent with said processing units continued processing said type of instruction thereby providing advance storage of said block in said buffer store eliminating the subsequent interruption in the operation of said processing unit in processing the remainder of said type of instruction.

28. The system of claim 27 wherein said cache unit control means includes interface signaling means coupled to processing control means for stopping the operation of said processing unit when said cache unit is unable to provide immediate access to said requested data, said cache unit control means including means operative in response to said cache pre-read command signals to inhibit the switching of said interface signaling means in response to said hit-miss detection signal indicative of a miss enabling said processing control means to continue the processing of a next descriptor address within said instruction in parallel with the fetching of said block of first operand data string from said main store.

29. The system of claim 28 wherein said processing unit further includes address preparation means coupled to said processing control means for generating command addresses from said instruction descriptor addresses and output means for applying said memory command signals to said cache unit means, said output means being coupled to said address preparation means, said processing control means and to said cache unit means, said processing control means being operative in response to said operation code indicating that the instruction is of said type to generate signals for conditioning said address preparation means to generate said command address and for conditioning said output means to apply said command code and said command address to said cache unit.

30. The system of claim 27 wherein said processing control means further includes:
cycle control means including said decoder circuit means for generating signals which define processor cycles required for controlling the operation of said processing unit during the certain ones of different phases of processing of each of said instructions, said cycle control means in response to said signals indicative of said type of instruction being operative to condition said decoder circuit means during a first one of said different phases for generating said coded command signals specifying said pre-read buffer store operation.

31. The system of claim 30 wherein said different phases of processing include an instruction cycle (I cycle) wherein instruction operand addresses are generated, a cache cycle (C cycle) wherein said cache unit in response to processor command signals fetches a number of operands specified by said instruction and an execution cycle (E cycle) wherein the manipulations specified by said instruction operation code to be performed upon said operands are executed by said processing means and wherein said first different phases corresponds to said I cycle.

32. The system of claim 31 wherein said cycle control means further includes instruction cycle control state means for generating signals corresponding to sequences of control states in accordance with the coding of the operation codes of said instructions defining the sequences of operations to be performed by said processing means during said I cycle phase of operation, said I cycle control means in response to the operation code specifying said predetermined class of instruction generating one of said sequences including a predetermined control state and said decoder circuit means being conditioned during said predetermined control state to generate said coded command signals specifying said pre-read buffer store operation.

33. The system of claim 32 wherein said processing unit further includes address preparation means coupled to said processing control means for generating command addresses from said descriptor addresses, said I cycle control means in response to said operation code specifying said predetermined type of instruction being operative to generate a number of said predetermined control states and said decoder circuit means being conditioned during each of said number of predetermined control states to generate said coded command signals specifying said pre-read buffer store operation for fetching in advance data words corresponding to a different one of said plurality of variable length operand data strings and to generate signals for conditioning said address preparation means during each of said number of predetermined control states to generate a command address from a different one of said number of descriptor addresses enabling said processing unit to perform address preparation and operand fetching operations concurrently.

34. The system of claim 32 wherein said control means further includes microprogram control means including:
an addressable address store coupled to receive signals corresponding to said operation code, said address store including a plurality of locations, each for storing a word including at least a first address identifying a first microinstruction of a different one of a plurality of execution sequences and an output register connected to said store for storing the word contents of a location specified by said operation code; and,
a cycled addressable control store including a plurality of locations storing at least one microinstruction of a different one of said plurality of execution sequences required for controlling the operation of said processing means during the execution of said instructions during said E cycle phase of operation and an output register connected to said control store and to said decoder circuit means, said output register for temporarily storing the microinstruction contents of an accessed location during a cycle of operation of said control store.

35. The system of claim 34 wherein one of said plurality of execution sequences includes a number of microinstructions coded for conditioning said processing unit during execution of the operation specified by said operation code specifying said type of instruction, each of said microinstructions including a number of fields, at least one of said number of fields being used to specify cache unit commands and decoder circuit means being coupled to said control store output register, said decoder circuit means being operative in response to signals from said one field of each microinstruction read out from said control store containing a predetermined code to generate additional command signals specifying said pre-read buffer store operation together with said memory read command for fetching a block of operand data relating to one variable length operand data string of said type of instruction specified by said memory command for storage in advance in said buffer store concurrent with processing another variable length operand data string specified by said type of instruction while execution is proceeding under microprogram control.

36. The system of claim 35 wherein during said E cycle phase of operation said control store reads out a microinstruction including said one field coded to generate cache command signals specifying read single buffer store operation together within said memory command for fetching an operand data word previously fetched in response to coded cache command signals generated during said I cycle phase of operation specifying said pre-read buffer store operation;

said data directory being operative in response to said low order portion of said command address from said processing means to read out said block addresses from said data directory corresponding to said low order portion of said command address;

said comparison means upon comparing said block addresses read from said data directory with the high order portion of said command address generating a hit detection signal indicating that the word being requested is now stored in said buffer store; and, said cache unit control means in response to said hit detection signal generating signals for transferring said requested data word to said processing unit and for processing said cache command signals as requiring no operation whereby said processing unit is able to continue execution of said type of instruction under microprogram control by having immediate access to said requested data word.

* * * * *